United States Patent [19]

Cedillo et al.

[11] Patent Number: 5,281,023
[45] Date of Patent: Jan. 25, 1994

[54] METHOD AND APPARATUS FOR AUTOMATICALLY CONTROLLING A WELL FRACTURING OPERATION

[75] Inventors: Greg Cedillo; Thomas A. Robertson, both of Houston; Frank C. South, Jr., Spring; Robert A. Baten, Houston; Bruce A. Vicknair, Baytown, all of Tex.

[73] Assignee: Stewart & Stevenson Services, Inc., Houston, Tex.

[21] Appl. No.: 389,923

[22] Filed: Aug. 2, 1989

[51] Int. Cl.⁵ ............................................. B01F 15/04
[52] U.S. Cl. ...................................... 366/17; 366/20; 366/152; 166/308
[58] Field of Search ............... 166/308, 280; 366/152, 366/1, 17, 20, 65; 137/13; 73/151

[56] References Cited

U.S. PATENT DOCUMENTS

| | | | |
|---|---|---|---|
| 3,161,203 | 12/1964 | Hathorn | 137/8 |
| 3,326,536 | 6/1967 | Zingg et al. | 366/17 |
| 3,379,421 | 4/1968 | Putman | 366/17 |
| 3,757,864 | 9/1973 | Crawford et al. | 137/13 X |
| 3,818,991 | 6/1974 | Nimerick | 166/308 X |
| 3,980,136 | 9/1976 | Plummer | 166/308 |
| 4,126,181 | 11/1978 | Black | 166/280 |
| 4,176,064 | 11/1979 | Black | 494/2 X |
| 4,265,262 | 5/1981 | Hotine | 137/2 |
| 4,298,288 | 11/1981 | Weisbrod | 366/20 X |
| 4,327,759 | 5/1982 | Millis | 137/3 |
| 4,456,069 | 6/1984 | Vigneri | 166/308 |
| 4,474,204 | 10/1984 | West | 137/88 |
| 4,475,818 | 10/1984 | Bialkowski | 366/17 |
| 4,665,982 | 5/1987 | Brown | 166/308 X |
| 4,701,095 | 10/1987 | Berryman | 198/311 X |
| 4,726,219 | 2/1988 | Pearson et al. | 73/151 X |
| 4,779,186 | 10/1988 | Handke et al. | 366/152 |
| 4,845,981 | 7/1989 | Pearson | 166/308 X |
| 4,887,670 | 12/1989 | Lord et al. | 166/308 X |
| 4,911,241 | 3/1990 | Williamson et al. | 166/308 |
| 4,930,576 | 6/1990 | Berryman et al. | 366/65 |

OTHER PUBLICATIONS

Block Diagram, Stewart & Stevenson Services, Inc.
Sales Information Relating to Present Invention.
Technique Helps Extend Cotton Valley FRAC by Thomas M. Hopkins II, T. M. Hopkins, Inc., Audis Byrd and R. E. Hyden, Halliburton Services.
FRAC/Blender Unit Lightweight, Automated Stewart & Stevenson Services, Inc.

Primary Examiner—Frankie L. Stinson
Attorney, Agent, or Firm—Michael F. Heim; David A. Rose

[57] ABSTRACT

An automated density and chemical controller automatically controls the density and chemical proportions of a slurry that is injected into a well during a well fracturing operation to produce a slurry with a desired density. The automated controller automatically controls the addition of a proppant to water based on the parameters of the fracturing operation, the incoming flow of water into a blender tub, the incoming flow rate of chemicals, and the performance characteristics of the mechanism used to deliver the proppant. The automated density controller also measures the flow of the slurry discharged from the blender tub and calculates the actual density of the slurry. After comparing the calculated actual density with the desired density, the automated density controller calculates a correction factor and recalibrates the performance characteristics of the proppant delivery mechanism. The automated density controller also includes a densiometer for measuring the actual density of the slurry. The actual density measured by the densiometer is compared with the calculated actual density to provide an indication of whether the controller is operating correctly.

25 Claims, 44 Drawing Sheets

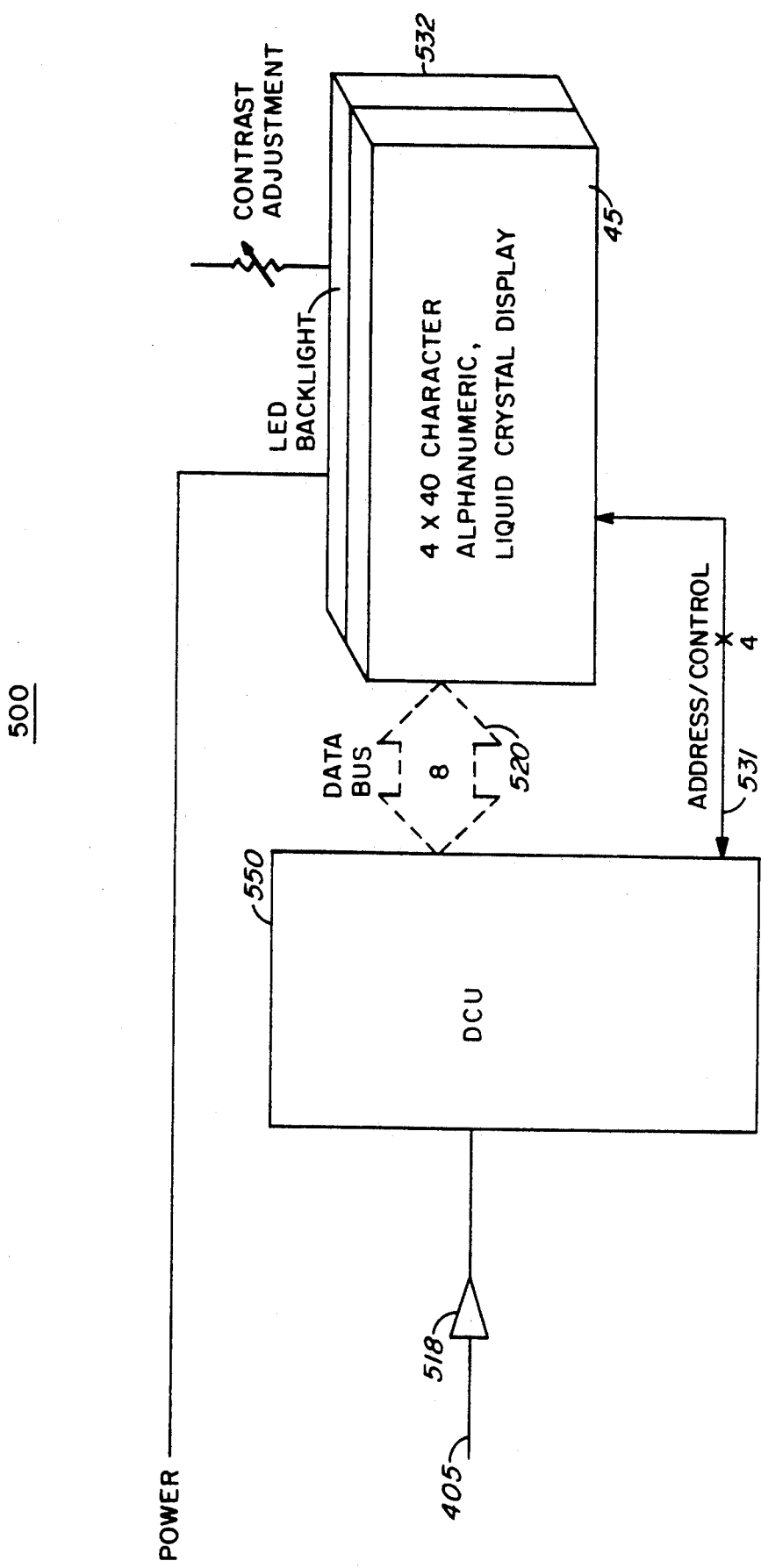

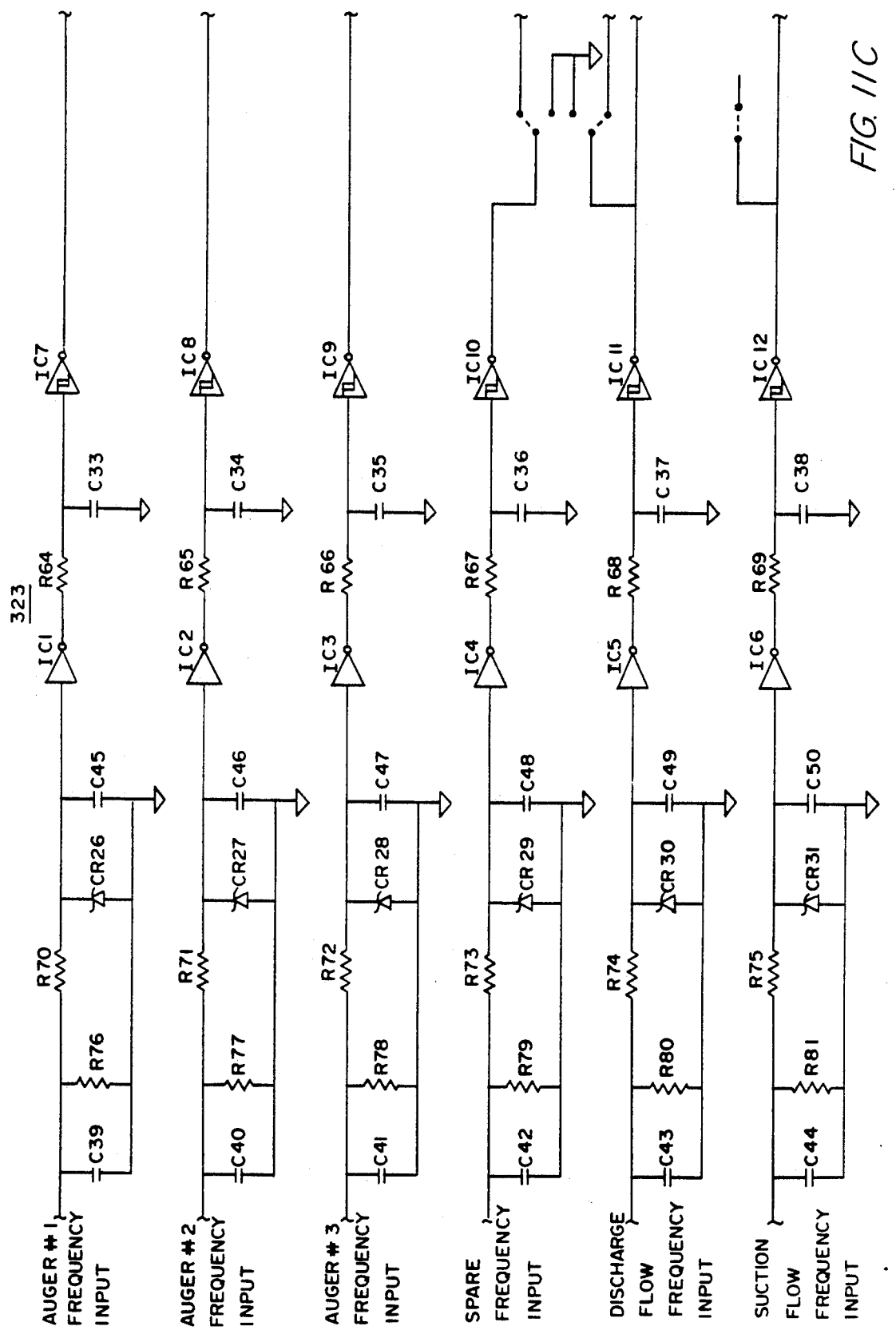
FIG. IIC

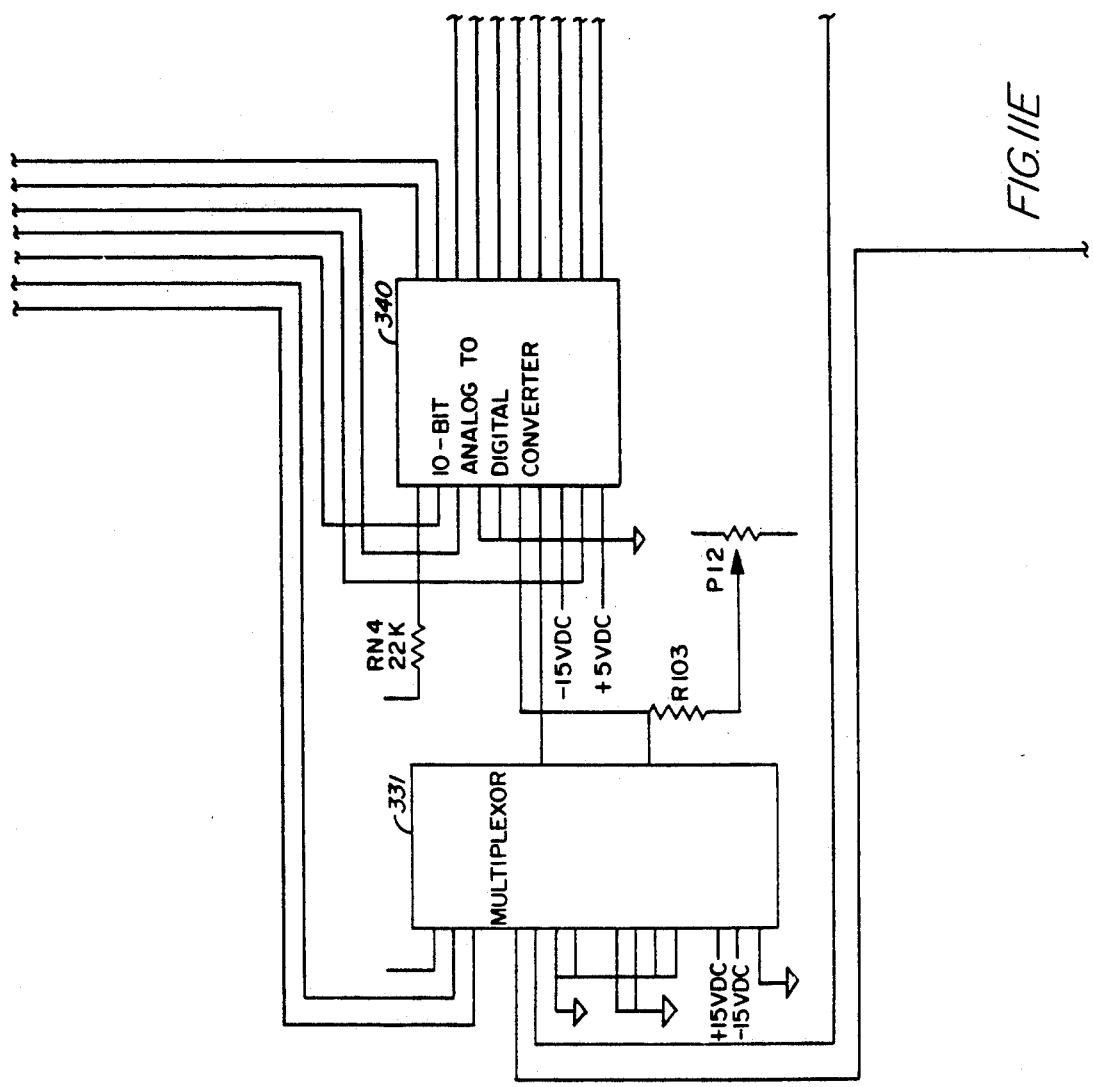
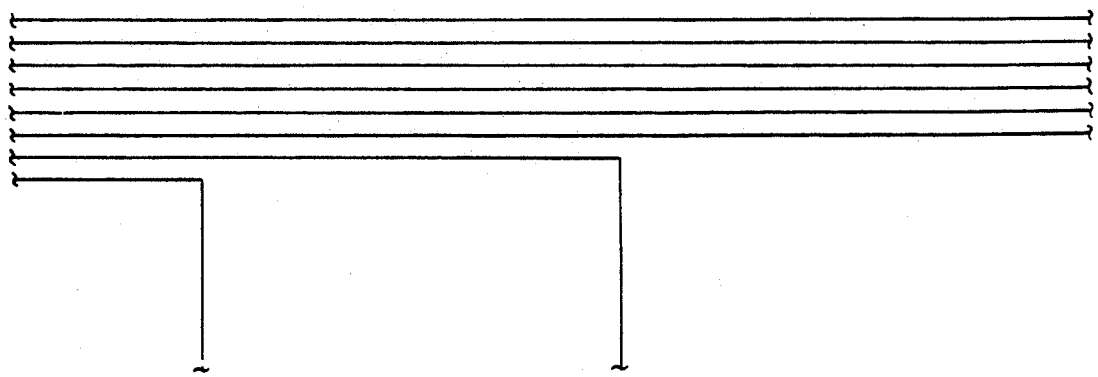
FIG.11E

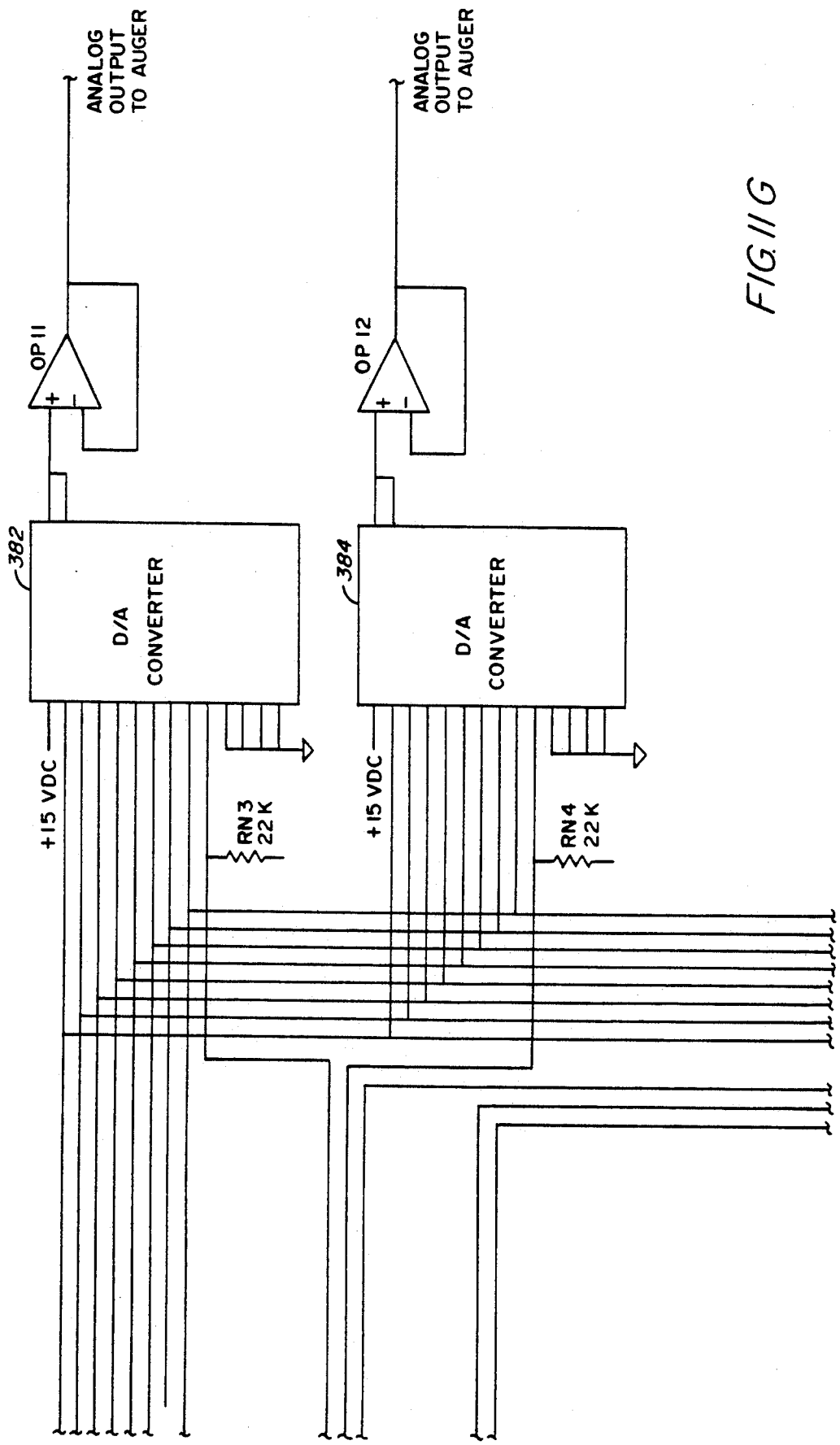

METHOD AND APPARATUS FOR AUTOMATICALLY CONTROLLING A WELL FRACTURING OPERATION

BACKGROUND OF THE INVENTION

This invention relates generally to a blender for mixing various materials with a fluid, according to a predefined ratio. More particularly, the invention relates to a blender, for use in the oil field industry, which mixes sand and chemicals with water during a well fracturing operation.

During a well fracturing operation, a high volume of water is pumped into a wellbore, and thus into the oil or gas producing formation, in order to create fissures in the formation. The fissures that are created during the well fracturing operation provide a passage through which the oil or gas may more readily flow. The water is pumped into the formation at a rate that exceeds the absorption capacity of the formation, and, as a result, cracks, or fissures, form in the formation.

After the fissures have been formed, sand is mixed with the water in a blender according to a predefined ratio, thereby increasing the density of the water. The sand is added to fill the fissures that have been created full of sand. In this manner, the fissures are held open even when the water is no longer pumped into the formation. Because the sand is porous, oil and gas may still flow through the fissures. The fluid output from the blender that is pumped into the wellbore is commonly called the "slurry."

As shown in FIG. 1, the sand is added in an increasing proportion with the water in order to provide a stepped increase in the water density. Thus, for example, after 100,000 gallons of water have been pumped into the formation, sand is mixed with the water to raise the water density to 1.10 specific gravity units ("SGU's"). After another fifty thousand gallons of the 1.10 SGU slurry has been pumped into the formation, an increased amount of sand is mixed with the water to raise the density of the slurry to 1.20 SGU. This stepped increase may continue until the operation is completed. In this manner, the amount of sand is increased based on the cumulative addition of water into the formation. This is done because the lower the amount of sand in the water (the lower the density), the further that the sand will travel in the formation. Increasing the amount of sand in this stepped fashion ensures that the outermost point of the fissures will be filled before the inner points are filled. As a result, the sand is better distributed throughout the fissured formation.

As the density of the slurry increases, and as the fissures begin to fill with sand, the pressure necessary to pump the slurry into the wellbore increases. The fracturing process is terminated when the pressure reaches a preselected level.

A plurality of chemicals may also added to the sand/water mixture in the blender according to a predefined ratio.

A number of problems arise in the prior art fracturing process. The primary problem is the difficulty in continuously maintaining the proper ratio of the sand to water and of the chemicals to water. Because the addition of sand and chemicals to the water is manually controlled, a great deal of fluctuation occurs in both the density level of the water and the proportion of the chemicals to the water. The elimination of human error would greatly increase the efficiency of the well fracturing operation. In addition, manual control of the well fracturing operation necessitates the addition of the sand in definitive steps. The fracturing process would be more efficient if the amount of sand was continuously increased as shown in FIG. 2. See Thomas M. Hopkins, "Technique Helps Extend Cotton Valley Frac", *Petroleum Engineer International,* January 1989. In such a process the sand would be continuously increased to slow the pressure increase and to provide for a better distribution of sand during the fracturing process. This type of continuous increase in slurry density is often called a ramp increase. It is virtually impossible for an operator to manually increase the proportion of sand in the water in accordance with an idealistic ramp schedule.

Yet another problem with the prior art fracturing process is that there is little or no calibration or feedback adjustment based on the actual density of the water being pumped into the well. Failure to monitor the slurry pumped into the wellbore can result in gross errors if there is a malfunction in the equipment used to deliver the sand or chemicals.

SUMMARY OF THE INVENTION

Accordingly, there is provided herein a method and apparatus for automatically controlling the addition of sand and chemicals into a blender that is used in a well fracturing operation. The automated controller of the present invention comprises a blender tub for mixing fresh water together with sand and chemicals, flow meters measuring the flow of fluid into and out of the blender tub, and a control unit regulating the flow of sand and chemicals into the blender tub based upon previously determined flow rates for the sand delivery and chemical delivery units. The control unit includes processing circuitry enabling the control unit to regulate the flow of sand into the blender tub to automatically obtain a stepped density slurry for injection into the wellbore.

The automated controller may also include a densiometer connected downstream from the blender tub to measure the actual density of the slurry being pumped into the well. The control unit may use the information from the flow meters and/or the densiometer to recalibrate the theoretical flow rate of the sand delivery unit. Similarly, flow meters may be provided to measure the actual flow of chemicals into the blender tub. The control unit then may adjust the output of the chemical delivery unit if a discrepancy is detected between expected and actual flow of the chemicals into the blender unit.

If the theoretical and actual rates differ by more than a preselected minimum value, the control unit may output a warning to the system operator.

The control unit may also include processing circuitry to enable the automated controller to provide a ramped density slurry output for injection into the wellbore.

DESCRIPTION OF THE DRAWINGS

FIG. 9 shows a detailed block diagram of the display board of FIG. 5;

FIG. 11A–11I illustrate a schematic circuit diagram of the input/output board of FIG. 7;

DETAILED DESCRIPTION OF THE PREFERRED EMBODIMENT

Figure 3:
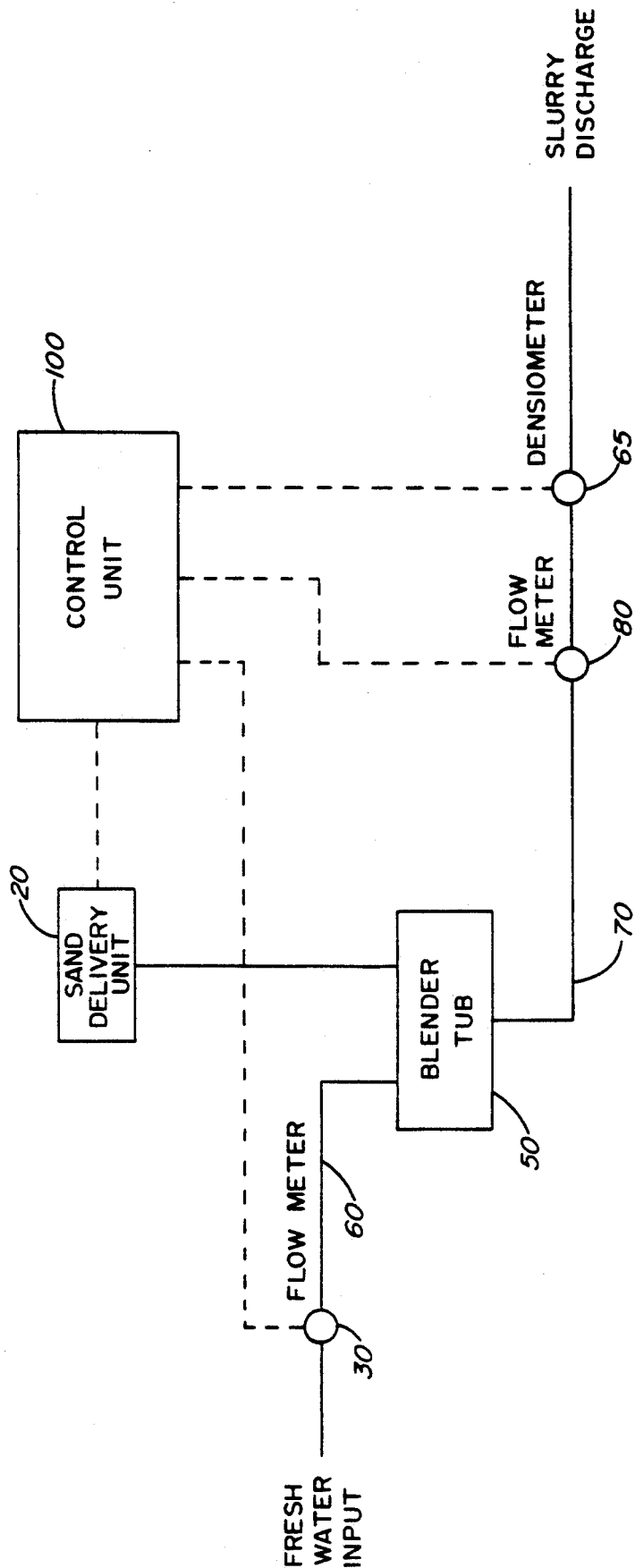
FIG. 3 shows a system block diagram of the automated density controller of the present invention.

Referring now to FIG. 3, the automated density controller constructed in accordance with the preferred embodiment of the present invention comprises a blender tub 50 for mixing water with sand and other chemicals, a fresh water input or suction line 60 providing water to the blender tub 50, a slurry discharge line 70 receiving the output from the blender tub 50, a sand delivery mechanism 20 supplying sand to the blender tub 50, a flow meter 30 on input line 60, a flow meter 80 on the slurry discharge line 70, a densiometer 65 on the slurry discharge line 70, and a control unit 100 electrically connected to the sand delivery mechanism 20, the flow meter 30, the flow meter 80, and the densiometer 65.

The blender tub 50 preferably comprises a Stewart & Stevenson MC-100-3 mixing tub. One skilled in the art will realize, however, that other blender tubs may also be used without departing from the principles of the present invention. The blender tub 5 receives fresh water through input line 60 and mixes the water with sand and chemicals to produce the desired slurry for injection into the well formation through discharge line 70.

Referring still to FIG. 3, the suction flow meter 30 preferably comprises a Hydril Series 5100. As would be evident to one skilled in the art, other flow meters may be used to provide an indication of water flowing through the input line into the blender tub 50. The flow meter 30 provides an analog output representative of the amount of instantaneous flow of water through the meter 30 into the blender tub 50.

Referring still to FIG. 3, the discharge flow meter 80 preferably comprises a Hydril Series 5100. As one skilled in the art would obviously realize, other flow meters may be used to provide an indication of slurry flowing through the discharge line. Flow meter 80 provides an analog output representative of the amount of slurry discharged from blender tub 50, which is injected into the well formation according to well known techniques.

Densiometer 65 preferably comprises a densiometer made by Texas Nuclear Co. and marketed as Model No. SGO-2. The densiometer 65 provides an analog output representative of the density of the slurry fluid flowing through discharge line 70.

Figure 13:
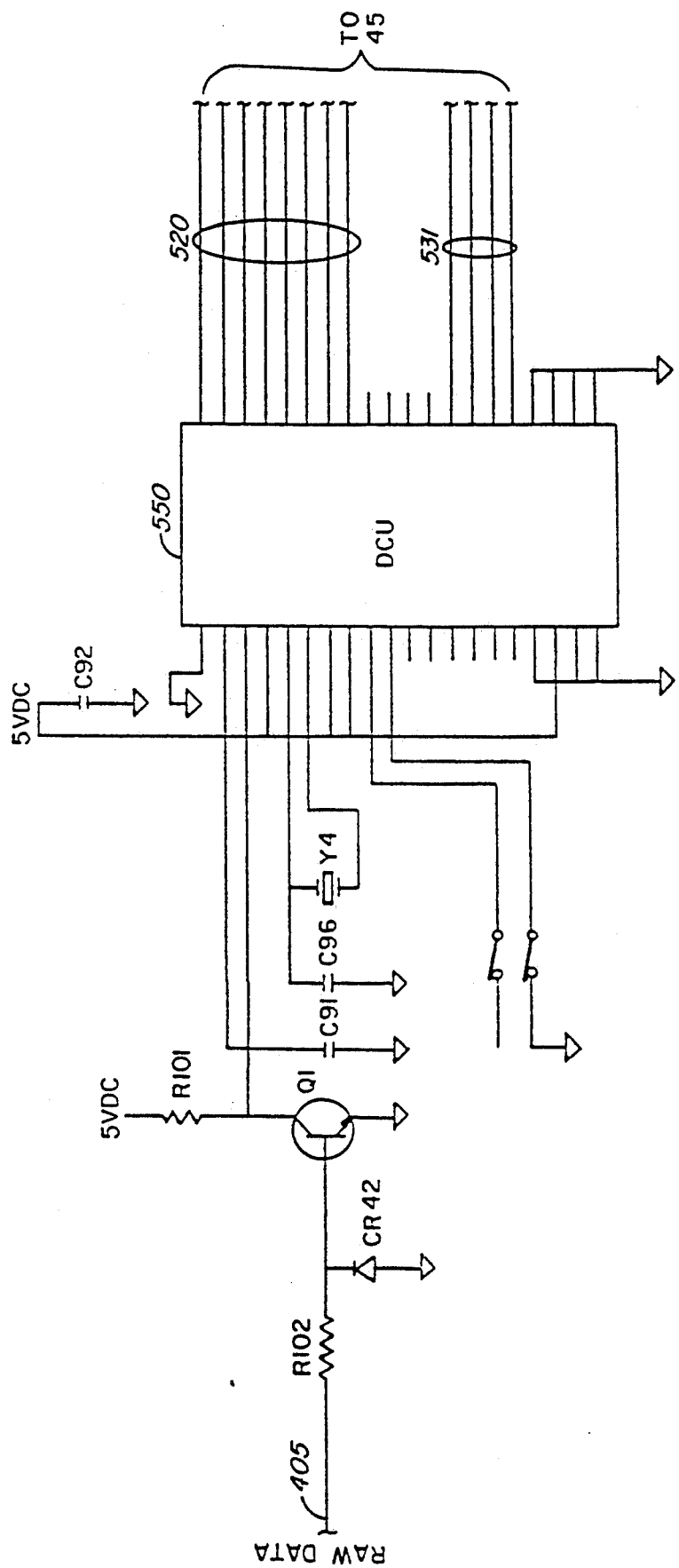
FIG. 13 illustrates a schematic circuit diagram of the display board of FIG. 8.
Figure 14:
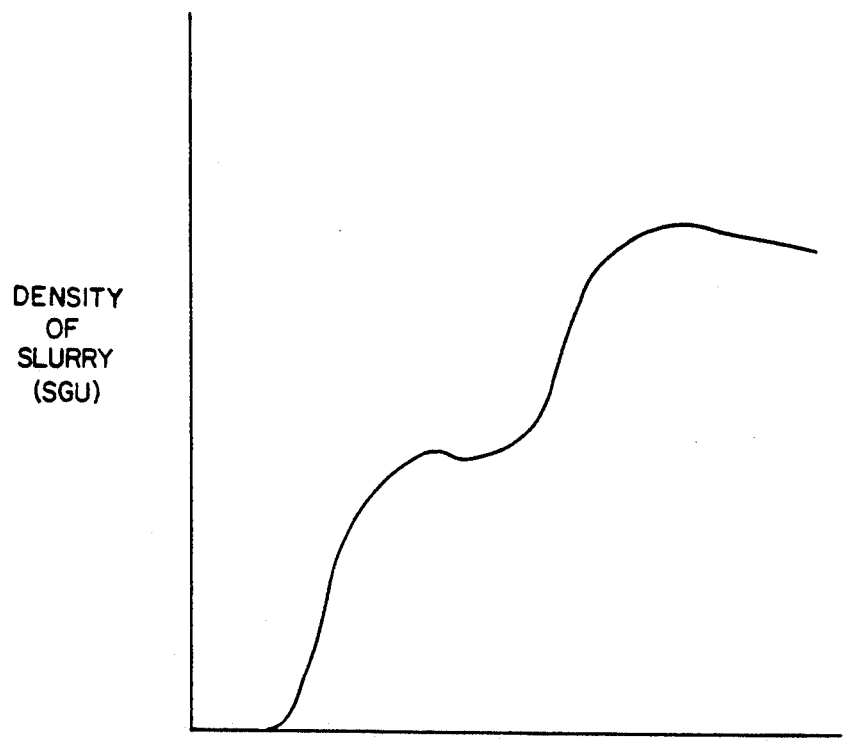
FIG. 14 is a graphical depiction of the theoretical sand delivery rate

Referring still to FIG. 3, the sand delivery mechanism 20 preferably comprises a plurality of augers for delivering sand to the blender tub 50. Alternatively, a knife-gate or other means may be used for delivering sand. In the preferred embodiment, three augers are provided. Because the volume of fluid entering and leaving the blender tub 50 is known, the density of the slurry may be calculated once the amount of sand delivered to the blender tub is determined. According to conventional techniques, the auger 20 delivers a quantity of sand which may be calculated based upon the revolutions per minute (rpm) of the auger unit. Consequently, as shown in FIG. 13, the density of the slurry may be determined based upon the rpm at which the auger unit 20 is operating. The information in FIG. 13 may be obtained through tests or by appropriate specification sheets.

A sand delivery rate look-up table, is derived, which relates the quantity of sand delivered at each rpm value of the auger unit 20. The look-up table thus specifies the amount of sand which the auger unit 20 will deliver when operating at a given rpm value. The look-up table may be derived either from quantitative testing or from the specifications of the auger unit 20. The sand delivery rate look-up table then is programmed into the central unit 100 for use during a fracturing operation.

Figure 4:
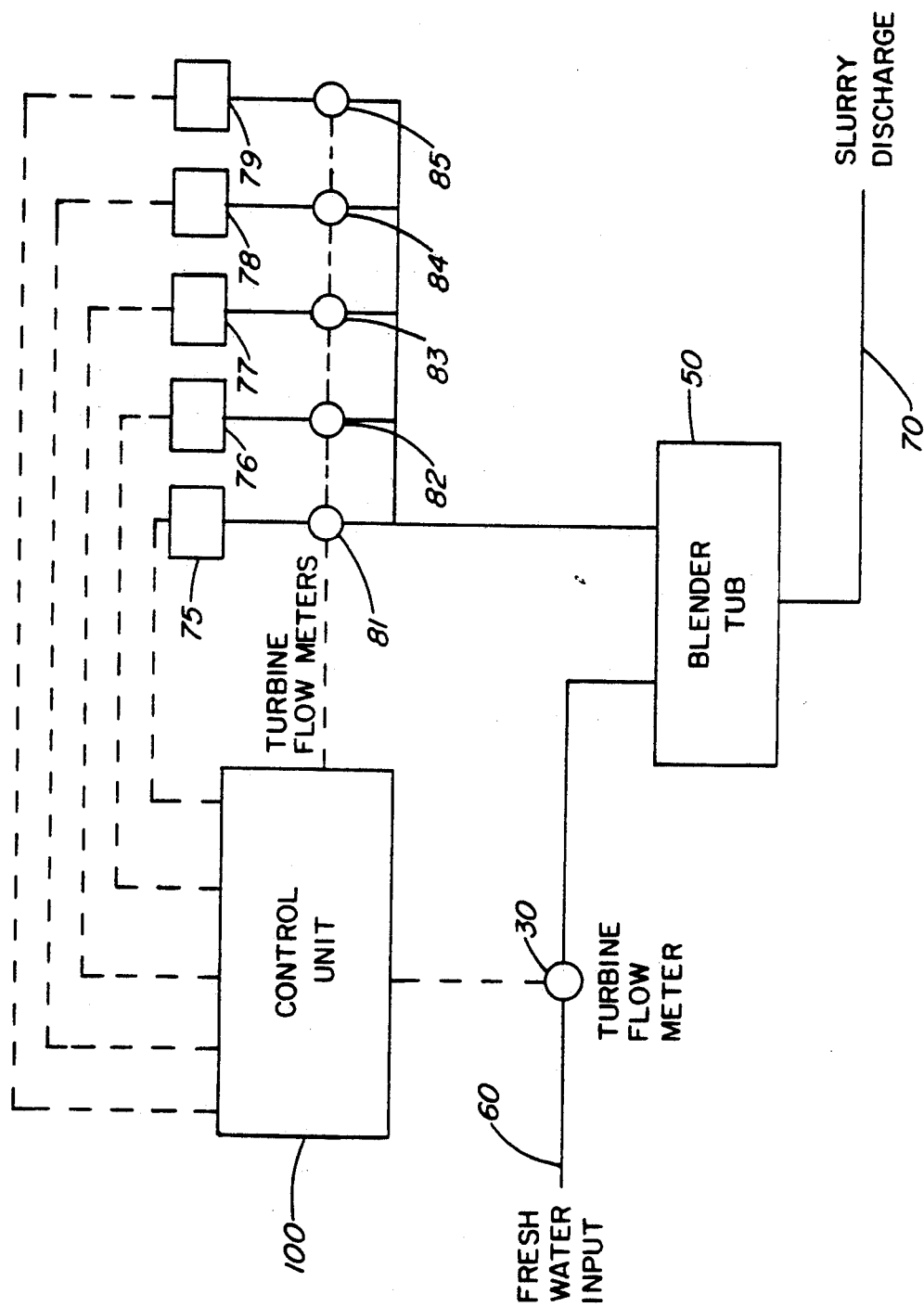
FIG. 4 shows a system block diagram of the automated chemical controller of the present invention.

Referring now to FIG. 4, the automated chemical controller constructed in accordance with the preferred embodiment of the present invention includes the blender tub 50, the fresh water input line 60, slurry discharge line 70, flow meter 30 on input line 60, a plurality of chemical additive units 75, 76, 77, 79 and 79 a plurality of flow meters 81, 82, 83, 84, 85 and the control unit 100. In the preferred embodiment, the automated density controller of FIG. 3 and the automated chemical controller of FIG. 4 utilize the same blender tub 50, input line 60, slurry discharge line 70, input (or suction) flow meter 30 and control unit 100. One skilled in the art will realize, however, that the density controller and the chemical controller may comprise separate units and may be sold independently.

Referring still to FIG. 4, a plurality of chemical tanks 75, 76, 77 79 and 79 are used to store the chemicals that are added to the water in blender tub 50 during a fracturing operation. Flow meters 81, 82, 83, 84 and 85, preferably comprising Haliburton Model No. 458-00-38, are connected between tanks 75, 76, 77, 79 and 79 and blender tub 50 so that one flow meter is particularly associated with one tank, and thus one chemical. Flow meters 81, 82, 83, 84 and 85 provide electrical inputs to the central control unit 100. Similarly, the input (or suction) flow meter 30 also provides an electrical input to the central control unit 100.

Control unit 100 includes a plurality of electrical outputs connected to chemical tanks 75, 76, 77, 79, and 79. One output is associated with each tank.

Referring now to FIGS. 5, 6, 7, 8 and 9, the central control unit 100 of the automated density and chemical controllers constructed in accordance with the preferred embodiment includes four circuit boards 200, 300, 400, 500 on which the electrical processing circuitry of the present invention is contained, and an LCD display 45. The circuit boards include a power supply board 200, an analog input/output board 300, CPU board 400 and a display board 500.

Figure 5:
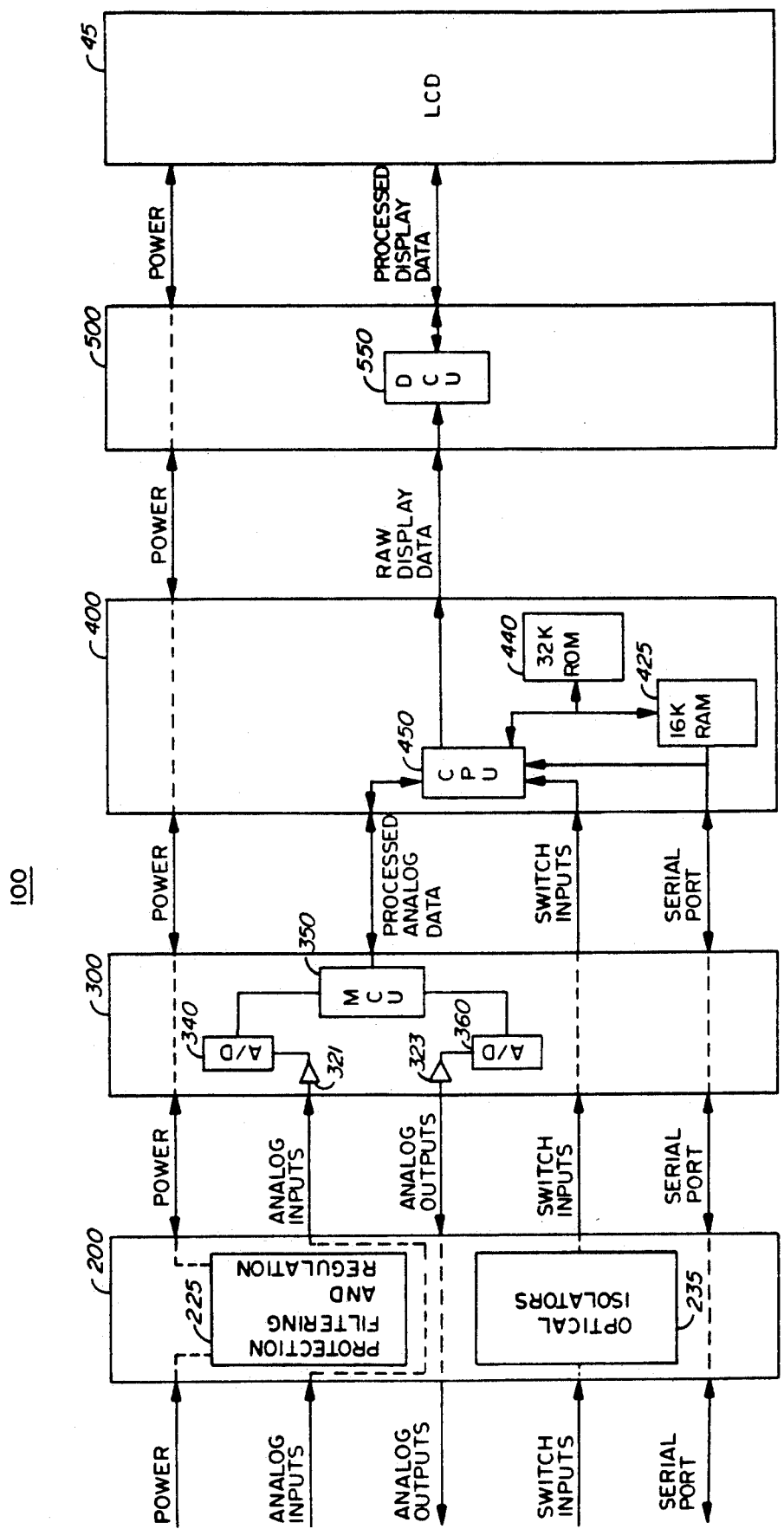
FIG. 5 illustrates a general block diagram of the automatic density controller of FIG. 3.
Figure 6:
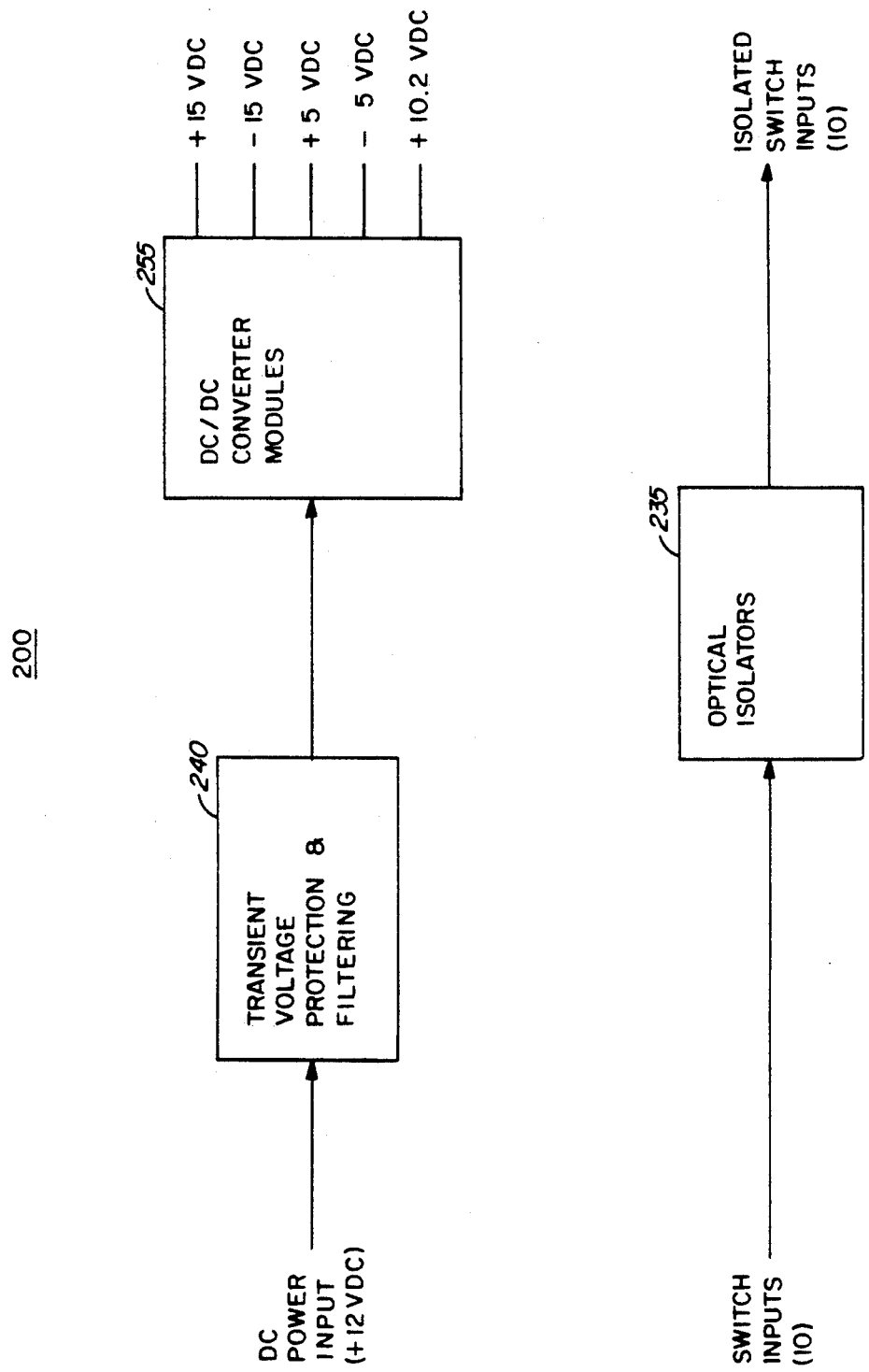
FIG. 6 depicts a detailed block diagram of the power supply board of FIG. 5.

Referring now to FIGS. 5 and 6, the power supply board 200 preferably includes a protection filter and regulator 225 and a plurality of optical isolators 235 for isolating switch inputs from the operator panel (not shown).

The protection filter and regulator 225 includes a transient voltage protector and filter 240, which protects against power surges, and a DC to DC converter 255 electrically connected to the protector and filter 240. Power is provided to the transient voltage protector and filter 240 at 12 VDC and is converted by the converter 255 to provide outputs of +15 VDC, −15 VDC, +5 VDC, −5 VDC and 10.2 VDC (used for backlighting of the LCD display).

Figure 10A:
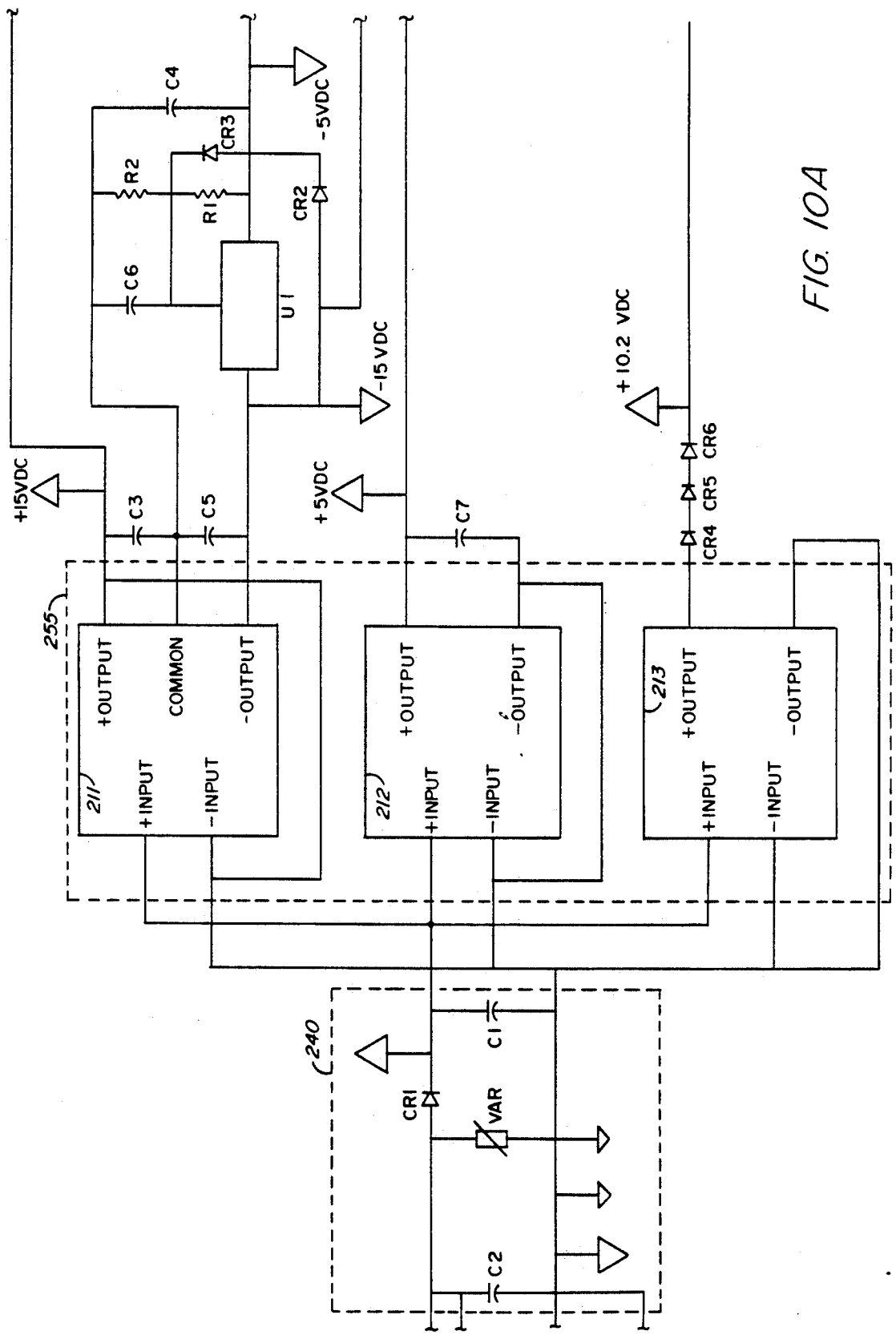
FIG. 10A–10C illustrate a schematic circuit diagram of the power supply board of FIG. 6.
Figure 10B:
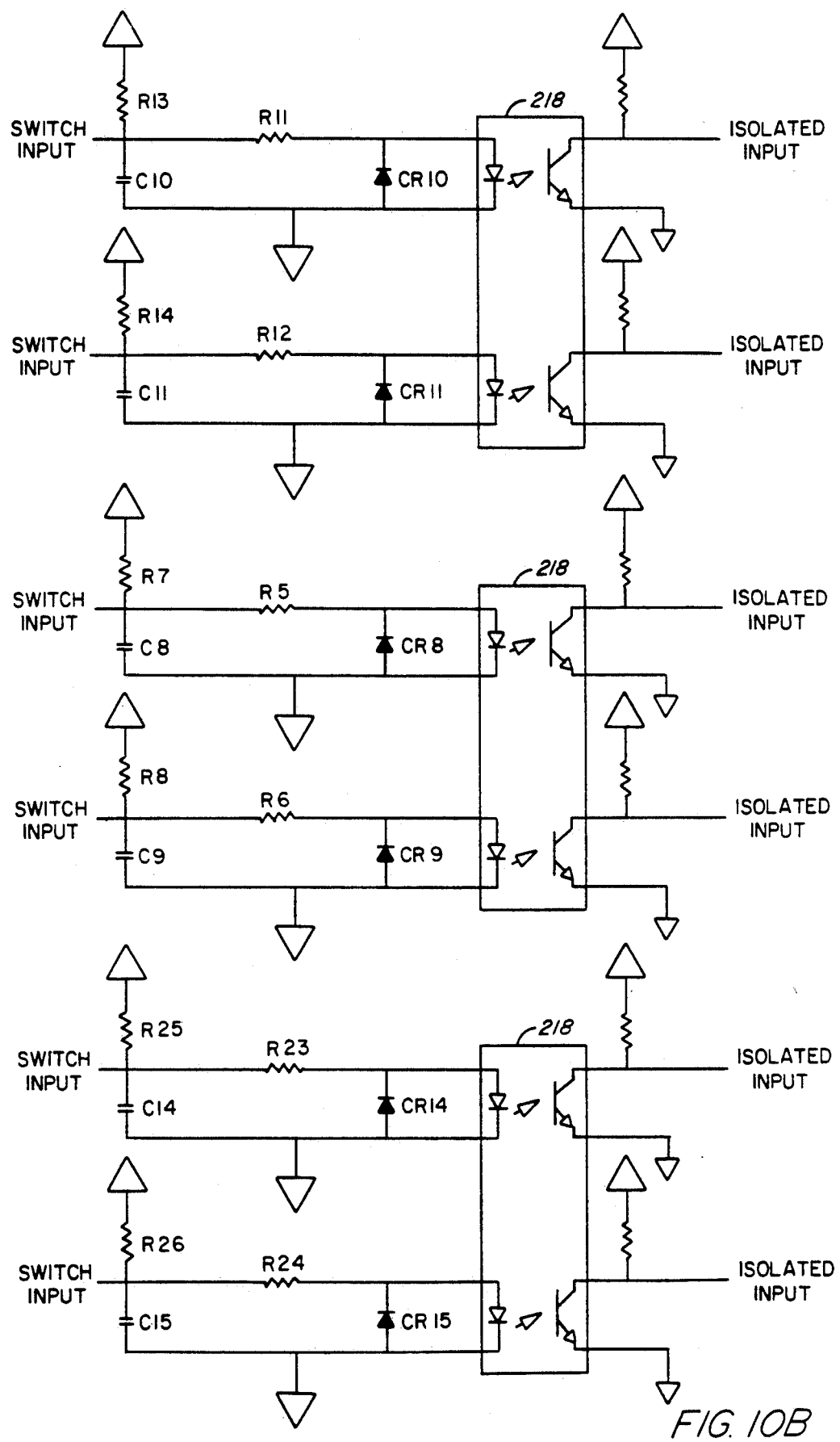
Figure 10C:
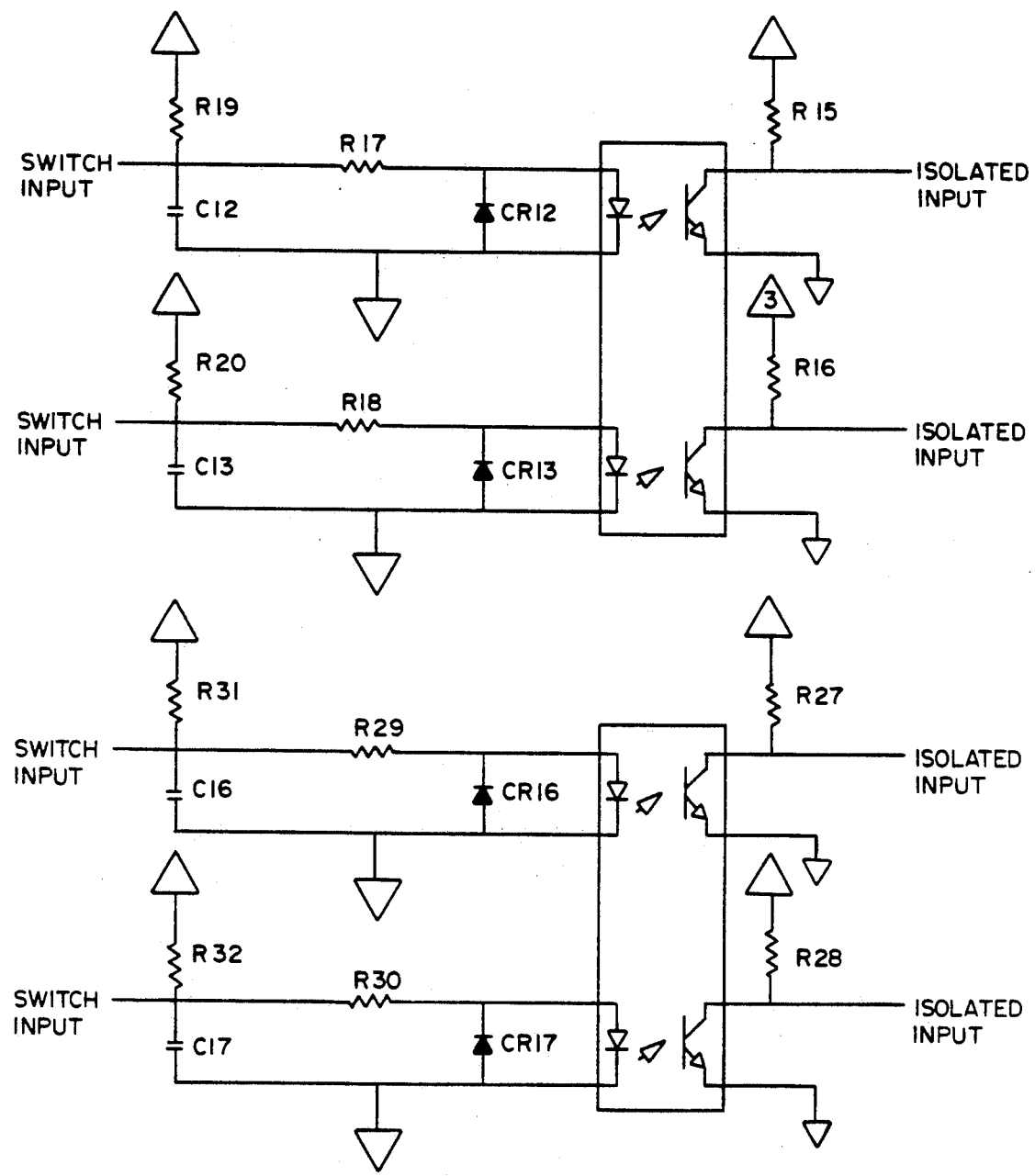
Figure 11A:
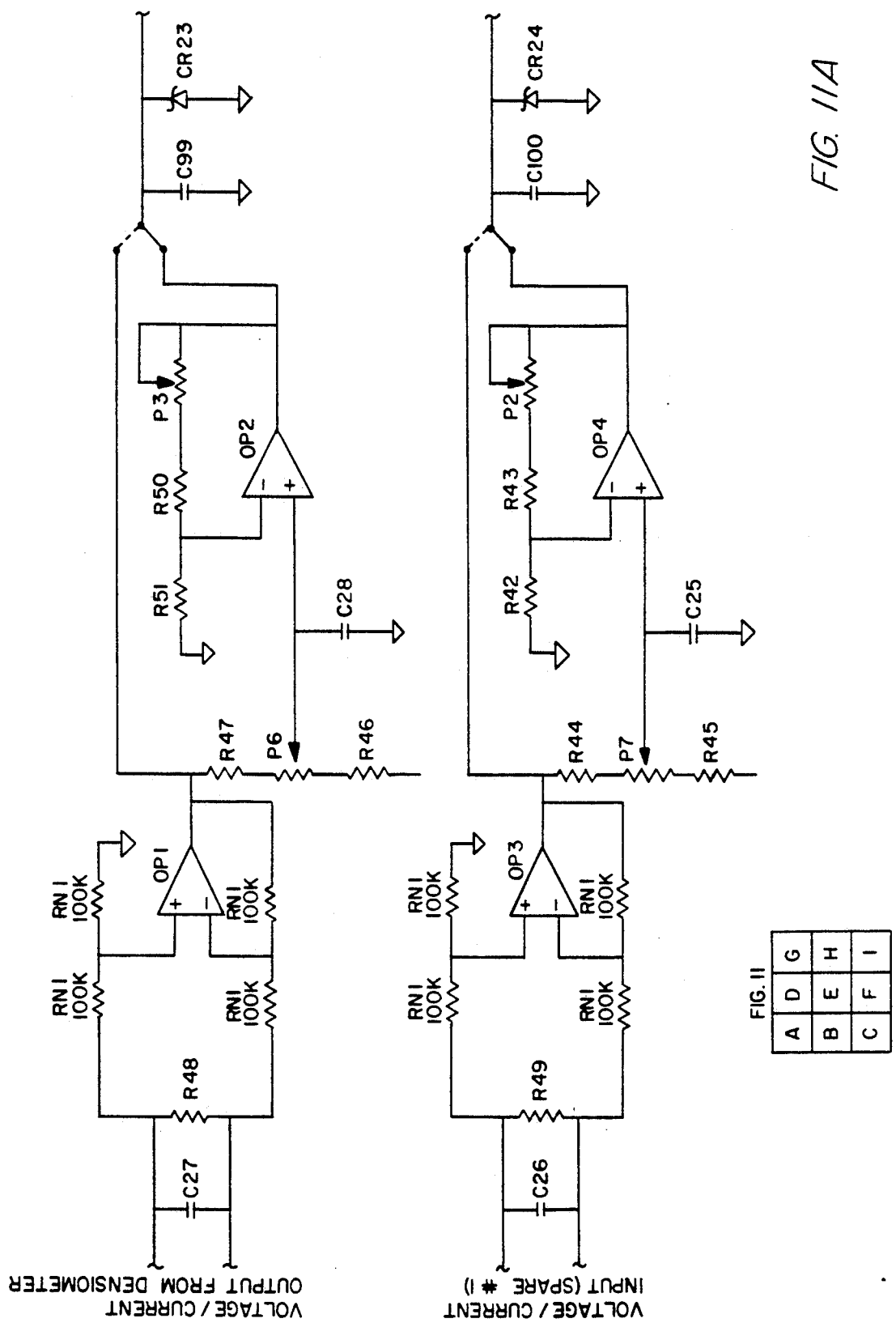
Figure 11B:
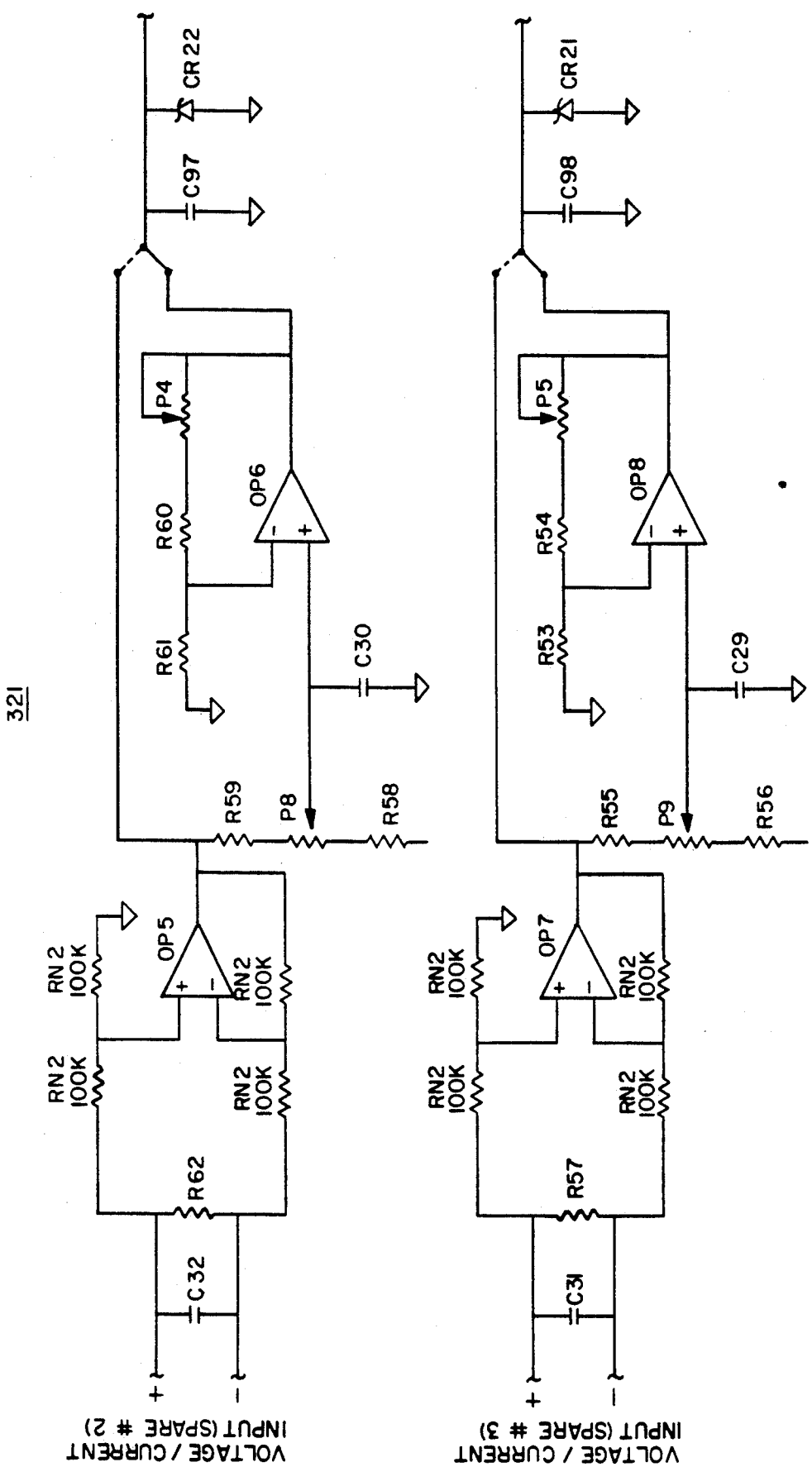
Figure 11D:
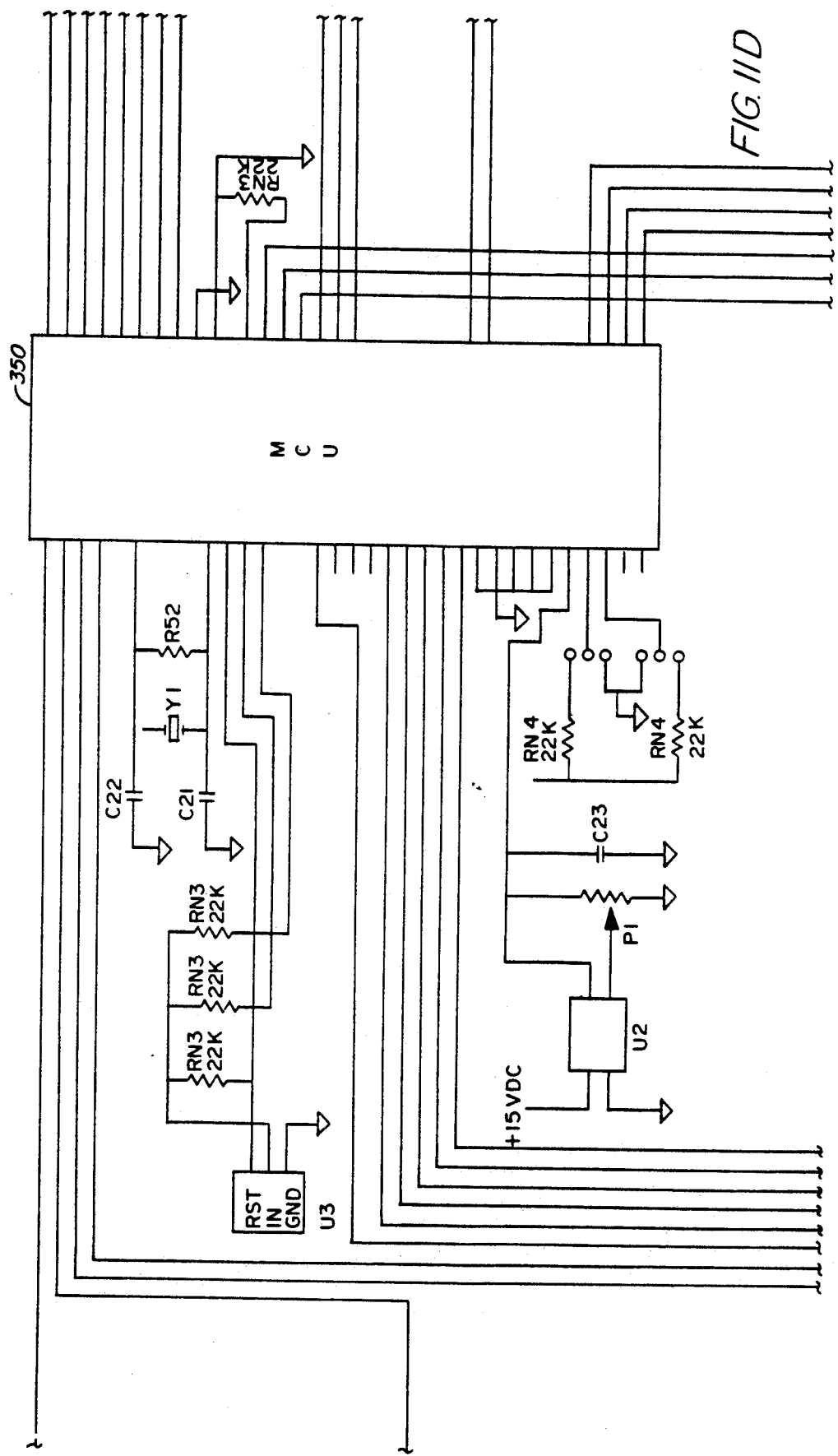
Figure 11F:
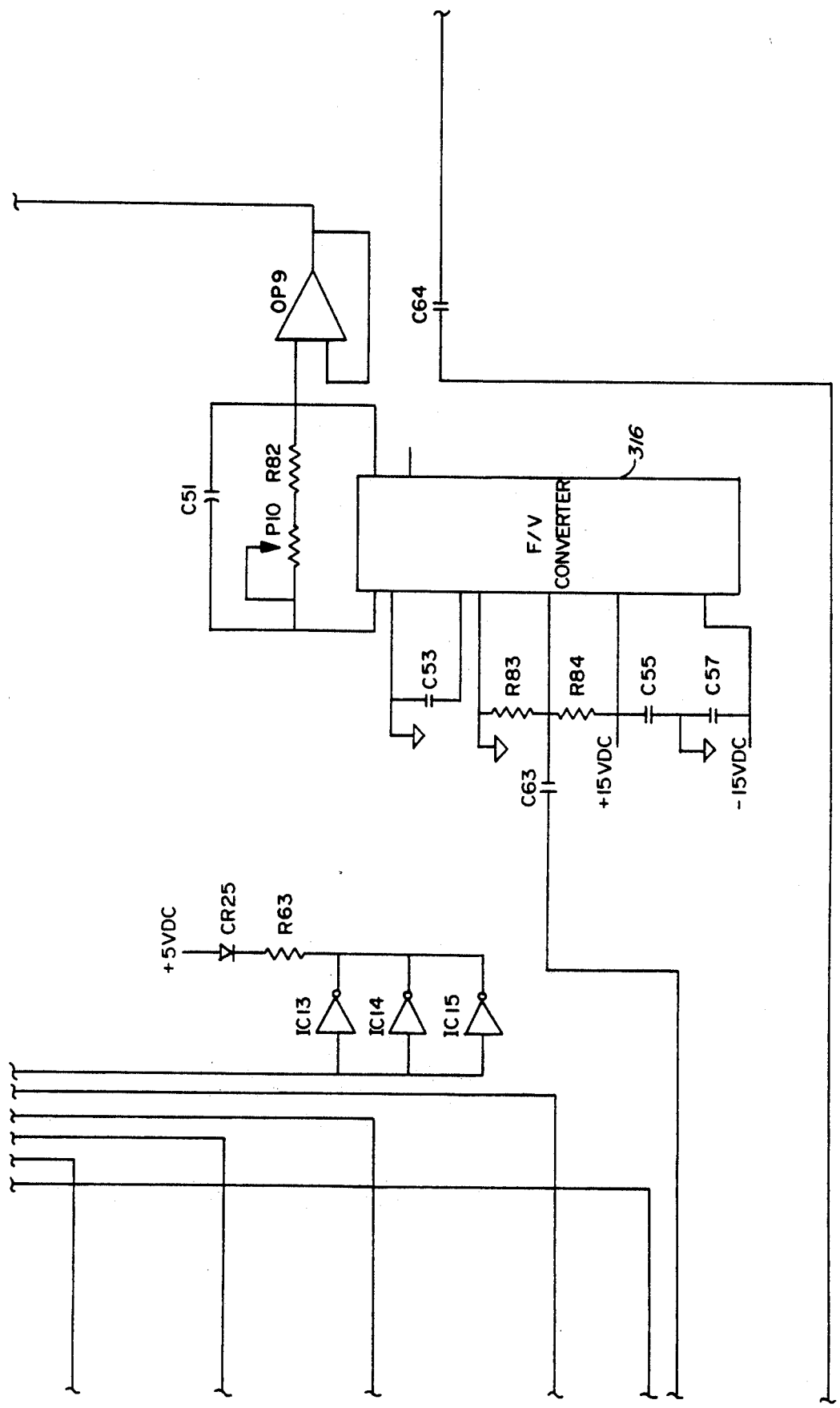
Figure 11H:
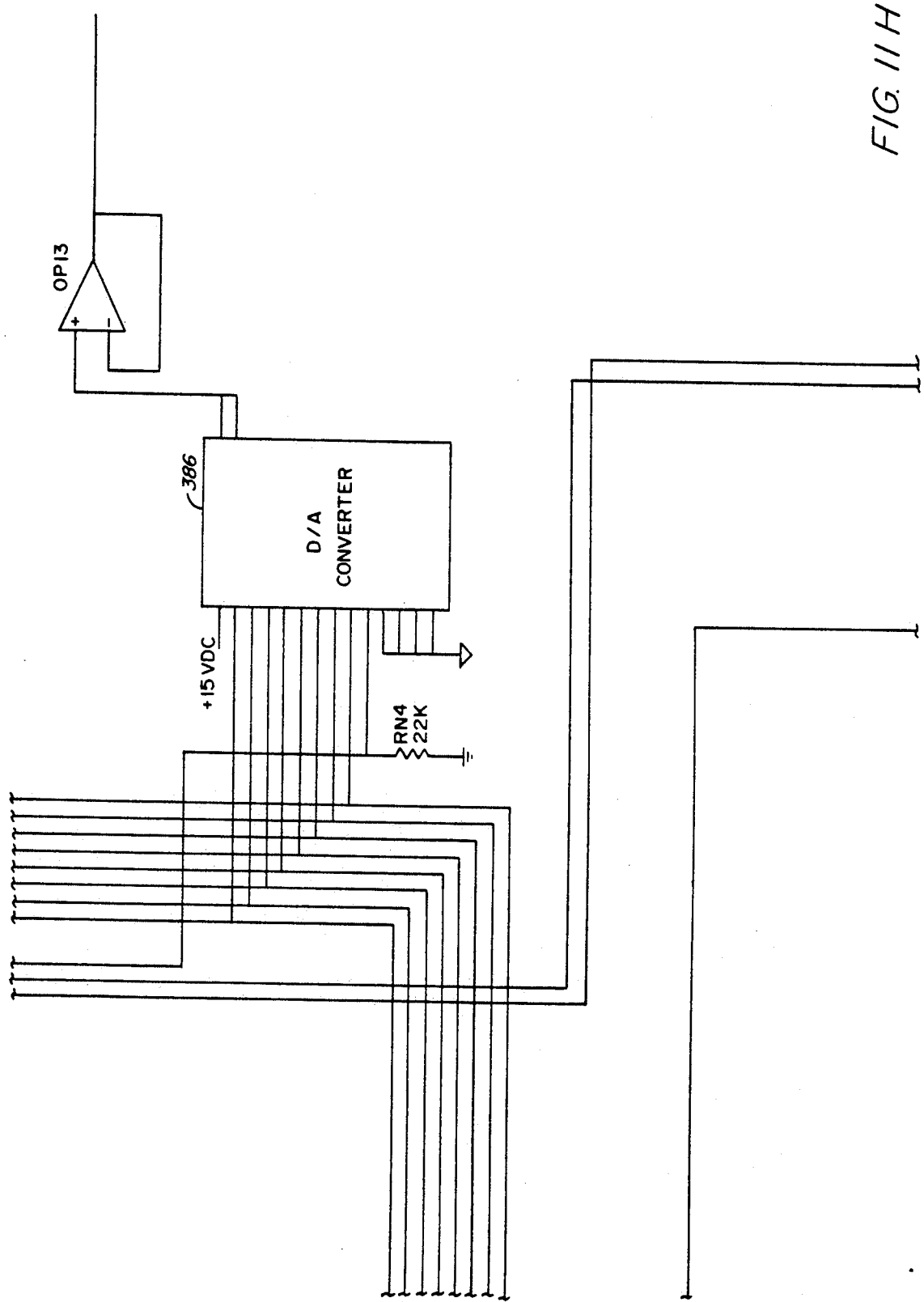
Figure 111:
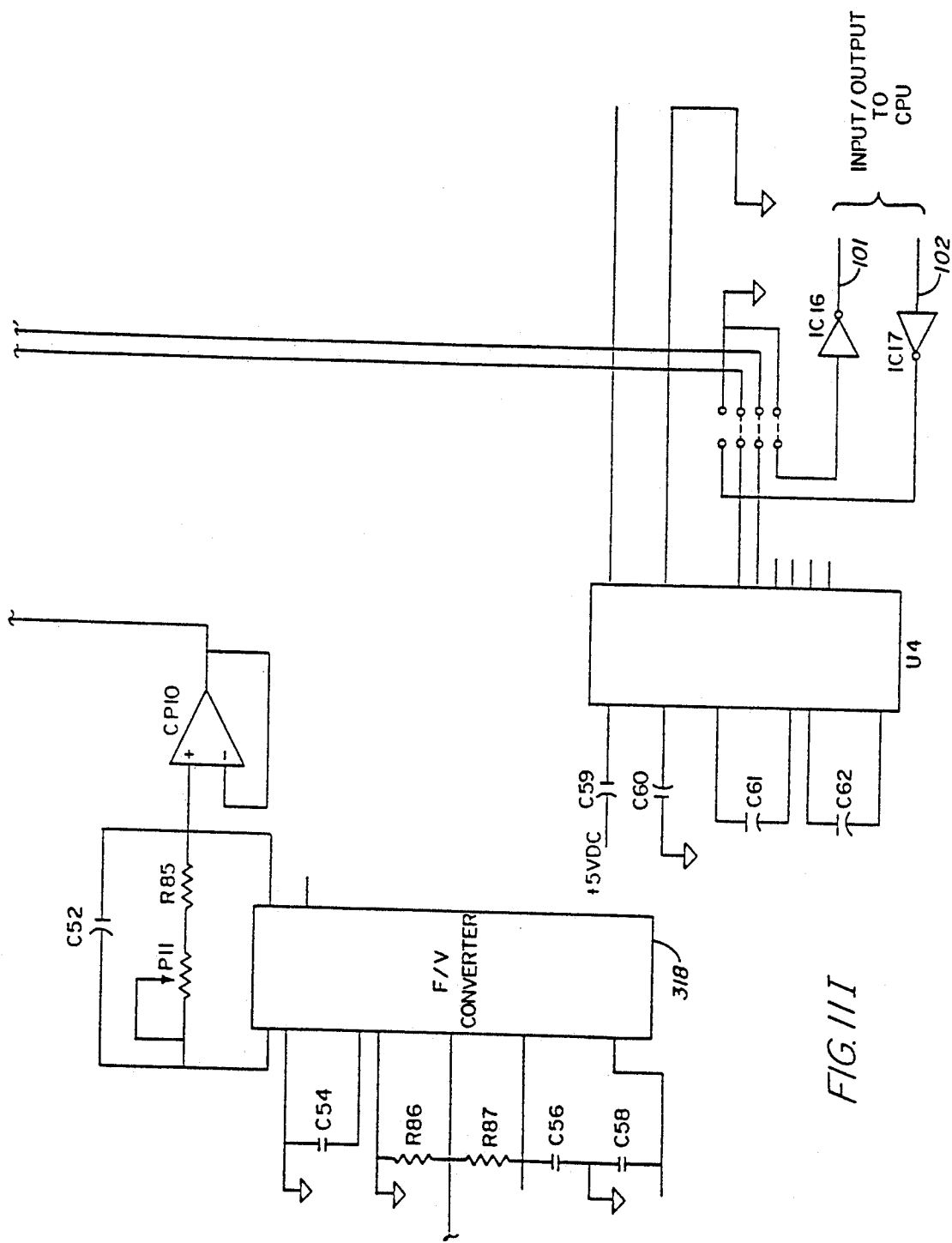
Figure 12A:
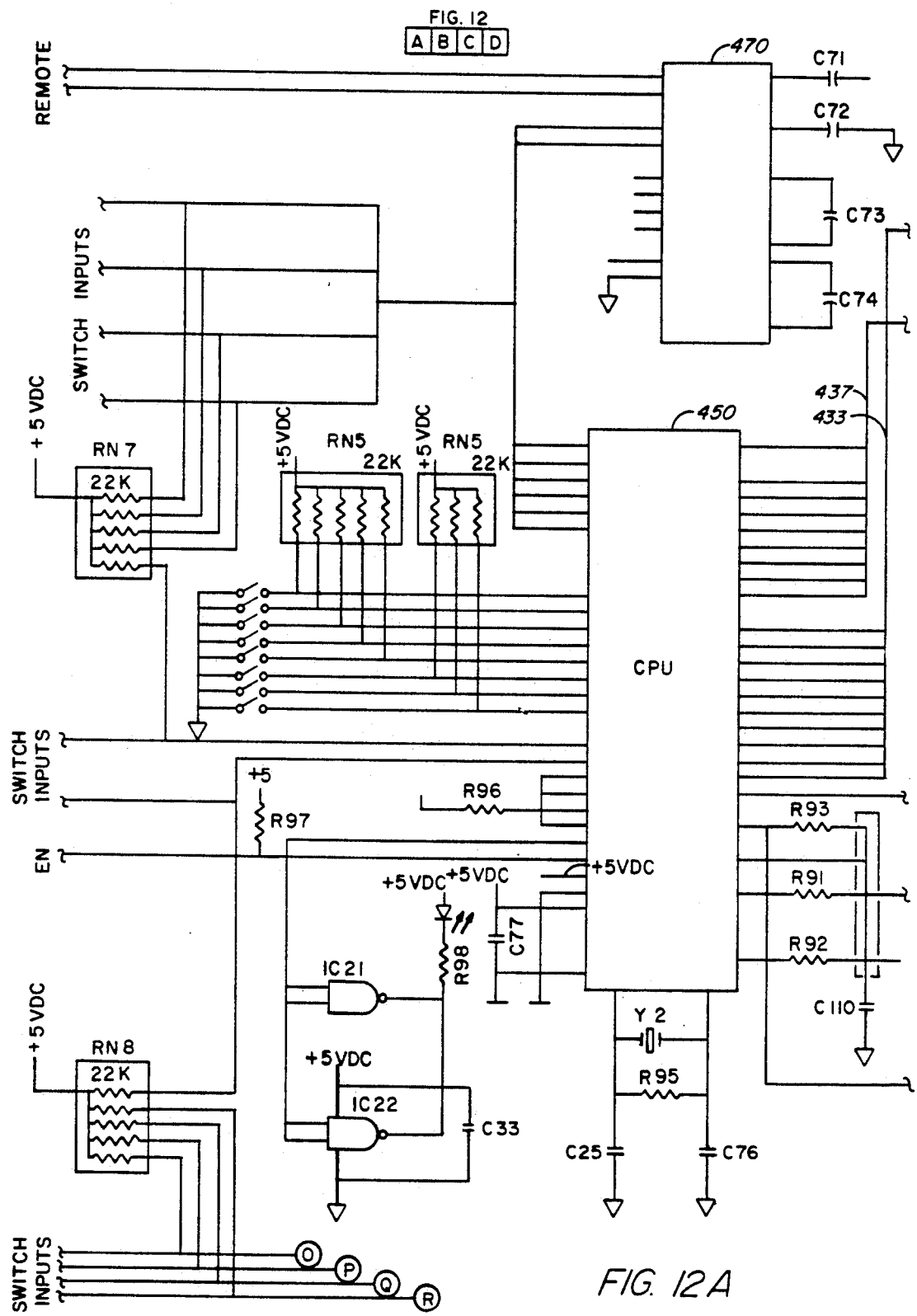
FIG. 12A–12D illustrate a schematic circuit diagram of the central processing board of FIG. 8.
Figure 12B:
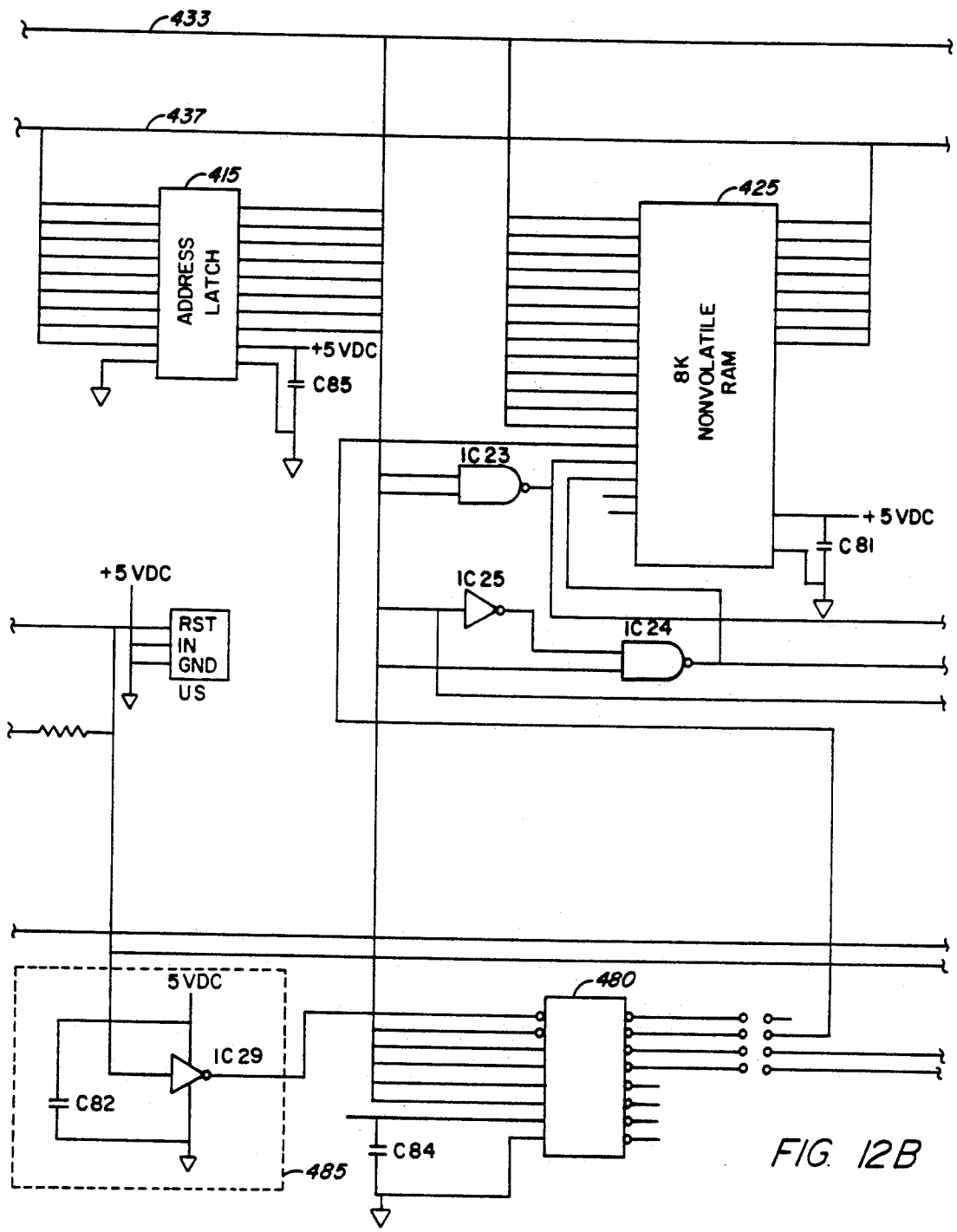
Figure 12C:
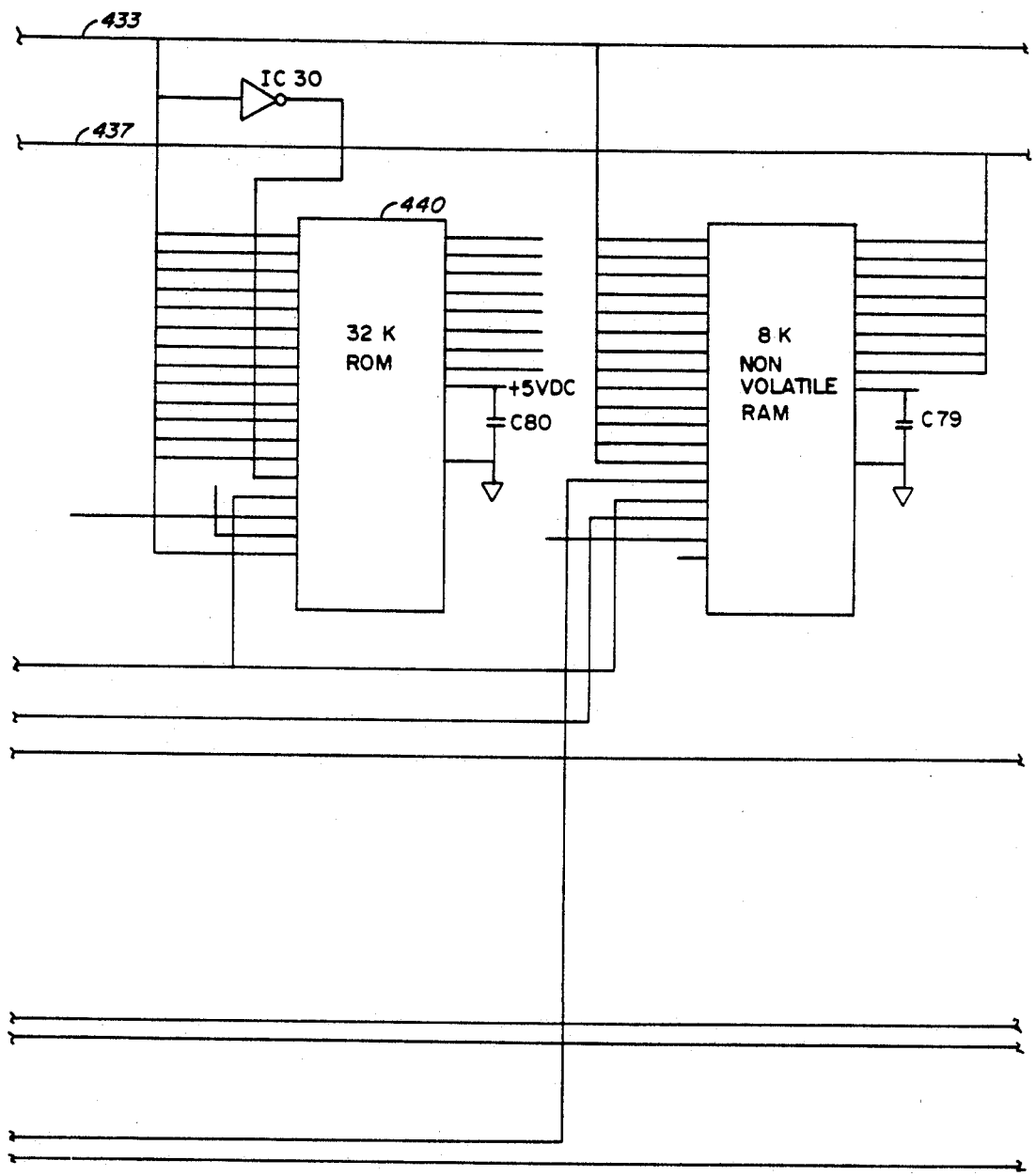
Figure 12D:
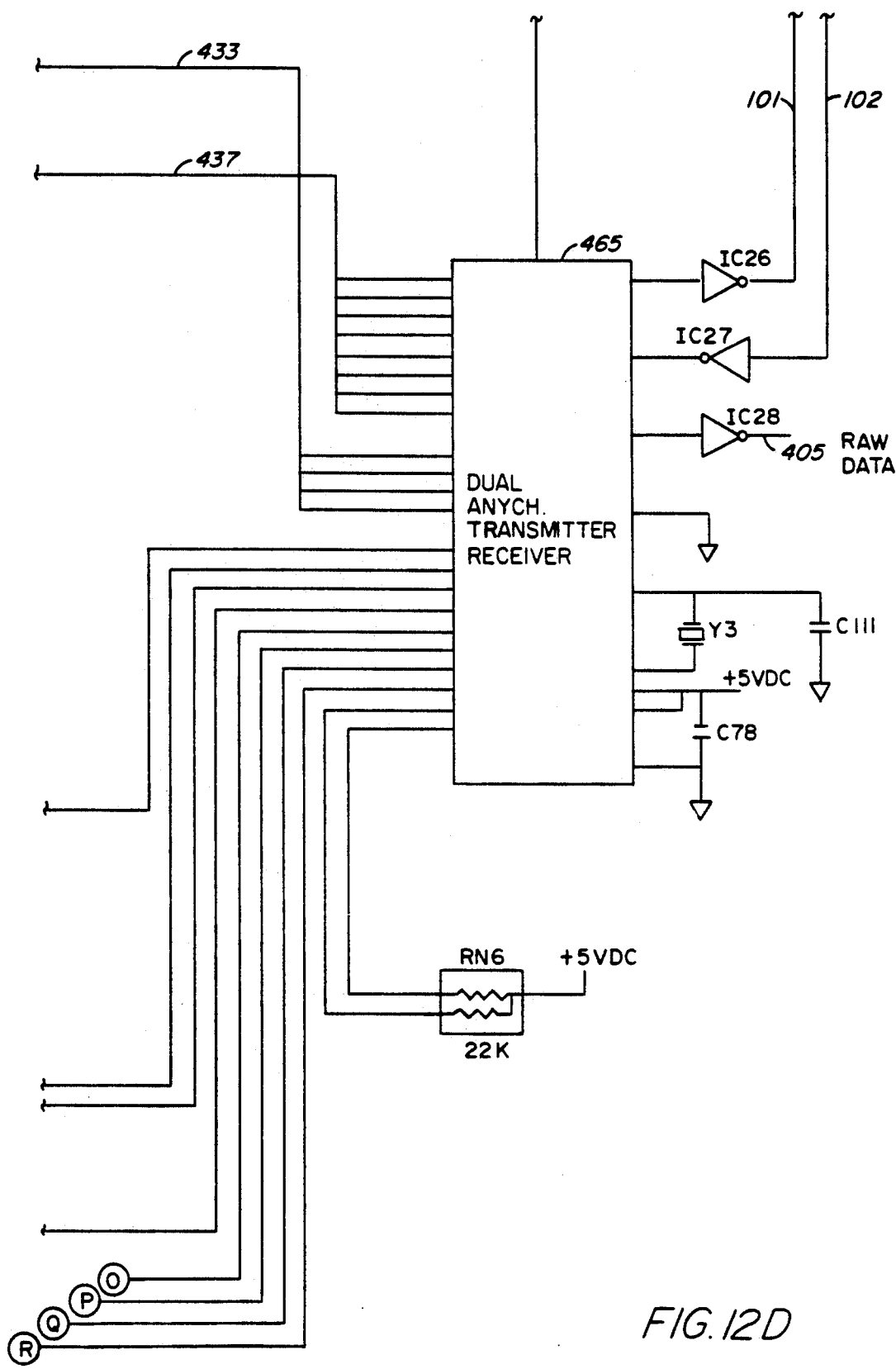

The preferred schematic circuit diagram of the power supply circuit board 200 is shown in FIGS. 10A, 10B and 10C. FIG. 10A depicts the protection filter and regulator 225 of FIG. 5, while FIGS. 10B and 10C illustrate the preferred circuitry for the optical isolator 235.

Referring now to FIGS. 5, 6 and 10A, a power source of 12 volt DC connects to the power supply circuit board 200 at the transient voltage protector and filter 240. The protector and filter 240 removes voltage surges from the extraneous voltage source to protect the circuitry of the controller.

The DC-to-DC converter 255 preferably comprises three converter modules 211, 212, 213. The voltage protector and filter 240 connects electrically to the DC-to-DC converter modules 211, 212, 213. DC converter module 211 receives the DC output from the protector and filter 240 and produces outputs of −5 VDC, +15 VDC and −15 VDC. Similarly, converter module 212 receives as a DC input the output from the protector and filter 240 and produces an output of 5 VDC. Converter module 213 receives the DC output from the protector and filter 240 and produces an output of +10.2 VDC.

The five DC outputs from the converter modules 211, 212, 213 supply power to the other circuit elements of the controller.

Referring now to FIGS. 5, 6, 10B and 10C, switch inputs from the operator control panel (not shown), are input to the power supply board 200. The signals from the switch inputs are optically isolated by conventional photo-transistors 218, as shown schematically in FIG. 10B and 10C. The optically isolated signals then are supplied to the CPU board 400 and serve to define the parameters of the fracturing operation.

Figure 7:
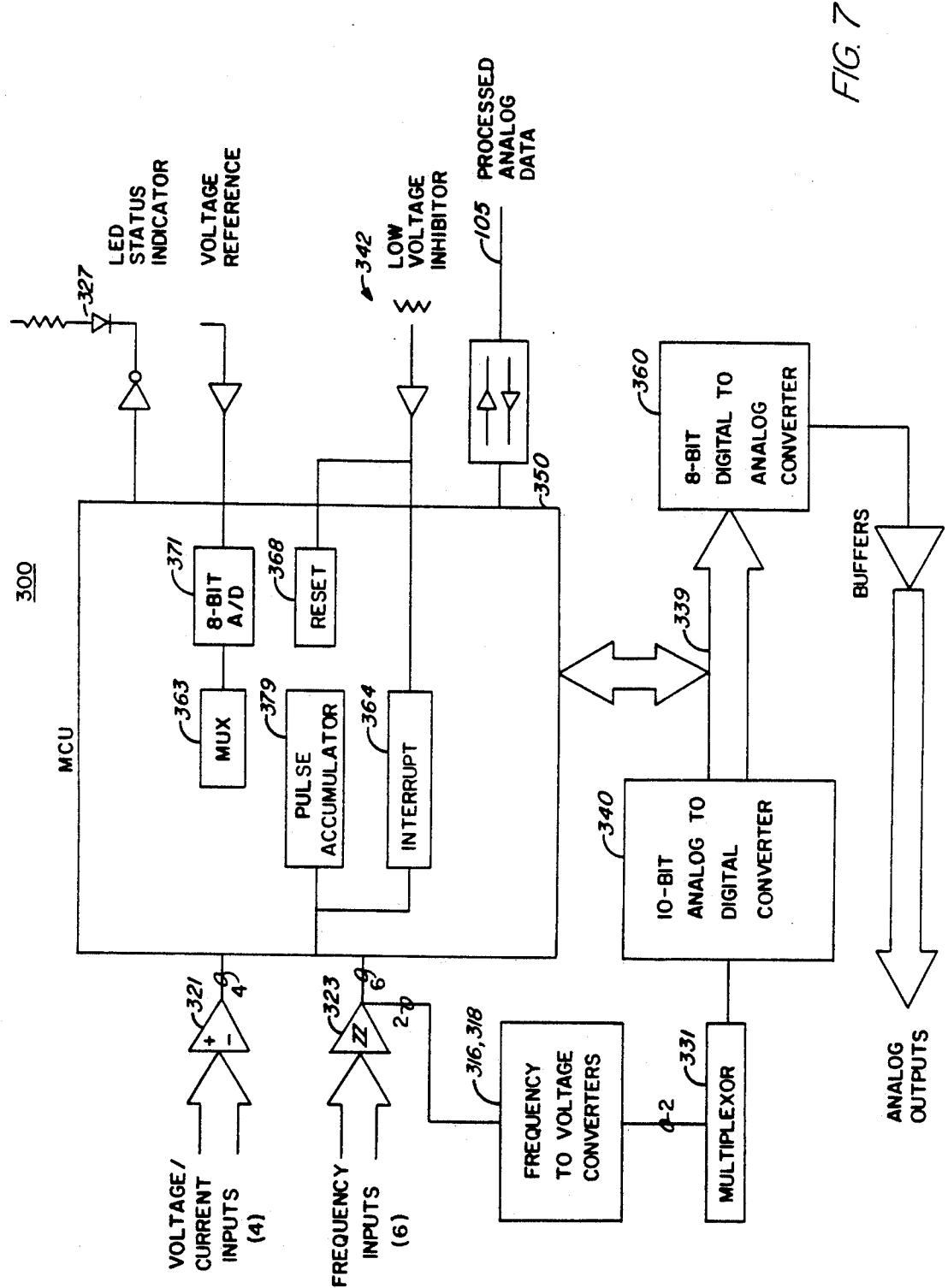
FIG. 7 shows a detailed block diagram of the analog input/output board of FIG. 5.

Referring now to FIGS. 5, 7 and 11, the analog input/output board 300 constructed in accordance with the preferred embodiment comprises signal input buffers 321, 323, analog-to-digital converter 340, digital-to-analog converter 360, frequency-to-voltage converter 316, 318 and analog board master control unit 350.

Referring now to FIGS. 3, 5 and 7, the analog outputs from the flow meters 30, 80, densiometer 65 and sand delivery unit 20 (which is preferably a plurality of augers) are supplied to the analog input/output board 300. The analog inputs received of the analog board 300 include two basic forms: the sand augers and flow meters preferably provide frequency inputs while the densiometer preferably provides a voltage/current input.

As shown in FIGS. 7 and 11, the voltage/current inputs from the densiometer 65 (and other possible sources) connect electrically to a conventional differential amplifier 321. In the preferred electrical schematic embodiment, four voltage/current inputs are available so four corresponding differential amplifiers 321 ar provided.

Referring still to FIGS. 7 and 11, the frequency inputs from the sand augers, and suction and discharge flow meters connect electrically to Schmitt trigger buffers 323. In the preferred embodiment, six frequency inputs are available so six different Schmitt triggers 323 are provided.

The output of the Schmitt triggers 323 are all connected electrically to the master control unit 350. In addition, the output from he Schmitt triggers 323, which receive inputs from the suction and discharge flow meters, also are connected electrically to frequency-to-voltage converters. Two frequency-to-voltage converters 316, 318 are provided, with one frequency to voltage converter connected to the Schmitt trigger output of each flow meter.

Referring still to FIGS. 7 and 11, the master control unit 350 preferably comprises a Motorola microprocessor model no. 68HC811E2 and includes an internal multiplexer 363, analog-to-digital converter 371 and pulse accumulator 379. An LED 327 connects electrically to the master control unit 350 and indicates whether the control unit is operating properly. In addition, master control unit 350 connects to a low voltage inhibitor 342, which detects an abnormally low supply voltage. When a low voltage is detected by inhibitor 342, inhibitor 342 transmits a pulse to the master control unit interrupt 364 and to the control unit reset 368. The reset 368 resets the master control unit 350 while interrupt 364 halts the operation of the microprocessor so that the contents of the master control unit 350 can be archived according to conventional techniques.

Multiplexer 363 receives the buffered output of the densiometer from the appropriate Schmitt trigger, as well as the outputs of the other Schmitt triggers, and provides the information to the internal analog-to-digital converter 371. The converted digital information is stored in the master control unit 350 until requested by the expanded CPU board 400.

Pulse accumulator 379 receives as inputs the frequency outputs of the augers and flow meters after those outputs are buffered by the appropriate Schmitt triggers. The pulse accumulator 379 keeps a running total of the frequency outputs. As a result, the total volume of water through the suction flow meter 30, and the total volume of slurry through the discharge flow meter 80 can be obtained by accessing the representative totals in the pulse accumulator 379. The accumulator 379 transmits the accumulated totals to the expanded CPU board 400 upon request.

Referring still to FIGS. 7 and 11, the master control unit 350 transmits and receives signals to and from the CPU board 400 along transmission lines 101, 102 (represented as line 105 in FIGS. 5, 7 and 87).

As mentioned supra, the frequency-to-voltage converters 316, 318 receive the outputs from the suction flow meter 30 and discharge flow meter 80 after the output is buffered by the appropriate Schmitt triggers 323. The frequency-to-voltage converters 316, 318 transmit an analog voltage output to the analog-to-digital converter 340 through a multiplexer 331.

The analog-to-digital converter 340 receives the analog voltage signal from the multiplexer 331 and provides a ten (10) bit digital output representative of the input analog voltage signal. Referring still to FIGS. 7 and 11, a ten line data bus 339 electrically connects digital-to-analog converter 360 to the ten outputs from the analog to digital convertor 340. The data bus 339 transmits and receives signals to and from the master control unit 350. In addition, the data bus 339 provides an eight bit input to the digital to analog converter 360 from both the master control unit 350 and analog to digital converter 340.

The digital to analog converter 360 preferably comprises three separate digital to analog converters 382, 384, 386, all of which are connected electrically to the data bus 339. One of the converters 382, 384, 386 corresponds to one of the three auger; thus, the analog outputs from the three digital to analog converters 382, 384 and 386 control the operation of the three auger units. The analog outputs from the digital to analog converters 382, 384, 386 electrically connect to buffers 391, 393, 395.

Figure 8:
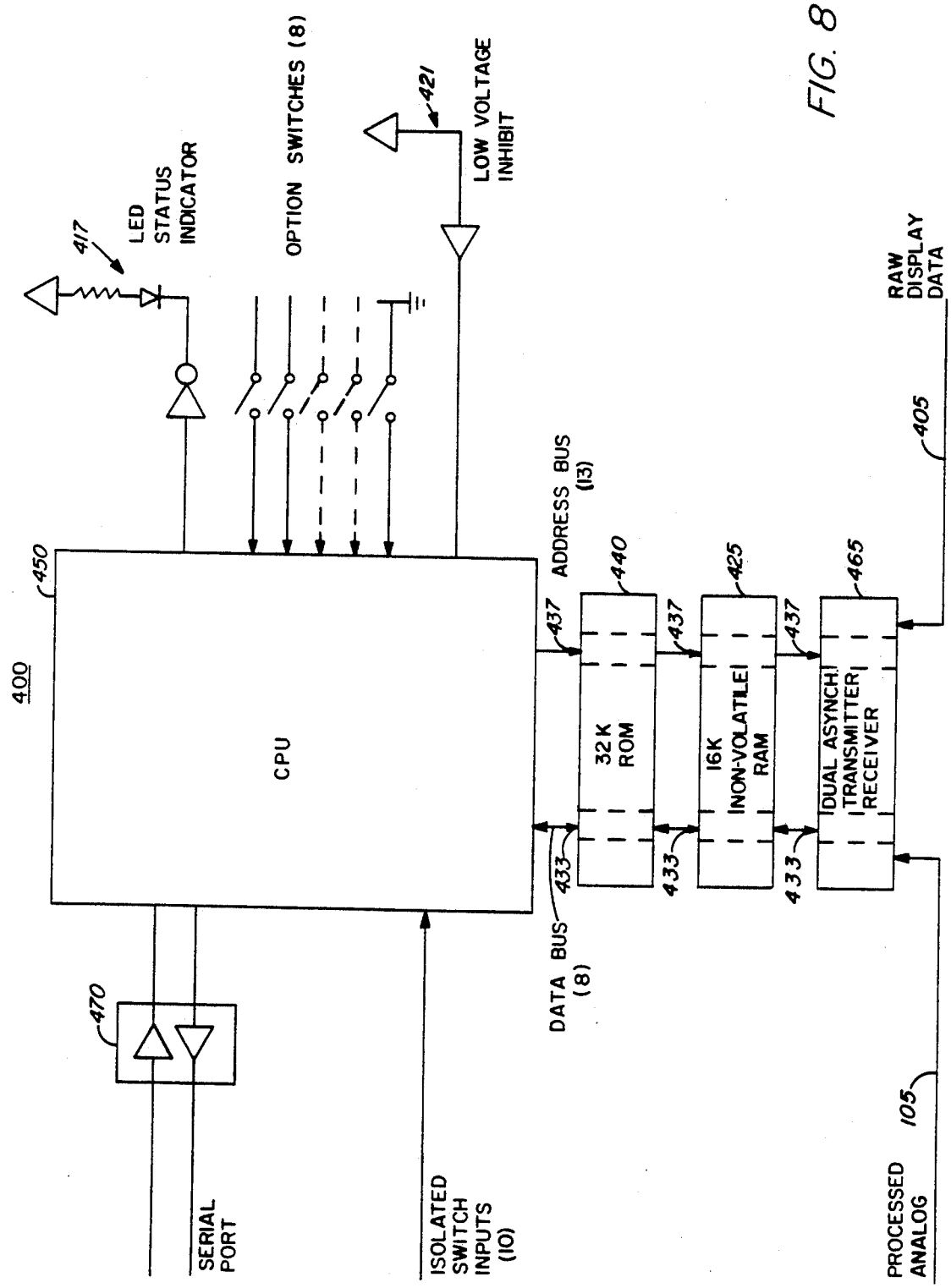
FIG. 8 depicts a detailed block diagram of the central processing board of FIG. 5.

Referring now to FIGS. 5, 8 and 12, the central processing (CPU) board 400 constructed in accordance with the preferred embodiment comprises a central processing unit 450, a 32K read only memory (ROM) 440, a 16K non-volatile random access memory (RAM) 425, a dual asynchronous transmitter/receiver 465, and a pair of bus lines 433, 437 interconnecting the central processing unit 450, the ROM 440, the RAM 425 and the transmitter/receiver 465.

The central processing unit 450 preferably comprises a Motorola MC68HC11, which receives electrical signals from the isolated switch inputs on power supply board 100. According to the preferred embodiment, ten input lines are available for the switch inputs.

The central processing unit preferably connects to the ROM 440, RAM 425, and the transmitter/receiver 465 by means of an address bus line 433 and a data bus line 437.

In the preferred embodiment of FIG. 12, the 16K RAM 425 preferably comprises two 8K non-volatile random access memory devices 427, 429, both of which are electrically connected to the data and address bus lines 433, 437 respectively. The ROM 440 preferably comprises an EPROM with 32K memory capacity.

In the preferred embodiment of FIG. 12, an address latch 415 electrically connects to the data and address bus lines 433, 437. The address latch 415 multiplexes information from the CPU 450 onto the address and data bus lines 433, 437.

Referring to FIGS. 5, 11 and 12 the transmitter/receiver 465, electrically connects to the data and address bus lines 433, 437 and transmits and receives signals to and from the master control unit 350 of the analog input/output board 300 on transmission lines 101, 102. The central processing unit 450 polls the master control unit 350 once every second through the transmitter/receiver 465 and receives from the master controller unit 350 the analog information stored therein. In addition, the transmitter/receiver 465 provides an output on transmission line 405 which serves as an input to the display board 500.

The CPU board 400 also preferably includes an RS232C translator 470 for receiving serial port information. Thus, the central processing unit 450 may be accessed remotely through the RS232C translator 470. In the preferred embodiment, a remote computer (not shown) electrically connects to the central processing unit 450 through the RS232C translator 470. The remote computer records information regarding the fracture operation for either real-time or post-fracture analysis. In addition, the remote computer may be used to reprogram the CPU 450, or to trouble-shoot problems that arise in the automated controller.

The CPU board 400 also preferably comprises an enable circuit 480 and reset circuit 485 electrically connected to the address and data bus lines 433, 437. In addition, the CPU board 400 preferably includes a low voltage inhibit circuit 421 and a status inductor LED 417, both of which are connected to the central processing unit 450. The preferred automated controller also includes a number of option switches as inputs to the central processing unit 450.

The display board 50 constructed in accordance with the preferred embodiment comprises a display control unit 500, data bus line 520, and the LED backlight array 532.

The display control unit 550 preferably comprises a Motorola 68705U3, which receives raw data from the central processing unit 450 on transmission line 405. A level translator 518 buffers the raw data before it is provided as an input to the display control unit 550.

The display control unit 550 positions, formats, and processes the raw data and provides an eight bit data output to the data bus line 520 and a four line address-/control output on address/control line 531. The line 531 and the data bus line 520 provide the display information to a 4×40 character/alphanumeric liquid crystal display 45.

Figure 2:
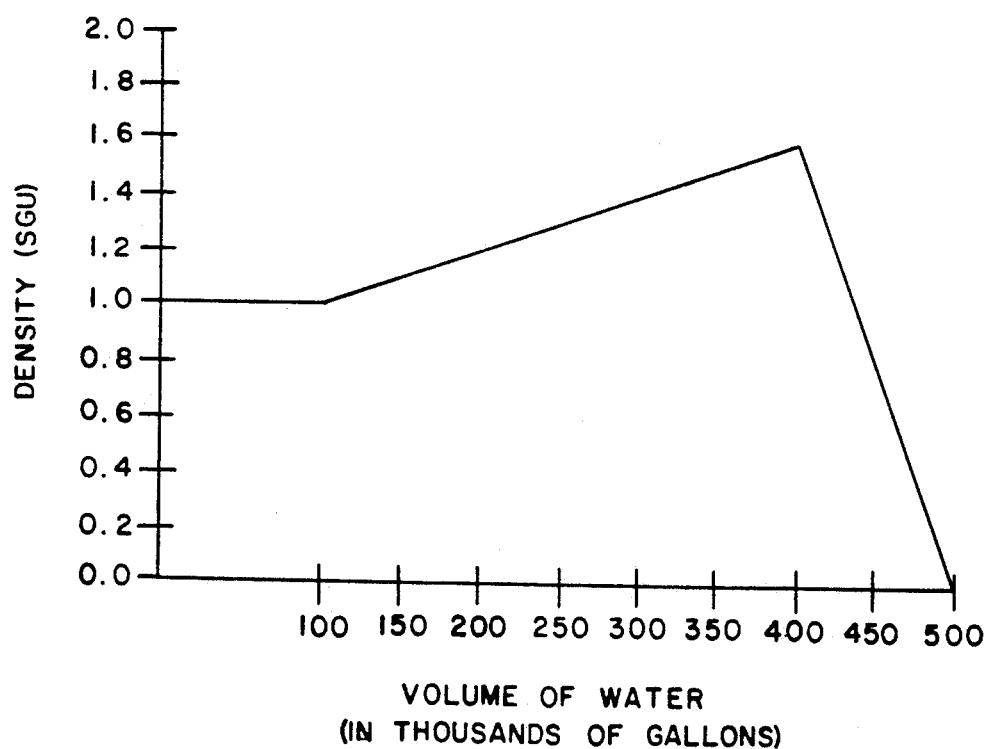
FIG. 2 is a graphical depiction of a ramped slurry input.

Before beginning a fracturing operation, the operator inputs the parameters of the process. For a step operation, as shown in Figures, the operator provides the beginning and ending cumulative volume of slurry for each step, as well as the desired density during each step. For a ramp operation, as shown in FIGS. 2, the operator enters the beginning and ending cumulative volume for each ramped step. In addition, the operator inputs the densities at the beginning and ending volumes.

Referring now to FIG. 3, the central control unit 100 receives the analog signal from the output flow meter 80 and determines the instantaneous flow out of the blender tub 50. The control unit 100 also determines the cumulative volume of water that has flowed into the blender tub 50 during the fracturing operation. The control unit 100 then reads the desired density for that particular cumulative flow, as entered by the operator. Based on the instantaneous flow and the desired density, the control unit 100 calculates the amount of sand which must be delivered from the sand delivery mechanism 20. After calculating the required quantity of sand which must be delivered, the control unit 100 determines the auger speed (or sand gate opening) that is necessary to deliver the required quantity of sand.

Referring still to FIG. 3, the control unit 100 utilizes densiometer 65, slurry flow meter 80, densiometer 65 and the output from the sand delivery mechanism 20 to determine the density of the slurry leaving the blender tub 50. The measured density value then is used to adjust the sand delivery mechanism 20 in order to more accurately provide a slurry of a desired density in both a ramp or step operation.

In a step operation, once the pumping is underway, the densiometer 65 will show an increasing density as the slurry in the blender tub 50 approaches the desired density. At some point the density stabilizes. When this happens and the flow stabilizes within ±12% BBL/MIN over a period of time of 10 seconds and the auger speed stabilizes within ±1 rpm, the control unit compares the desired density with the actual density. At that time, the control unit determines how much additional (or less) sand/minute is necessary to bring the actual density up (or down) to the desired density. A lookup table comprised of sand rates for a particular auger speed is referenced by the control unit 100 to find the increase (or decrease) in auger speed which would provide a calculated percentage of the additional sand required. The auger speed is increased (or decreased) by this amount and the lookup table is recalibrated by a correction factor based on the ratio of the original auger speed to the new auger speed.

After the increase in auger speed the actual density again changes. When the density becomes stabilized for the prescribed period, the control unit calculates a new correction factor. The control unit repeats this process until the actual density is within 1% of the desired density for a 10 second period. If at any time during the recalibration process the suction flow rate changes by 12% BBL/MIN, or the density requirement changes because of a step change, the control unit recalibrates the lookup table based on the last valid correction factor.

The control unit uses just one lookup table for the three augers and uses 45 rpm as the minimum speed for each auger. The control unit recalibrates the lookup table over the whole sand rate/auger speed relationship. No recalibration can occur for the first 25 seconds of operation.

In addition, the use of the above sensors provides a means to verify the accuracy of each individual sensor. The slurry density can be measured by the control unit 100 in two ways: (1) using the two flow meters 30, 80, and (2) using the densiometer 65. If the two measured values correlate within ±4% up to ±10%, the automatic controller warns the operator of a potential problem, but continues to control the amount of sand delivered by the sand delivery mechanism 20, without recalibrating the lookup table. If the two measured values do not agree within ±10%, the control unit warns the operator of a malfunction in the automatic density controller and uses only the suction flow meter 30 and the lookup table to perform density control.

In the preferred embodiment, the following components are used in the circuits shown in FIGS. 10, 11, 12, and 13:

FIG. 10A

| Reference | Description | Component |
|---|---|---|
| C1 | Capacitor | .01 microfarad, 100 WVDC |
| C2 | Capacitor | 100 microfarad, 35 WVDC |
| C3 | Capacitor | 22 microfarad, 35 WVDC |
| C4 | Capacitor | 5.6 microfarad, 35 WVDC |
| C5 | Capacitor | 22 microfarad, 35 WVDC |
| C6 | Capacitor | 10 microfarad, 20 WVDC |
| C7 | Capacitor | 22 microfarad, 35 WVDC |
| R1 | resistor | 732 ohms, 0.25 W |
| R2 | resistor | 243 ohms, 0.25 W |
| CR1 | diode | 1N5822 |
| CR2 | diode | 1N4007 |
| CR3 | diode | 1N4007 |
| CR4 | diode | 1N4007 |
| CR5 | diode | 1N4007 |
| CR6 | diode | 1N4007 |
| VAR | varistor | V222A3, 18 volts |
| 211 | DC to DC converter | WR12D15/500XC |
| 212 | DC to DC converter | WR12S05/1000Z |
| 213 | DC to DC converter | WR12S12/1250XC |
| U1 | voltage regulator | LM 137HVH |

FIGS. 10B–C

| Reference | Description | Component |
|---|---|---|
| C8–C17 | Capacitor | .01 microfarad, 100 WVDC |
| R3, R5 | resistor | 4.99K ohms, 0.25 W |
| R5, R6 | resistor | 499 ohms, 0.25 W |
| R7, R8 | resistor | 560 ohms, 1.0 W |
| R9, R10 | resistor | 4.99K ohms, 0.25 W |
| R11, R12 | resistor | 4.99 ohms, 0.25 W |
| R13, R14 | resistor | 560 ohms, 1.0 W |
| R15, R16 | resistor | 4.99K ohms, 0.25 W |
| R17, R18 | resistor | 4.99 ohms, 0.25 W |
| R19, R20 | resistor | 560 ohms, 1.0 W |
| R21, R22 | resistor | 4.99K ohms, 0.25 W |
| R23, R24 | resistor | 499 ohms, 0.25 W |
| R25, R26 | resistor | 560 ohms, 1.0 W |
| R27, R28 | resistor | 4.99K ohms, 0.25 W |
| R29, R30 | resistor | 499 ohms 0.25 W |
| R31, R32 | resistor | 560 ohms 1.0 W |
| CR8, CR17 | diode | 1N4007 |
| 218 | optical isolator | MCT6 |

FIGS. 11A–I

| Reference | Description | Component |
|---|---|---|
| R42 | resistor | 49.9K ohms, 0.125 W |
| R43 | resistor | 107K ohm, 0.125 W |
| R44 | resistor | 1.5K ohm 0.125 W |
| R45, R46 | resistor | 150K ohm, 0.125 W |
| R47 | resistor | 1.5K ohm, 0.125 W |
| R48, R49 | resistor | 100 ohm, 0.125 W |
| R50 | resistor | 107K ohm, 0.125 W |
| R51 | resistor | 49.9K ohm, 0.125 W |
| R52 | resistor | 10.0M ohm, 0.25 W |
| R53 | resistor | 49.9K ohm, 0.125 W |
| R54 | resistor | 107K ohm, 0.125 W |
| R55 | resistor | 1.50K ohm, 0.125 W |
| R56 | resistor | 150K ohm, 0.125 W |
| R57 | resistor | 100 ohm, 0.125 W |
| R58 | resistor | 150K ohm, 0.125 W |
| R59 | resistor | 1.5K ohm, 0.125 W |
| R60 | resistor | 107K ohm, 0.125 W |
| R61 | resistor | 49.9K ohm, 0.125 W |
| R62 | resistor | 100 ohm, 0.125 W |

-continued

| Reference | Description | Component |
|---|---|---|
| R63 | resistor | 300 ohm, 0.25 W |
| R64–R69 | resistor | 47K ohm, 0.25 W |
| R70–R75 | resistor | 10K ohm, 0.25 W |
| R76–R81 | resistor | 22K ohm, 0.25 W |
| R82 | resistor | 42.2K ohm, 0.25 W |
| R83 | resistor | 3.4K ohm, 0.25 W |
| R84 | resistor | 12.1K ohm, 0.25 W |
| R85 | resistor | 42.2K ohm, 0.25 W |
| R86 | resistor | 3.4K ohm, 0.25 W |
| R87 | resistor | 12.1K ohm, 0.25 W |
| RN1 | resistor network of (8) eight isolated resistors, each 100K ohm | 100K ohm resistors |
| RN2 | resistor network of (8) eight isolated resistors, each 100K ohm | 100K ohm resistors |
| RN3 | resistor network of isolated resistors, each 22 K ohm | 22K ohm resistors |
| RN4 | resistor network of isolated resistors, each 22 K ohms | 22K ohm resistors |
| C21, C22 | capacitor | 22 picofarad |
| C23 | capacitor | 1.0 microfarad, 50 V |
| C25, C28 | capacitor | 1.0 microfarad, 50 V |
| C26, C27 | Capacitor | 0.1 microfarad, 100 V |
| C29, C30 | capacitor | 1.0 microfarad, 50 V |
| C31, C32 | capacitor | 0.01 microfarad, 100 V |
| C33–C38 | capacitor | 0.1 microfarad, 100 V |
| C39–C44 | capacitor | 0.01 microfarad, 100 V |
| C45–C50 | capacitor | 0.001 microfarad, 200 V |
| C51, C52 | capacitor | 2.2 microfarad, 50 V |
| C53, C54 | capacitor | 0.01 microfarad, 50 V |
| C55–C58 | capacitor | 0.1 microfarad, 100 V |
| C59–C62 | capacitor | 22 microfarad |
| C63, C64 | capacitor | 0.001 microfarad, 200 V |
| CR21–CR24 | diode | 1N4734A |
| CR25 | diode | 1N4740 |
| CR26–CR31 | diode | 1N4740 |
| P1 | potentiometer | 100K ohm |
| P2, P3 | potentiometer | 10K ohm |
| P4, P5 | potentiometer | 10K ohm |
| P6, P9 | potentiometer | 5K ohm |
| P10, P11 | potentiometer | 5K ohm |
| OP1–OP8 | operational amplifier | LM124AJ |
| IC1–IC6 | inverter | MC14049UBCLD |
| IC7–IC12 | Schmitt trigger | MC14584BCLD |
| IC13–IC15 | inverter | MC14049UBCLD |
| OP9, OP10 | operational amplifier | LM124AJ |
| IC16, IC17 | inverter | MC14048UBCLD |
| OP11–OP13 | operational amplifier | LM124AJ |
| U2 | voltage reference | MC1504U5 |
| U3 | LVI reset | MC33064P-5 |
| 331 | Four channel analog multiplexer | AD7502SQ |
| 340 | Ten bit analog-to-digital converter | AD573SD |
| 350 | Master control unit | MC68HC811E2FN |
| 382, 384, 386 | eight bit digital to analog converter | AD558TD |
| 316, 318 | frequency-to-voltage converter | VFC32SM |
| Y1 | 4 MHZ crystal microprocessor | MP-1UP8MHZ |
| U4 | RS-232 transmitter/receiver | MAX232EJE |

FIGS. 12A-D

| Reference | Description | Component |
|---|---|---|
| R91–R93 | resistor | 22K ohm, 0.25 W |
| R94 | resistor | 4.7K ohm, 0.25 W |
| R95 | resistor | 10M ohm, 0.25 W |
| R96 | resistor | 22K ohm, 0.25 W |
| R97, R98 | resistor | 300 ohm, 0.25 W |
| C71–C74 | capacitor | 22 microfarad, 200X |
| C75, C76 | capacitor | 22 picofarad, 200 WVDC |
| C77–C85 | capacitor | 0.1 microfarad, 100 V |
| CR41 | diode | |
| RN5–RN8 | resistor network of isolated resistors, 22K ohm each | 22K ohm resistors |
| Y2 | 8 MHZ crystal microprocessors | MP-1UP8MHZ |
| Y3 | 4 MHZ crystal microprocessor | MP-1UP3.6864 |
| IC21–IC24 | inverter | MC54HC00J |
| IC25–IC30 | inverter | MC54HC04J |
| 450 | microprocessor | MC68HC11A8M |
| 470 | RS-232 transmitter/receiver | MAX232EJE |
| 415 | address latch | MC54HC373J |
| 427, 429 | non-volatile 8K RAM | DS1225Y-IND |
| 440 | 32K EPROM | TMS27C256JE |
| 465 | dual asynchronous transmitter/receiver | XR-68C681J |
| 480 | decoder | MC54HC138J |
| U5 | LVI RESET | MC33064P-5 |

FIG. 13

| Reference | Description | Component |
|---|---|---|
| R101, R102 | resistor | 3.3K ohm, 0.25 W |
| C91 | capacitor | 1.0 microfarad, 50 V |
| C92 | capacitor | 0.1 microfarad, 100 V |
| C96 | capacitor | 22 picofarad, 200 X |
| CR42 | diode | 1N4148 |
| Q1 | NPN transistor | 2N2222A |
| 45 | LCD | 4X40 LCD Dot Matrix |
| 550 | microprocessor | MC68705U3CS |
| Y4 | crystal microprocessor | MP-1UP4MHZ |

While the above components are used in the preferred embodiment, one skilled in the art will realize that various substitutions may be made without departing from the principles of the present invention.

Referring now to the flow charts of FIGS. 15–25, the operation of the automatic density controller discussed supra will now be described.

According to the preferred embodiment, a sand delivery rate for respective auger speeds is determined from specifications and testing and is used to develop a lookup table. The lookup table is programmed into the central processing control unit 450. The flow meters 30, 80 and densiometer 65 provide a means to determine the actual density of the slurry. From this, the CPU can evaluate the actual delivery performance of the augers at the various rpm values, and can recalibrate the preprogrammed lookup table.

Figure 15:
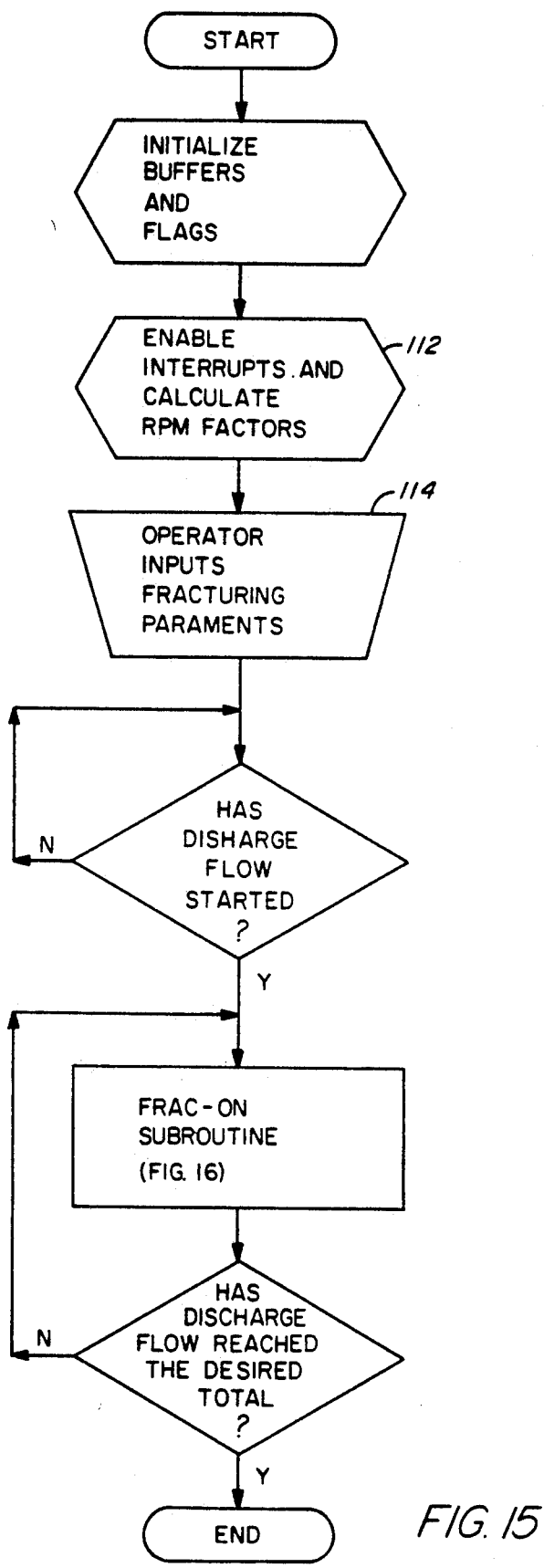
FIG. 15 depicts the process of the main operation flow chart for the automatic density controller.

Referring now to FIG. 15, the main program of the central processing unit 450 initializes and enables the circuitry of the controller. In step 112, the CPU calculates the rpm factor by determining the number of augers or other sand delivery units that are to be used in the particular fracturing operation, as well as certain other auger information such as the bit used in the auger and the revolutions per minute (rpm) for each bit. As noted supra, three augers are used in the preferred embodiment.

Figure 1:
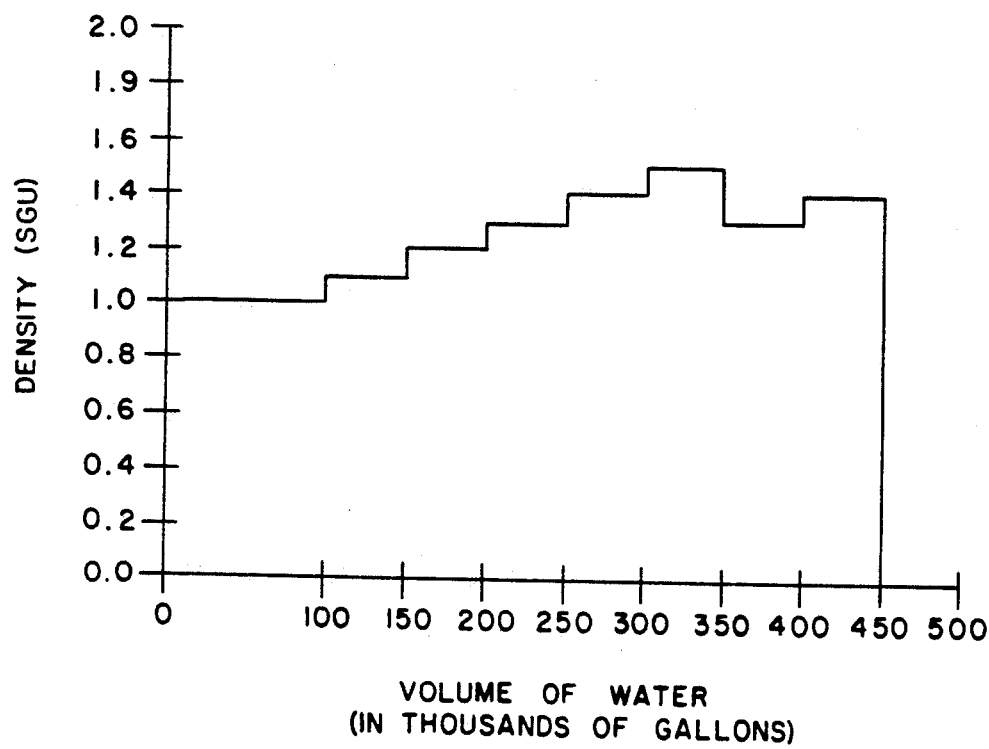
FIG. 1 is a graphical depiction of a stepped slurry input.

Subsequently, in step 114, the operator enters the parameters of the fracturing operation, such as whether a ramp or step progression is to occur (See FIGS. 1 and 2), the volume of water at which the steps are to take place, the density of the slurry at each step, and so forth. The switch inputs are optically isolated on power supply board 200 as described, supra.

When the discharge flow meter 80 senses a discharge from the blender tub 50, the frac-on subroutine of FIG. 19 is activated. Conversely, when the CPU 450 receives a signal that indicates that the internal accumulator 379 in master control unit 350 has accumulated a preselected number of pulses from the discharge flow meter 80, the main program ends and the central processing unit 450 ends the fracturing operation.

Figure 16A:
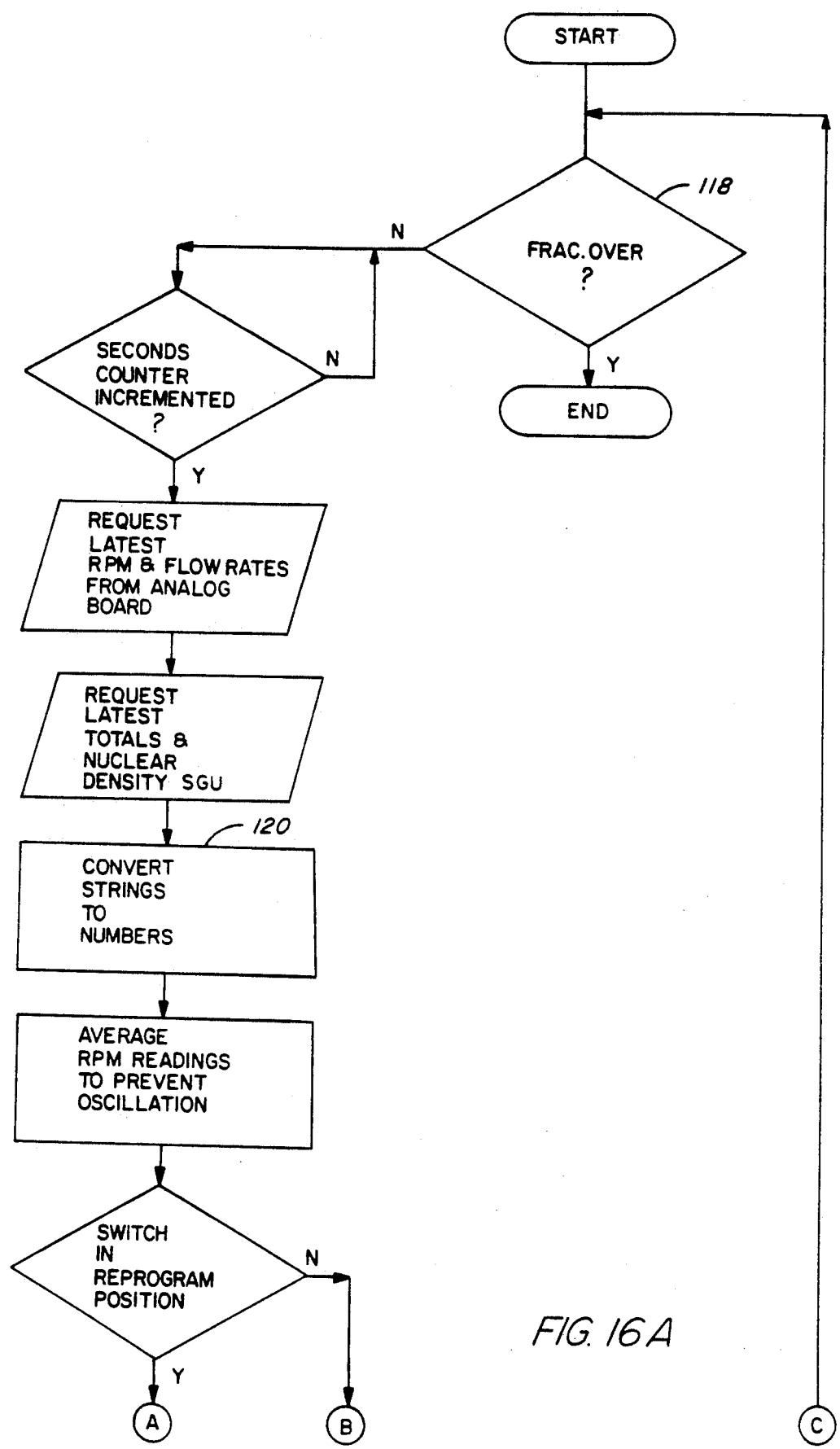
FIG. 16 illustrates the well fracturing process of the automatic density controller.
Figure 16B:
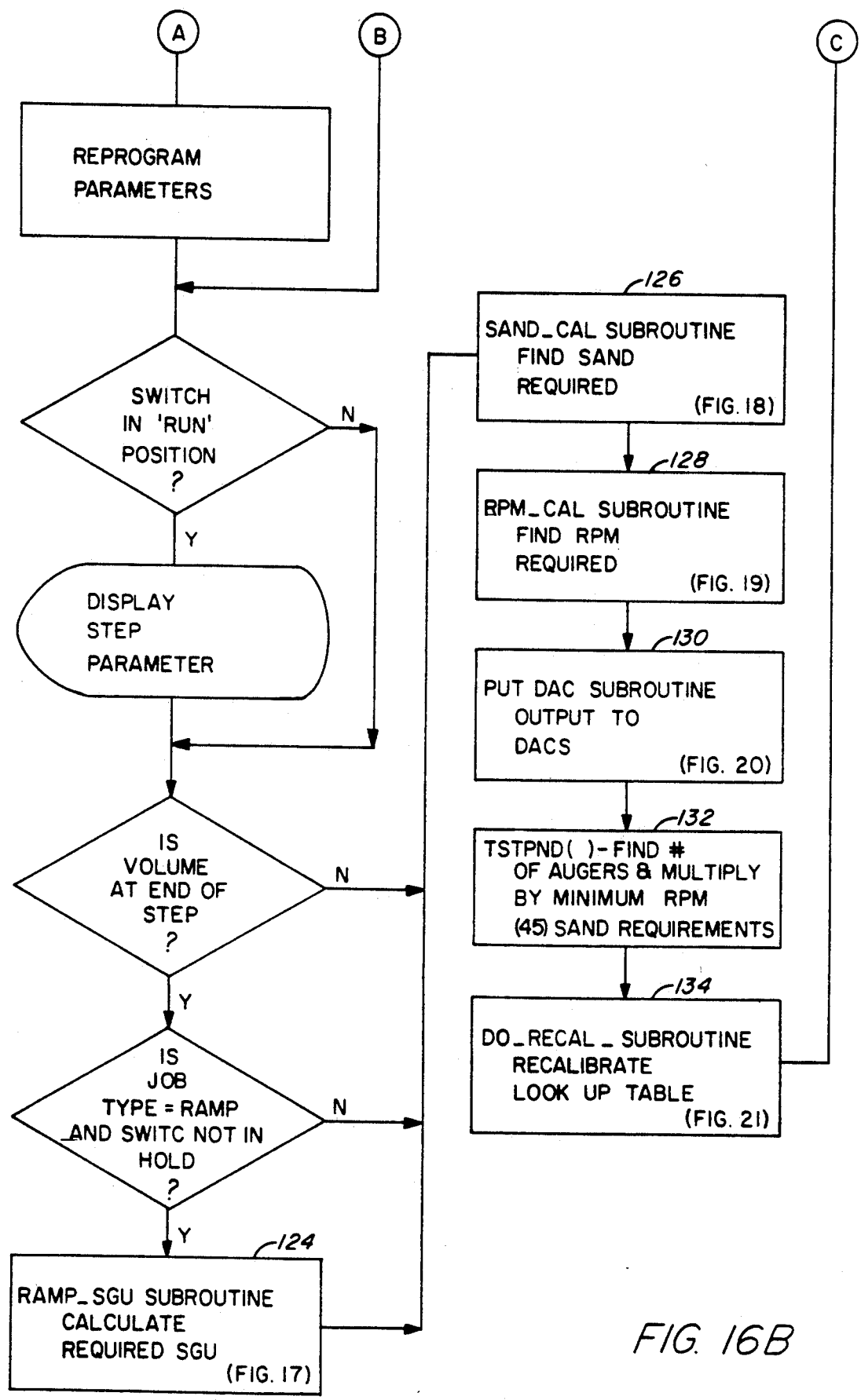

Referring now to FIG. 16, the central processing unit 450 prompts the master control u it 350 of analog board 300 once every second for information regarding the rpm of the augers, the flow rates of meters 30, 80, the accumulated flow rates in accumulator 379, and the specific gravity measurement from the densiometer 65. The signals received from the master control unit 350 then are converted in step 120 to a numerical value.

In step 122, the rpm readings are averaged with the three previous readings to eliminate any surges or temporary slow-downs.

After receiving and converting the data from the master control unit 350, the CPU 450 checks to see if the operator has changed the variables of the fracturing operation, such as the volume of water at which a step change occurs, or the specific gravity of the slurry in a step.

Figure 17:
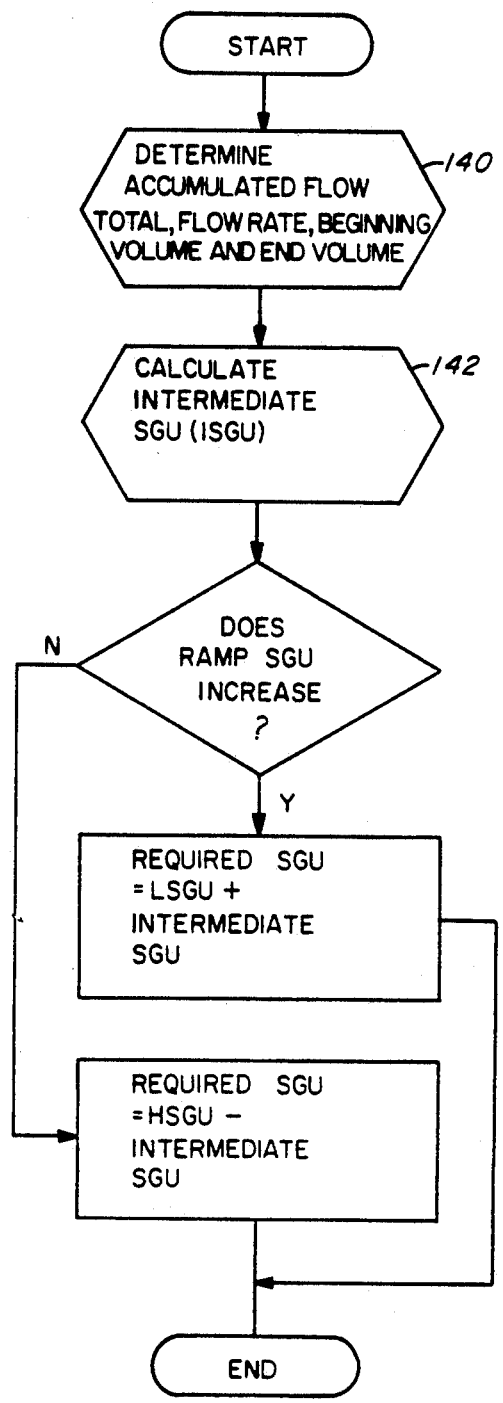
FIG. 17 shows the operation of the automatic density controller during a ramp fracturing operation.

If a ramped slurry output is desired (See FIG. 2), the central processing unit 450 calculates the required density at step 124 for the measured flow rate, using the subroutine of FIG. 17.

Figure 18:
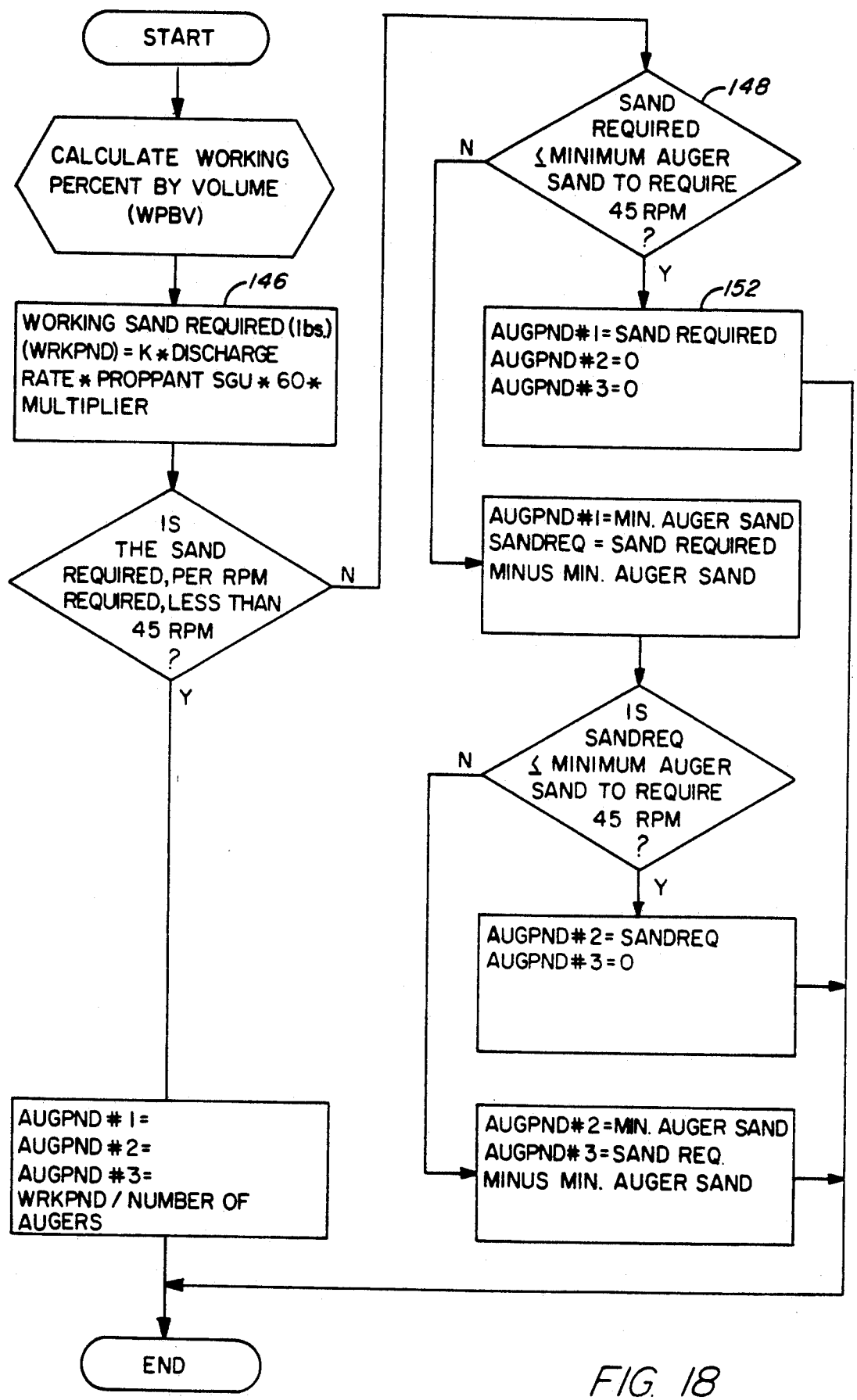
FIG. 18 depicts the sand calculations performed by the automatic density controller.
Figure 19A:
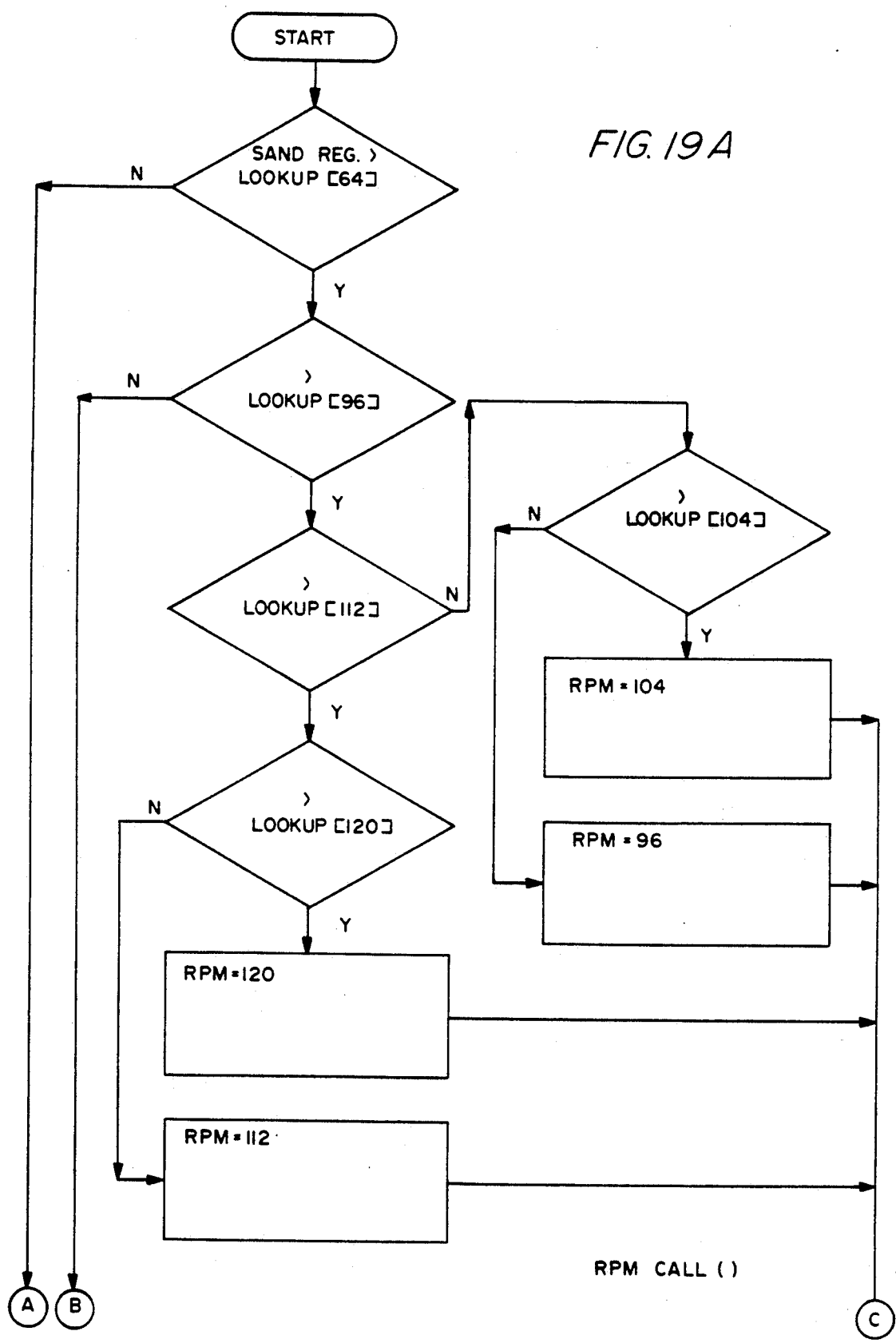
FIG. 19 shows the rpm calculations performed by the automatic density controller.
Figure 19B:
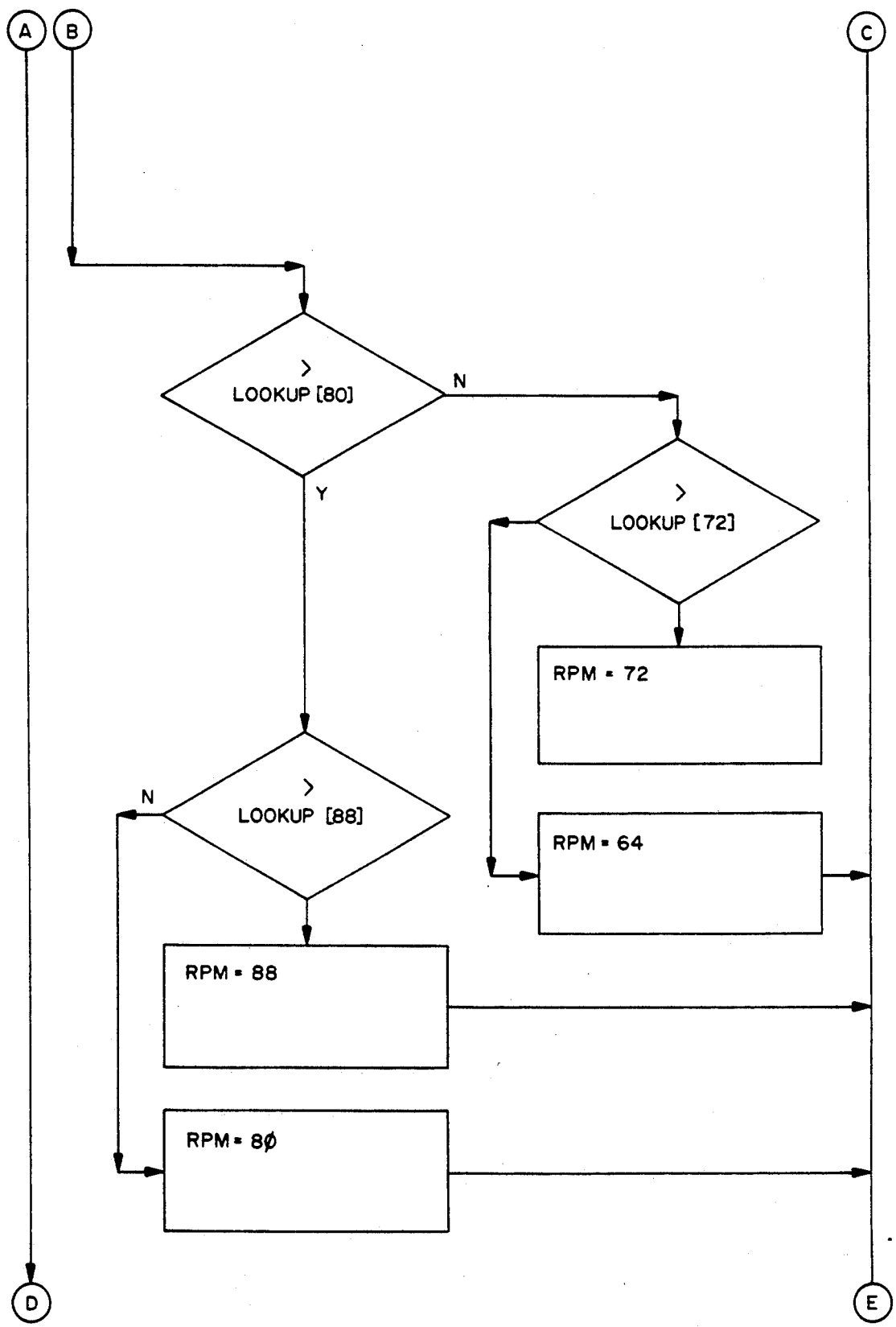
Figure 19C:
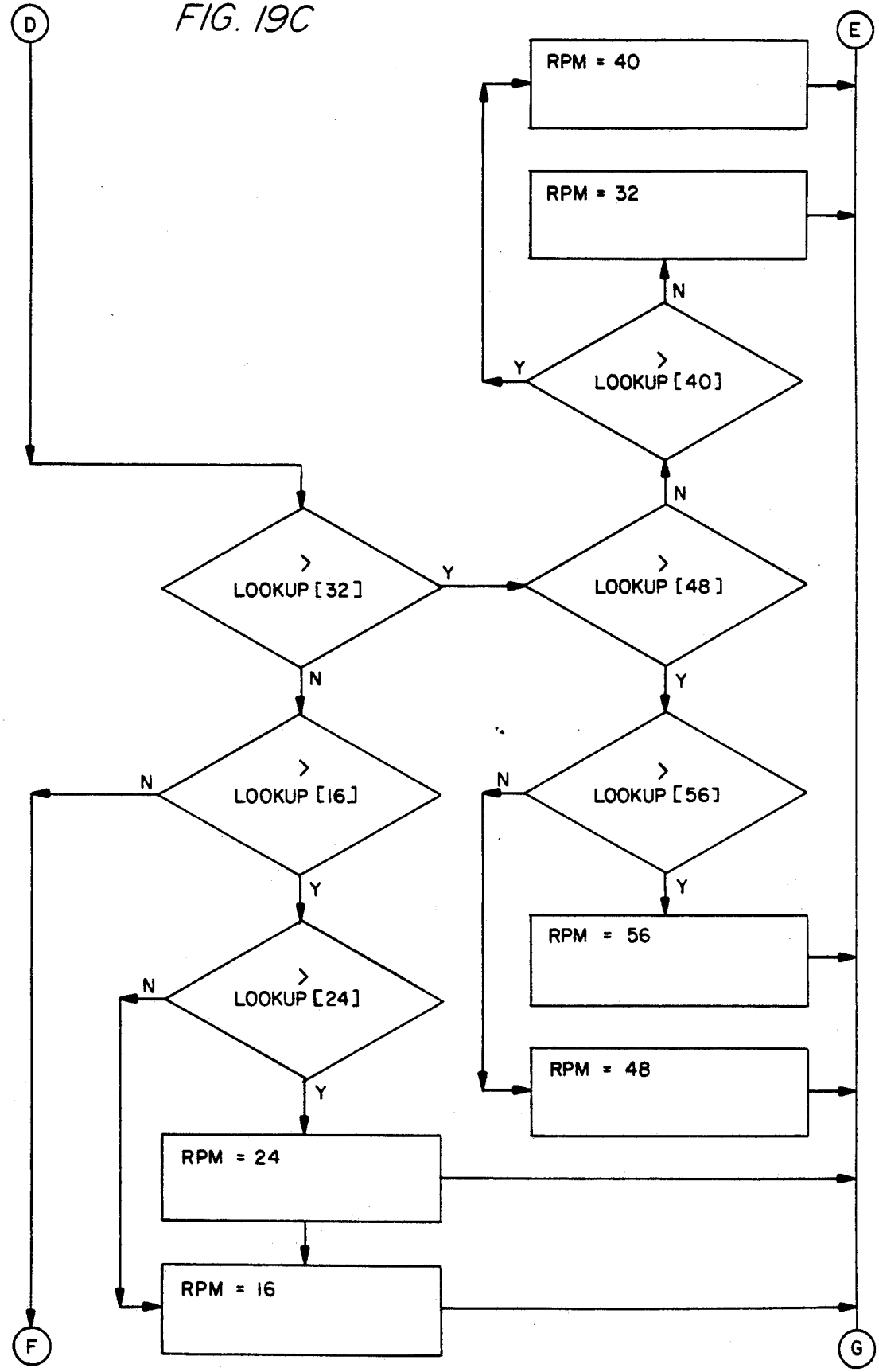
Figure 19D:
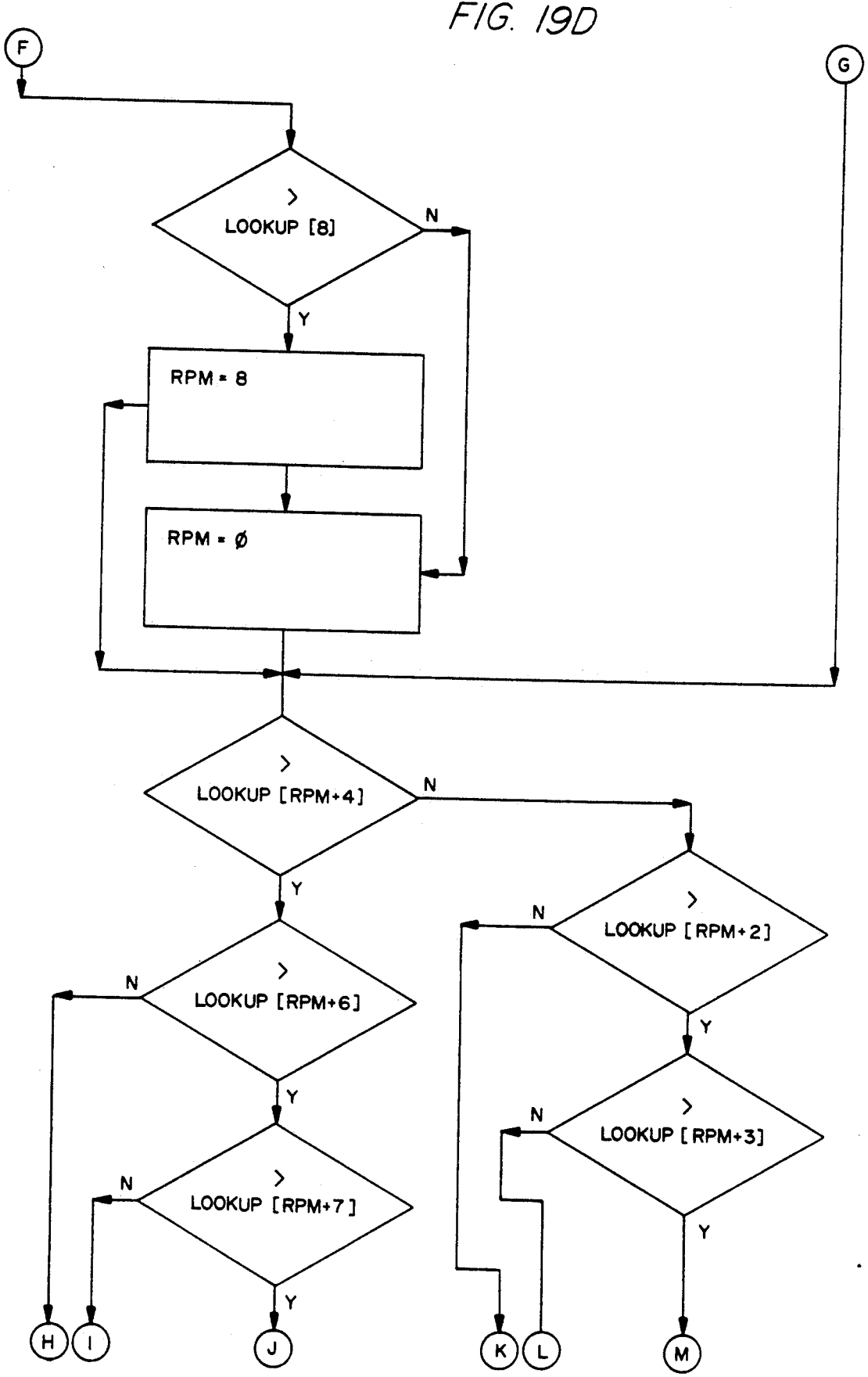
Figure 19E:
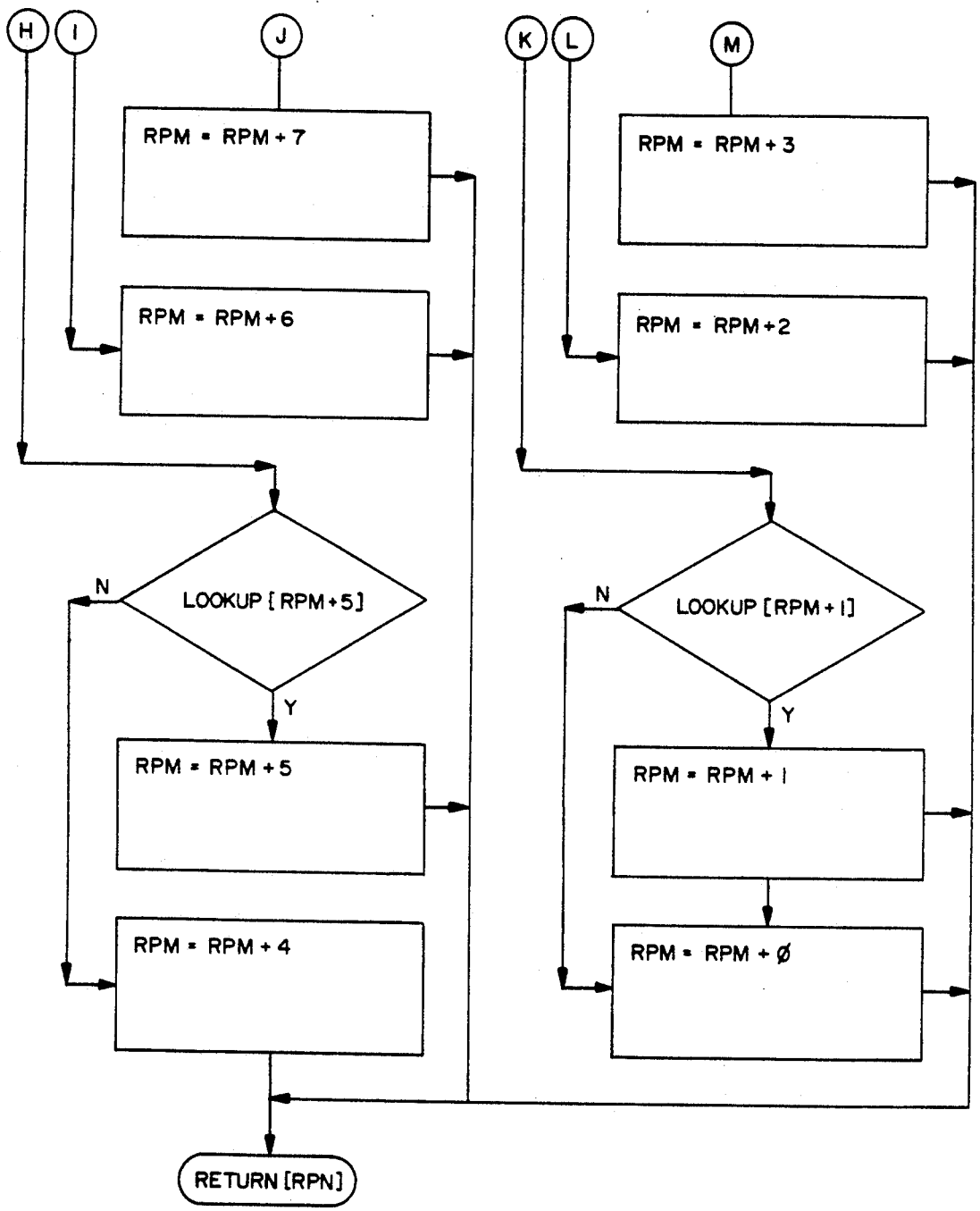

After the density has been determined for the specific volume of water, the CPU 450 calculates the amount of sand required to obtain the required density in step 126, using the subroutine of FIG. 18.

The calculated sand delivery rate is used to determine the necessary rpm rate of the augers in step 128, using the subroutine of FIG. 19. After the rpm rate is determined, the CPU in step 130 outputs a signal representative of the rpm rate to the master control unit 350, using the subroutine of FIG. 20. The master control unit 350, in turn, outputs a signal to the digital to analog converter 360, which then is transmitted to the auger units to control the rpm of the augers.

In step 132, the CPU 450 determines the number of auger units that are in operation and multiplies this number by the minimum acceptable rpm value of 45. The CPU 450, using the preprogrammed look-up table, determines the minimum amount of sand that would be delivered if the augers operate at the minimum rpm rate. This minimum amount of sand is compared with the actual amount of sand required.

Figure 21:
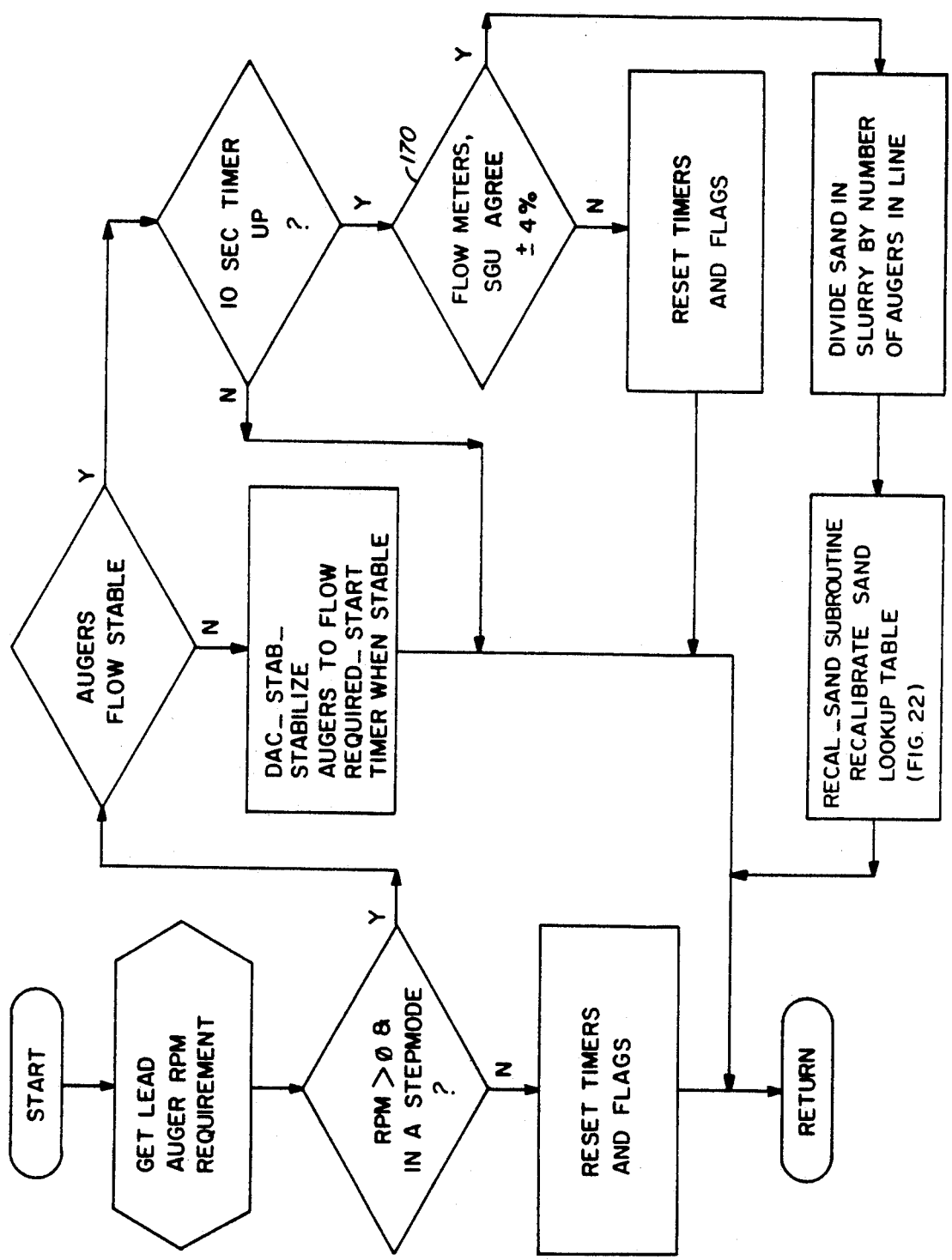
FIG. 21 shows the process whereby the automatic density controller determines whether a recalibration of the sand delivery vs rpm table is necessary.

In step 134, the CPU 450 recalibrates the look-up table based upon the actual performance of the auger unit, using the subroutine of FIG. 21. After recalibrating the look-up table in step 134, the subroutine loops back to step 118 to see whether the fracturing operation is complete. If the fracturing operation is complete, the CPU 450 exits the subroutine and returns to the main program of FIG. 15.

Referring now to FIG. 17, the process shown therein calculates the required specific gravity of the slurry for the measured suction flow rate during a ramp operation. Because the slope of the ramp function may change during a fracturing operation and because the ramp function may be selected after a fracturing operation is begun, the subroutine of FIG. 17 must determine the beginning and ending volumes of water and the lowest and highest specific gravity of slurry during the particular step of the ramped operation.

Figure 26:
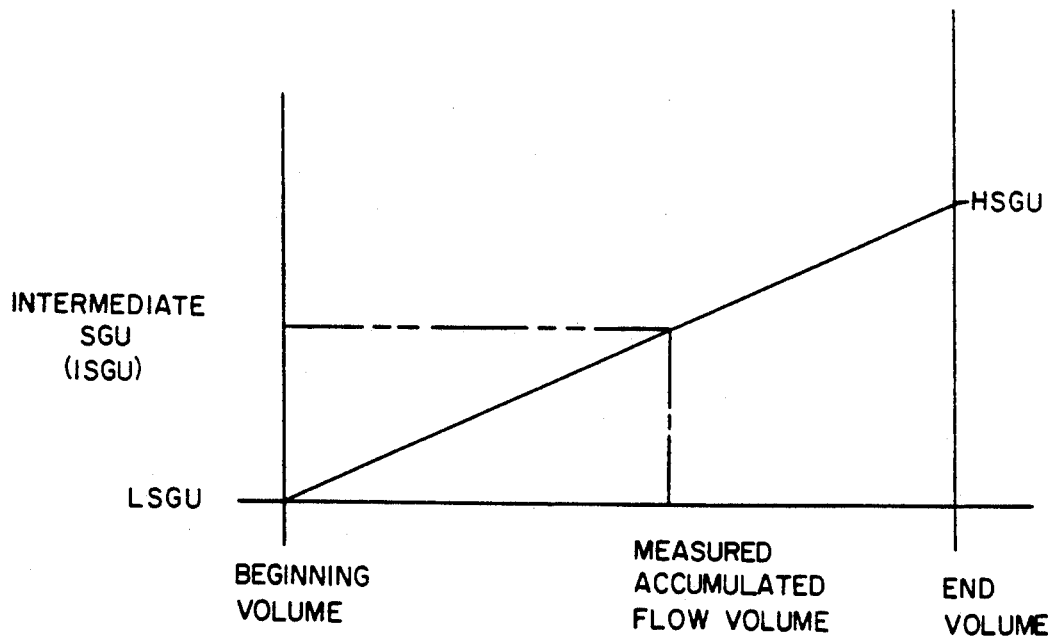
FIG. 26 is a graphical depiction of a point slope calculation in the ramp operation of FIG. 17.

Referring now to FIGS. 17 and 26, the CPU 450 determines the beginning and ending volumes and the lowest and highest specific gravity of the slurry for which a ramp fracturing operation is desired in step 140. The CPU uses this information to calculate the intermediate slurry density along the ramped function, as determined by the measured discharge flow total accumulated in the accumulator 379 of the master control unit 350. In addition, the CPU 450 also determines the flow rate in step 140.

Referring still to FIGS. 17 and 26, after the CPU 450 has defined the beginning and ending volumes in the ramp step, and the lowest and highest density of the slurry, the CPU calculates the slope of the ramp operation (D) in step 142, as follows:

$$D = \frac{\text{High } SGU - \text{Low } SGU}{\text{End Step Volume} - \text{Beginning Step Volume}}$$

Once the slope of the ramp has been calculated, the density can be determined for each cumulative volume level. The CPU calculates the intermediate specific gravity (ISGU), preferably in metric specific gravity units or "SGU's" in step 142, by multiplying the slope of the ramp operation (D) by the flow rate accumulated in the master control unit 350 as follows:

$$ISGU = (D) * (\text{ACCUMULATED FLOW RATE}).$$

After determining whether the ramp density is increasing or decreasing, the CPU 450 defines the required density and exits to the Sand Required subroutine of FIG. 18.

The sand required to maintain the required slurry density (in both the step and ramp operations) is calculated according to the process shown in FIG. 18. Referring now to FIG. 18, the subroutine begins by calculating the working percent by volume WPBV), as follows:

$$WPBV = \frac{\text{Working } SGU - \text{Fluid } SGU}{\text{Proppant } SGU - \text{Fluid } SGU}.$$

The working SGU is either the density calculated according to the process of FIG. 17 in a ramp operation, or is the density of the slurry selected for a particular volume in a step operation. The fluid SGU is defined as the density of the incoming or suction fluid flowing into the blender tub so through line 60. The proppant SGU is the density of the proppant added to the blender tub, which preferably is 20–40 frac sand.

In step 146, the CPU calculates the amount of sand required in pounds per minute as follows:

sand required (in lbs.)=(60)* (k)* (discharge rate)* (proppant SGU)* (multiplier)

The 60 is a conversion to minutes from seconds, since the CPU receives updated information once each second;

k is a conversion factor to convert metric measurements to pounds;

the discharge rate is the amount of slurry detected by discharge flow meter 80 in one second;

the proppant SGU is the specific gravity of the proppant (sand);

and the multiplier is a value which is indicative of the type of sand being used, and which adjusts the lookup table, discussed infra, for the particular proppant that is used.

Once the CPU 450 calculates the amount of sand required, a determination is made as to the number of augers to be used. In the preferred embodiment, three augers are available for sand delivery. If the sand required necessitates that the augers be run at less than 45 rpm, then the CPU proceeds to step 148. If, however, sufficient sand is required to operate the three augers at an rpm greater than 45, than the amount of sand is divided by the number of augers and an equal amount of sand is delivered by each auger.

In step 152, the CPU determines whether the amount of sand required is less than the sand necessary to operate one auger at 45 rpm. If so, only on auger is used.

If there is a sufficient amount of sand required to operate at least one auger at greater than 45 rpm, the CPU allocates a minimum amount of sand to the first auger to require it to operate at 45 rpm. The remaining sand required is then compared with the minimum amount of sand required to operate an auger at 45 rpm, and the CPU designates the remaining sand to the second auger if the amount required is less than the minimum amount.

In like manner, each auger is designated to deliver enough sand to operate at 45 rpm. Any remaining sand is received from an additional auger.

After the CPU allocates the sand to the augers, the CPU exits the subroutine of FIG. 18 and proceeds to the subroutine of FIG. 19 wherein the required rpm of the augers is calculated.

The subroutine of FIG. 19 utilizes the lookup table, which specifies the amount of sand which an auger will deliver when operating at a given rpm value. This table may be determined either by quantitative testing or by the specifications of the auger unit. Preferably, there are 128 pairs of rpm/sand values in the lookup table, which are listed in ascending order of magnitude. The associated rpm/sand rate pairs then are programmed into the CPU and given index numbers 0-127. The CPU retrieves the rpm value according to the subroutine of FIG. 19, once the amount of sand required is determined.

The subroutine of FIG. 19 utilizes a standard successive approximation to determine the rpm for the given quantity of sand. Once the rpm value for the augers has been retrieved by the CPU, the CPU exits the subroutine of FIG. 19.

Figure 20:
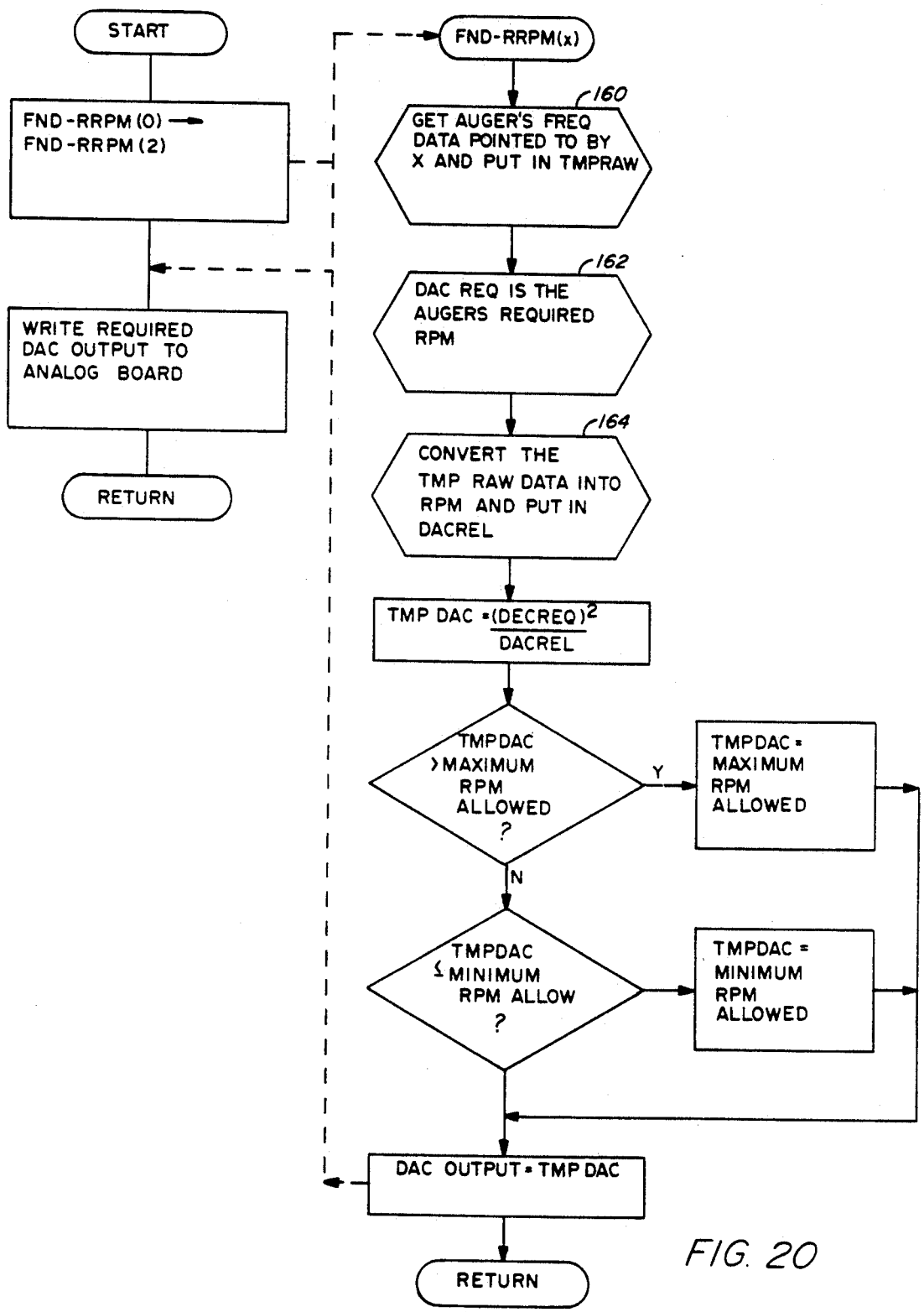
FIG. 20 illustrates the process by which the automatic density controller provides a feedback signal regulating the operation of the sand delivery unit.

In the subroutine of FIG. 20, the rpm value is delivered to the digital to analog converter 360 for subsequent transmission to the auger unit. Initially, in step 160, the CPU retrieves the rpm information for each auger by prompting the master control unit 350 for the frequency information transmitted from the auger to the master control unit. The master control unit 350 transmits this information to the CPU via transmission lines 101, 102 and dual asynchronous transmitter/receiver 465. The CPU stores this information in "Tmpraw."

In step 162, the required rpm value (determined in subroutine of FIG. 19) for each auger is placed in "Dacreq." The CPU in step 164 then converts the frequency information stored in "Tmpraw" into rpm values and places the converted value in "Dacrel."

The CPU calculates a correction factor (n) based on the actual measured auger rpm as follows:

$$n = \frac{(dacreq)^2}{dacrel}$$

The correction factor (n) then is defined as "Tmpdac."

The CPU compares the correction factor in "Tmpdac" with the highest and lowest allowed rpm values and resets the Tmpdac to the threshold values if it is below or above permitted values. The Tmpdac value is converted back to an analog value and transmitted to the master control unit 350 on analog board 300. The master control unit 350 receives the correction factor information and transmits a signal to the auger to adjust the auger speed as necessary.

After transmitting this information, the CPU exits the subroutine of FIG. 20 and returns to the subroutine of FIG. 17.

After performing step 132 in the fracturing process, the CPU 450 enters the recalibration subroutine of FIG. 21. If the fracturing operation is not in a step mode, the CPU 450 exits the recalibration subroutine. The CPU will not perform a calibration of the sand delivery mechanism during a ramp operation because the sand delivered is never constant.

If the operation is in a step mode and the auger is operational, the CPU determines if the discharge flow and auger speed are stable for a period of ten seconds. Next the CPU calculates the slurry density from the information provided from the suction and discharge meters as follows:

$$PBV = \frac{FOUT - FIN}{FOUT};$$

where PBV is the percent by volume;

FOUT is the slurry output rate (obtained from the discharge flow meter 80); and

FIN is the suction rate (obtained from the suction flow meter 30).

The slurry density (SSGU) may then be calculated as

SSGU=((Proppant SGU - Fluid Input SGU) *
PBV)+Fluid Input SGU;

where the Proppant SGU is the density of sand;

and the Fluid Input SGU is the density of the fresh water input to the blender tub 50.

This value for the slurry density, derived from the flow meters 30, 80, is compared with the SGU value measured by the densiometer in step 170. If the two values do not agree within ±4%, the CPU exits the recalibration subroutine of FIG. 21. If the two values correlate within ±4% up to ±10%, the CPU exits the subroutine of FIG. 21. The CPU then warns the operator of a potential problem, but continues to control the sand delivery rare without recalibrating the lookup table. Similarly, if the two values are not within ±10%, the CPU exits the subroutine and warns the operator of a malfunction. The CPU continues to control the sand delivery rate base solely on the suction flow meter 30 and the lookup table.

Figure 22A:
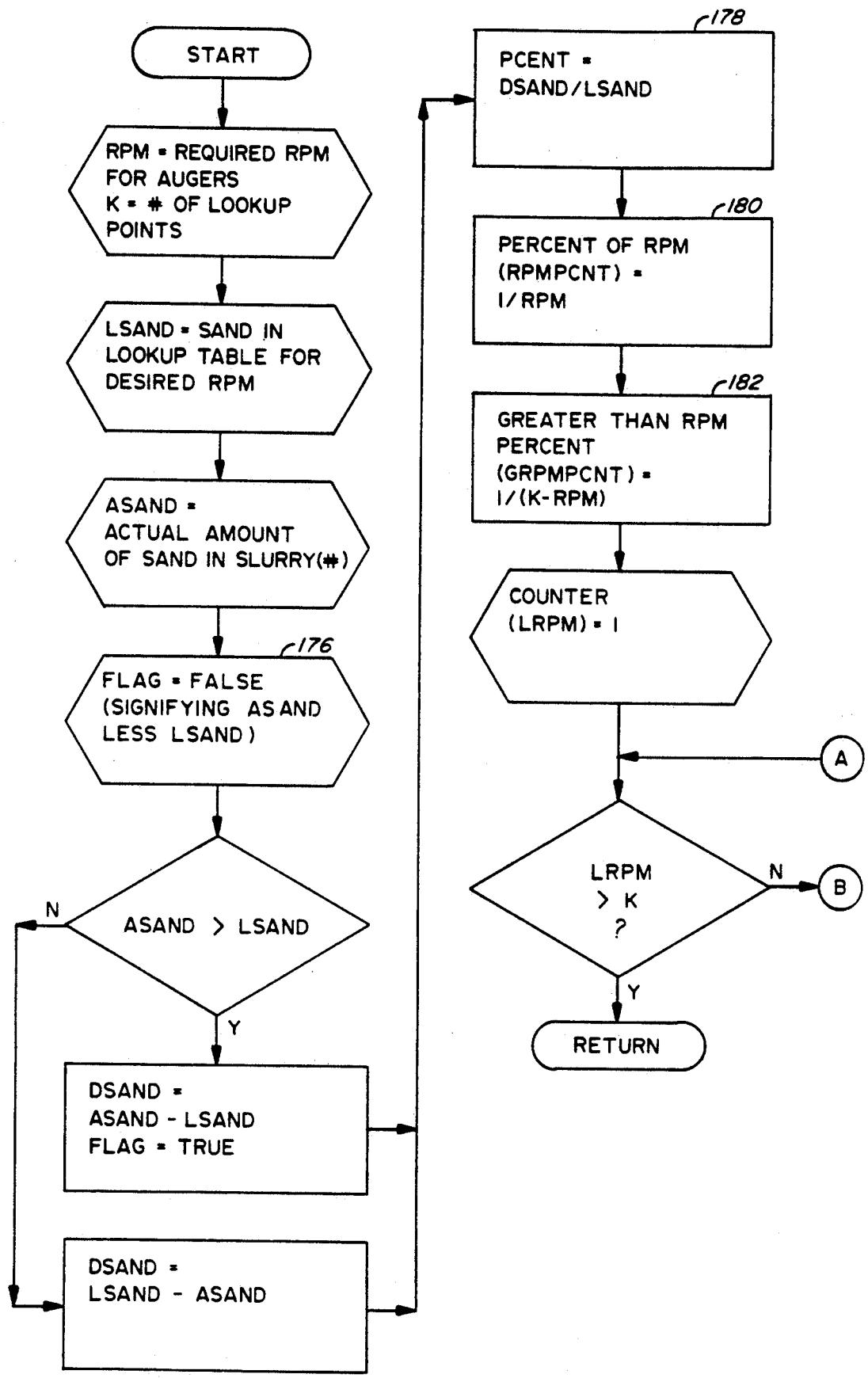
FIG. 22 depicts the process of recalibrating the sand delivery table.
Figure 22B:
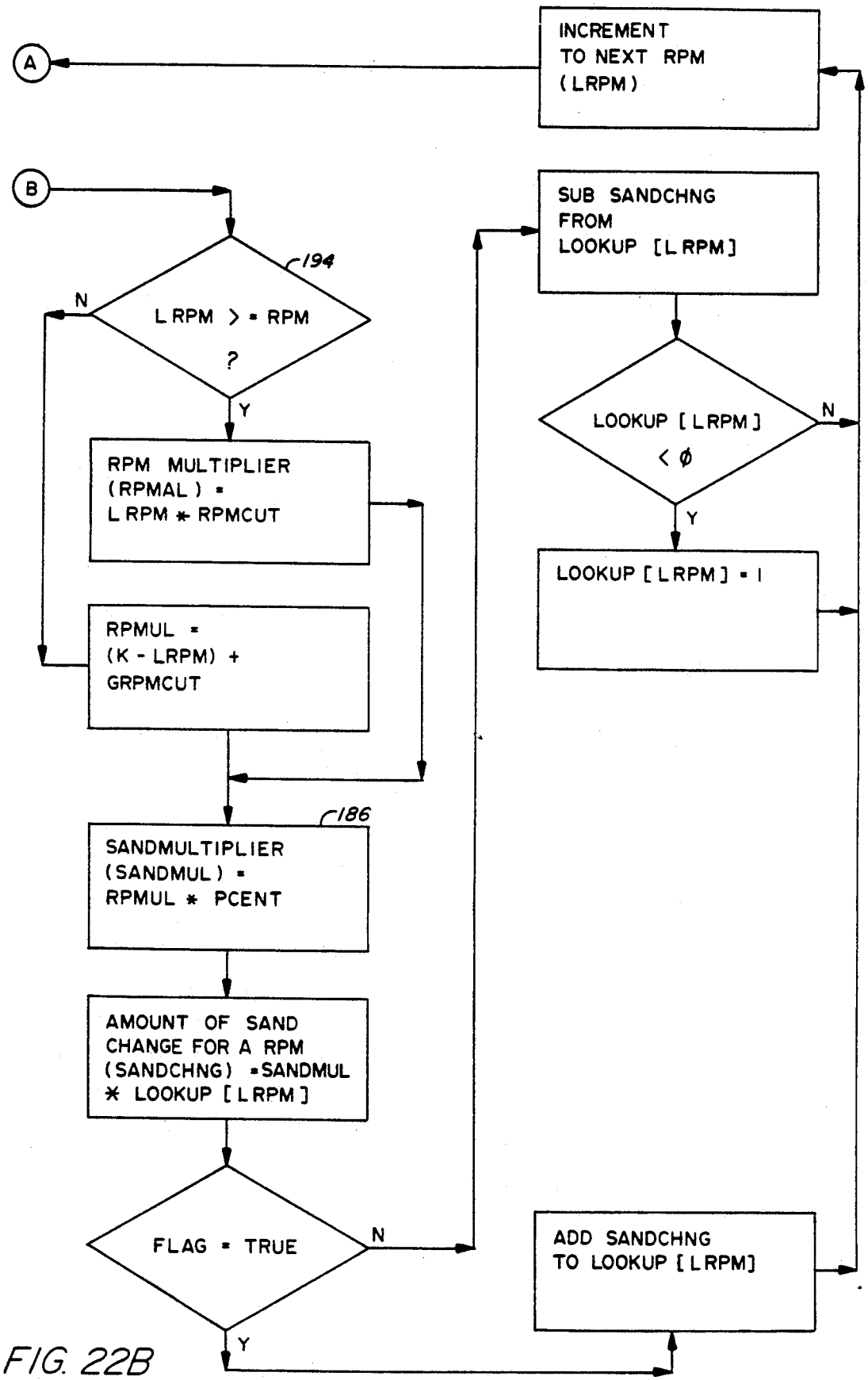

If, however, the two values are within the range of ±4%, the sand lookup table is recalibrated according to the subroutine of FIG. 22.

Referring now to FIG. 22, the CPU defines rpm as equal to the rpm required for the augers according to the subroutine of FIG. 19, and K as the number of lookup points in the lookup table. In the preferred embodiment, K is equal to 128.

The CPU then determines, from the pre-programmed lookup table, the amount of sand (LSAND) which will be provided if the auger operates at the desired rpm value. Finally, the CPU calculates the actual amount of sand that is in the slurry (in pounds per minute), based upon the measurements of the flow meters or densiometer.

In step 176, the CPU sets a flag as false if the actual sand being delivered in the blender tub (as measured by the flow meters) is less than the quantity of sand found in the look-up table (and which corresponds to the required rpm value).

The CPU compares the actual sand being delivered to the quantity of sand in the lookup table. If the actual sand is greater, the flag is set as true and the lookup value of sand is subtracted from the actual value to define the difference in sand, DSAND. Conversely, if the lookup value is greater, the actual value of sand is subtracted from the lookup value to define DSAND.

The CPU calculates a percentage error (PCENT) in the lookup value of sand in step 173 as follows:

$$PCENT = \frac{DSAND}{LSAND}$$

In step 130, RPMPCNT is defined as $$RPMPCNT = \frac{1}{\text{Required RPM}},$$

and in Step 182, GRPMPCNT is defined as $$GRPMPCNT = \frac{1}{K - RPM},$$

where K is the number of look-up points.

The CPU sets the counter of the lowest acceptable rpm value (LRPM) equal to 1 and compares the LRPM to K. If the lowest acceptable rpm value exceeds the number of look-up points (LRPM>K), the CPU exists the subroutine of FIG. 22.

In step 184, the CPU compares the LPRM with the required rpm value. If the LPRM is greater than or equal to the rpm value, the rpm multiplier (RPMUL) is defined as:

RPMUL=(K−LRPM) * CRPMPCNT.

If the rpm is greater than the LRPM, than the multiplier is defined as:

RPMUL=LRPM * RPMPCNT.

In step 186, the CPU defines a sand multiplier (Sandmul) as SANDMUL=RPMUL * PLENT.

The amount of sand change (Sandchng) is calculated as SANDCHNG=SANDMUL * lookup value [LRPM], where Look-up Value [LPRM] is the quantity of sand in the lookup table for the rpm value.

After calculating the amount of change which is necessary for the quantity of sand in the lookup table, the CPU determines whether to add or subtract the SANDCHNG number to the quantity of sand listed in the lookup table.

To continue changing all the lookup sand values, the LRPM is incremented until the quantity of sand for the highest rpm value has been recalibrated.

After all of the sand quantity values in the lookup table have been recalibrated, the CPU exits the subroutine of FIG. 22 and returns to step 118 of the subroutine of FIG. 16.

In this manner, the automatic density controller provides a procedure for comparing the density values measured by the flow meters and the densiometer, as well as the desired density and the actual density measured by the sensors. In addition, the controller recalibrates the preprogrammed sand delivery rate of the auger during step operations so that the quantity of sand actually delivered corresponds accurately to the desired quantity.

The automatic chemical controller preferably is included with the automatic density controller. The automatic chemical controller uses the same circuitry as does the automatic density controller, except that the analog board 300 includes five additional inputs for the flow meters 81, 82, 83, 84, 85 of FIG. 4 and five additional outputs to the chemical additive tanks 75,76,77,78 and 79.

The automatic chemical controller utilizes the same master control unit 350 and central processing unit 450 that comprises part of the automatic density controller.

Figure 23:
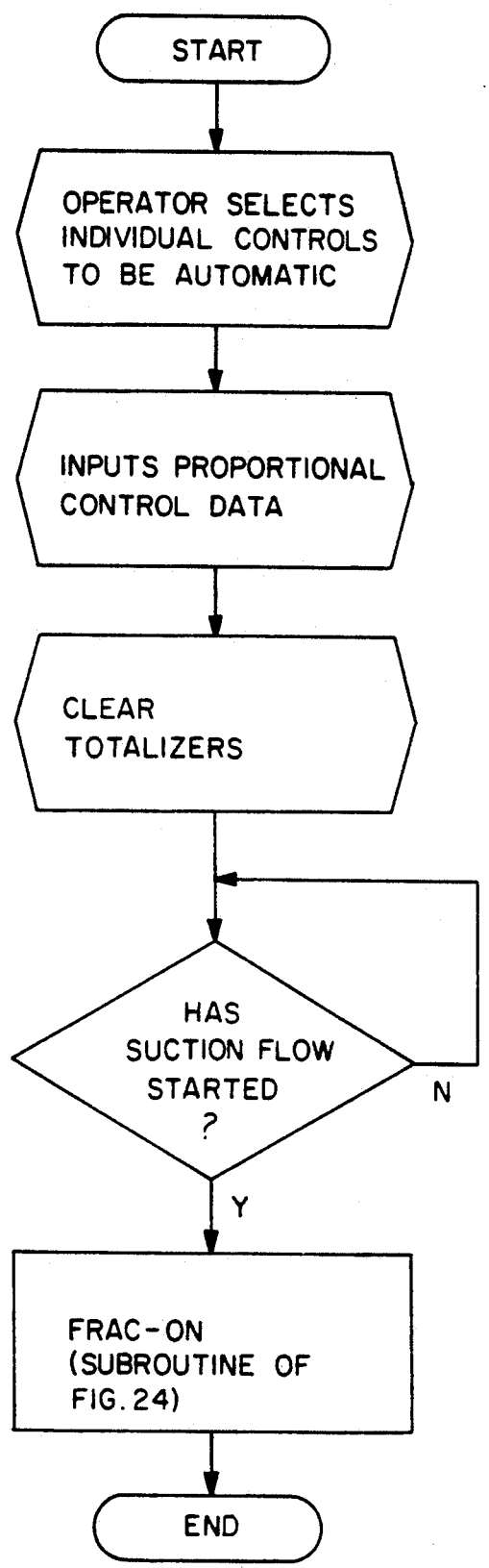
FIG. 23 illustrates the main operational flow chart for the automatic chemical controller.
Figure 24:
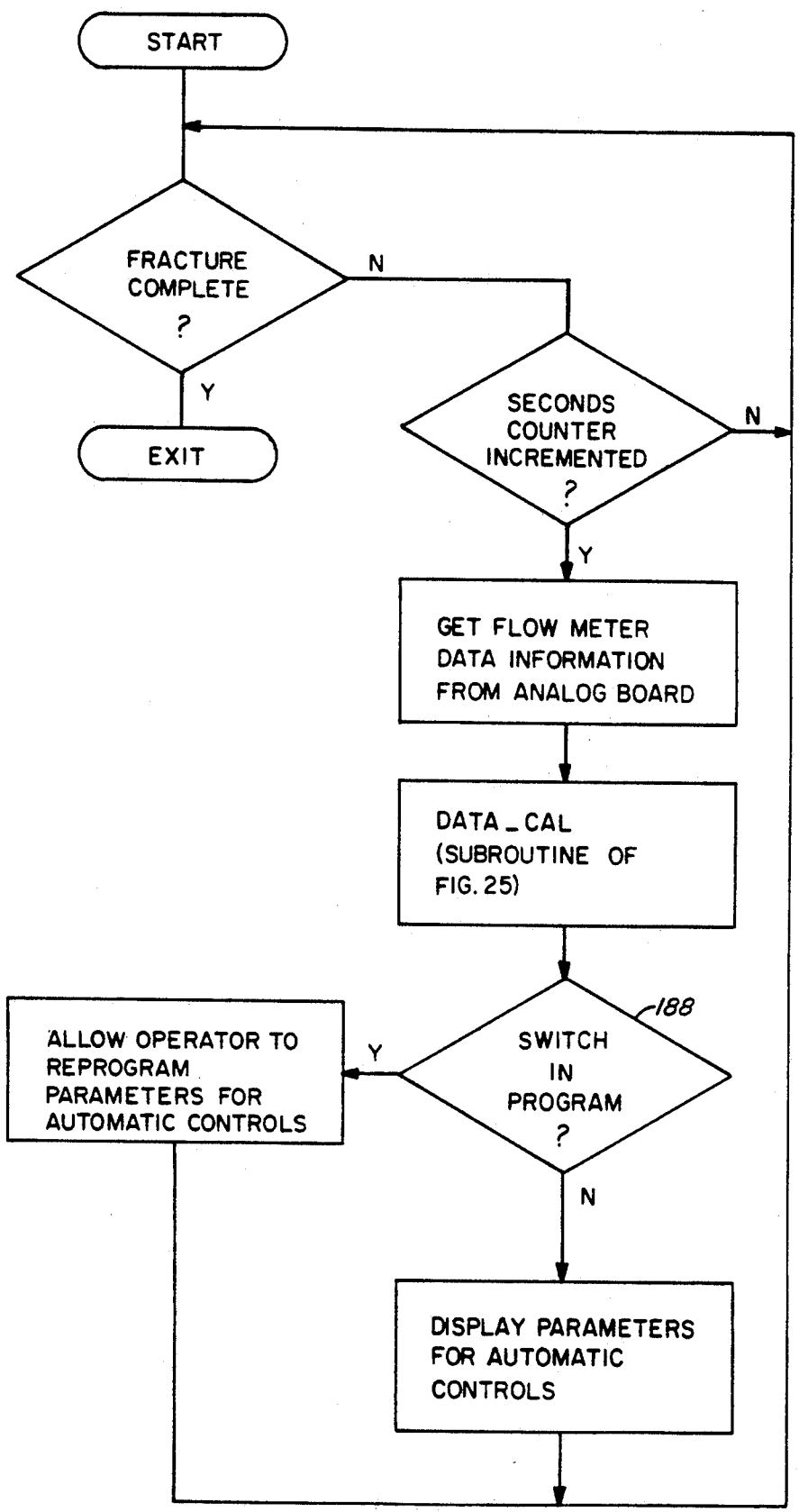
FIG. 24 shows the operation of the automatic chemical controller during a fracturing operation.
Figure 25A:
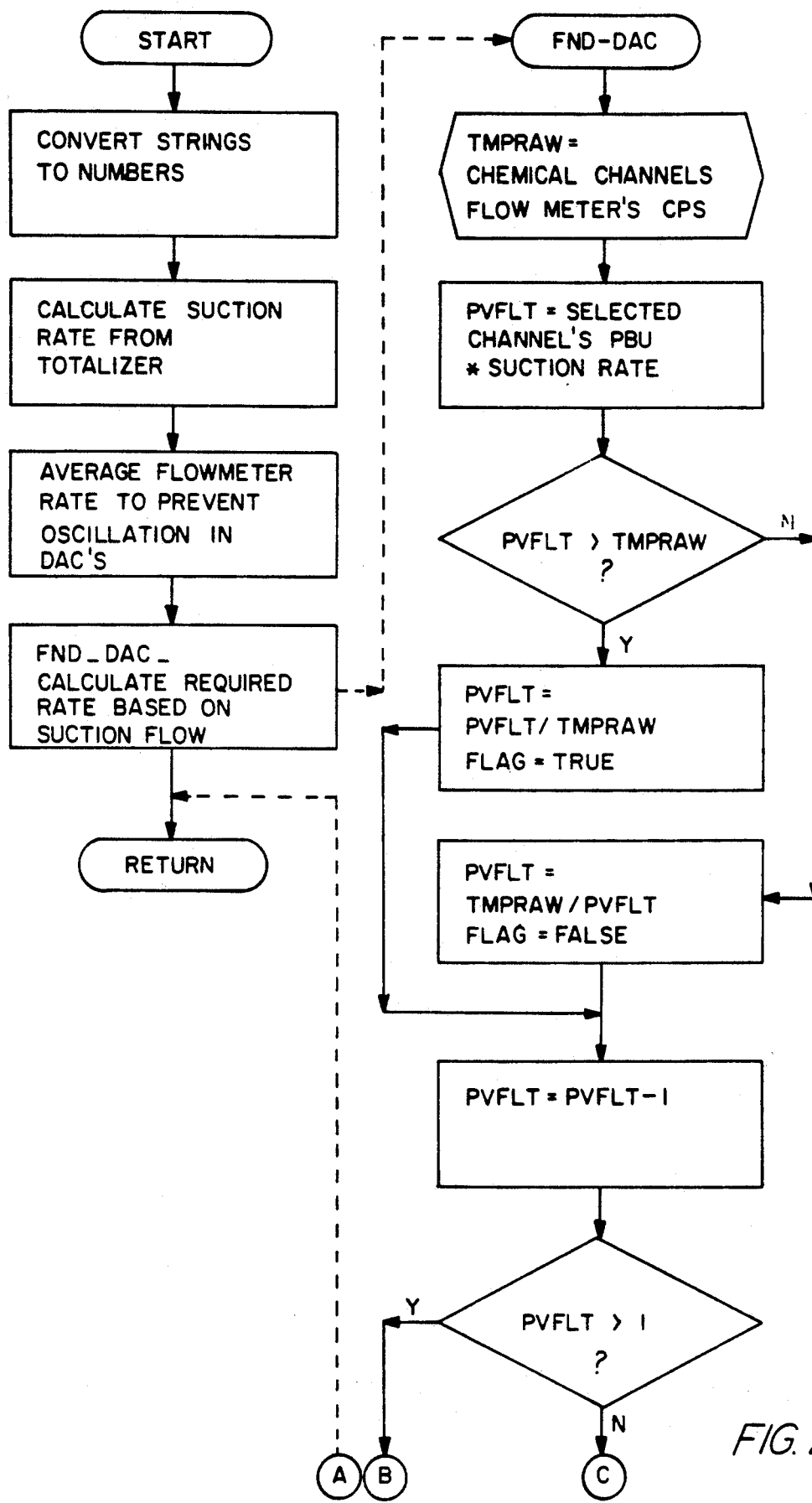
FIG. 25 depicts the process wherein the automatic chemical controller provides an analog output to control the operation of the Chemical tanks.
Figure 25B:
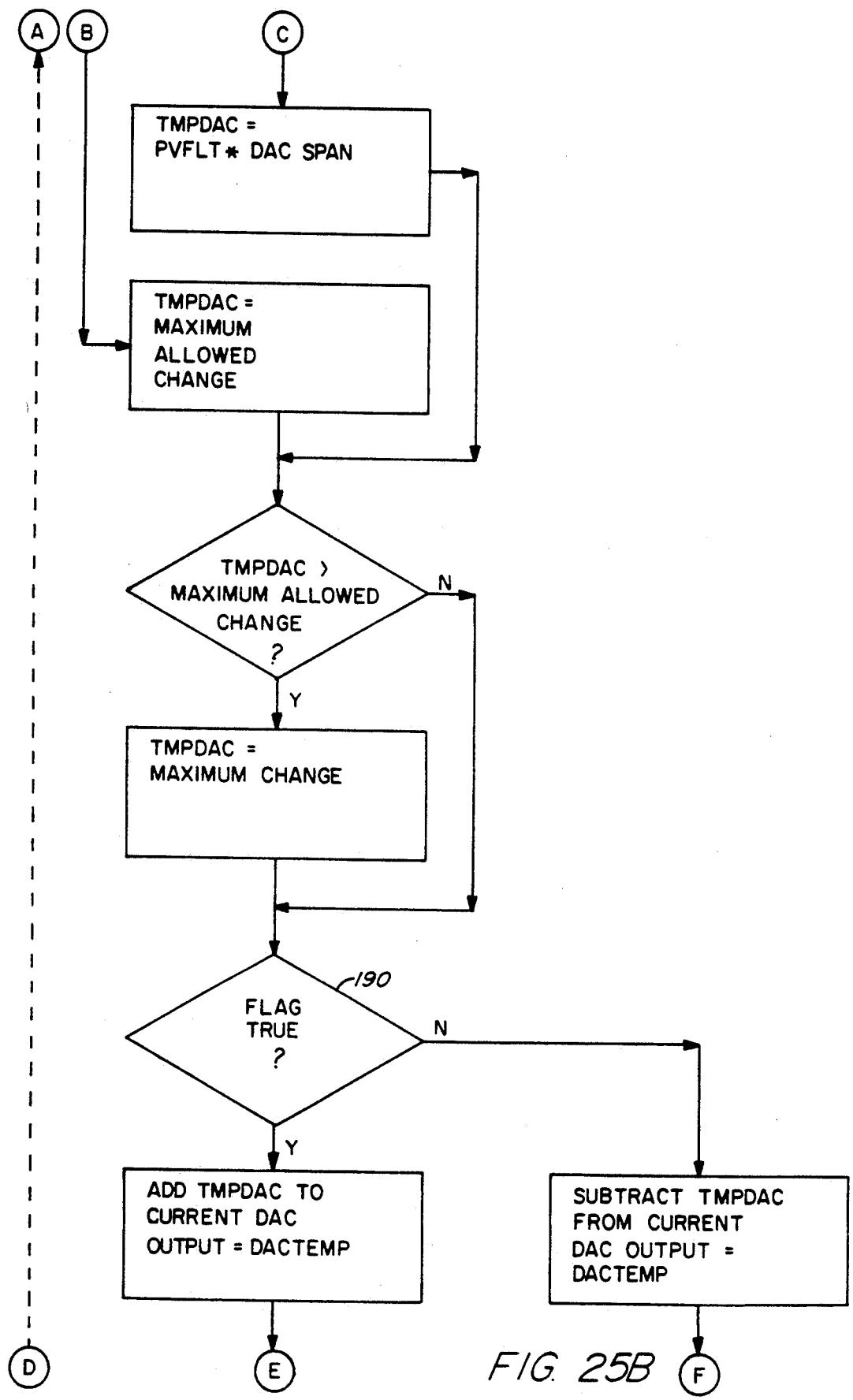
Figure 25C:
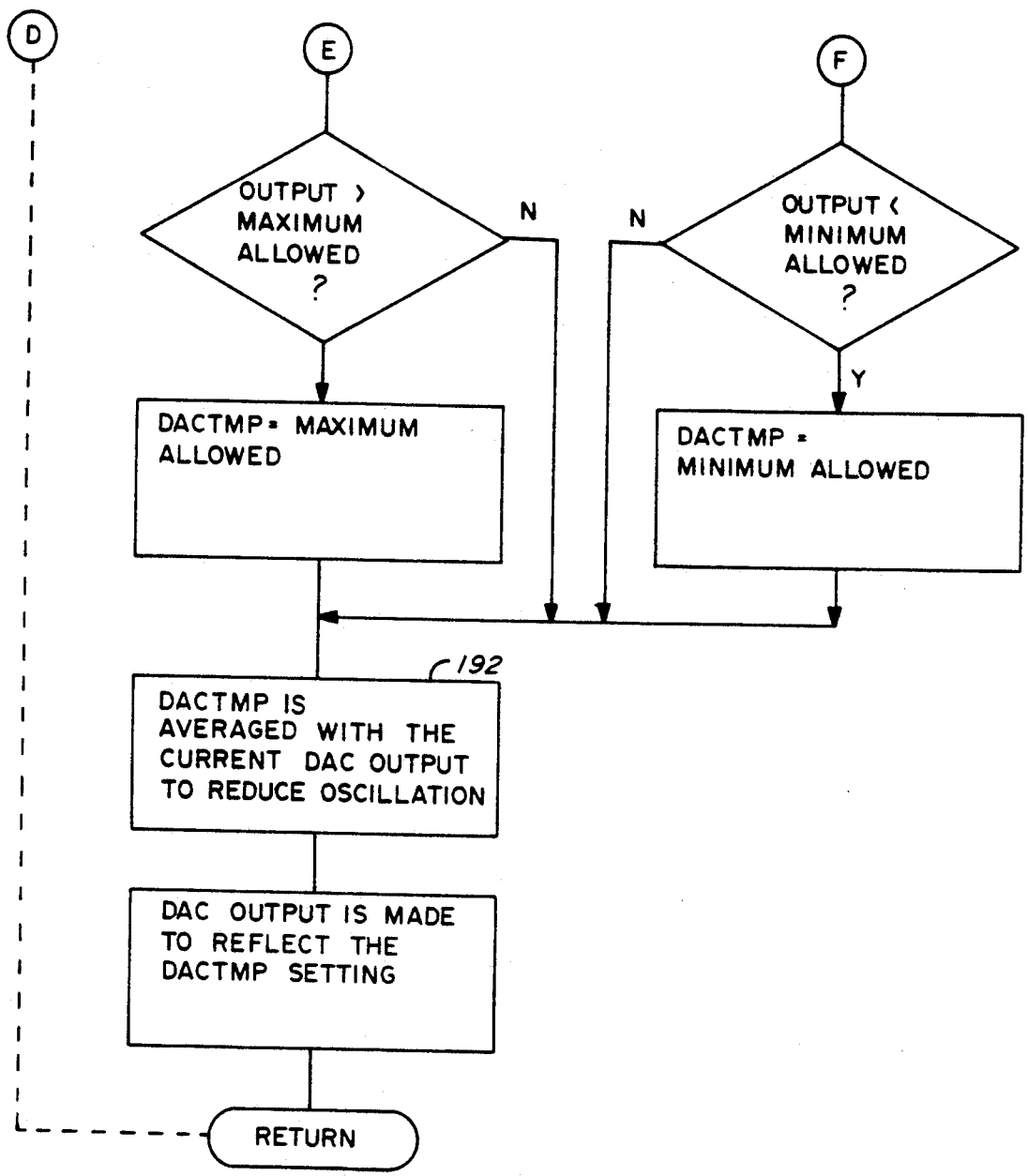

The CPU 450 of the automatic chemical controller operates according to the main program depicted in FIG. 23 and the subroutine shown in FIGS. 24 and 25.

The CPU 450 of the automatic chemical controller begins by noting whether the controller is to operate automatically or manually. If automatic, the operator indicates the volumes at which the chemicals are to be added and the percentage of each chemical. Once suction flow starts in the blender tub 50, the CPU 450 exits the main program and begins the subroutine shown in FIG. 24.

The CPU 450 gathers information from the analog board 300 once every second and performs the data calculations shown in the subroutine of FIG. 25.

Referring now to FIG. 25, the CPU receives the string of signals from the master control unit 350 and converts those signals to numbers. The CPU 450 determines from this data the suction rate of the water entering the blender tub by averaging a number of consecutive suction rates measured over a given interval to remove oscillation. Once the suction flow rate has been determined, the CPU determines the required quantity of chemicals to be added.

The CPU defines TMPRAN as the cycles per second of the flow meters 81,82,83,84 and 85 through which the chemicals are added to the blender tub.

The percent by volume flow rate (PVFLT) is calculated by multiplying each of the selected chemicals desired percent by volume together with the suction rate as follows:

PVFCT=(Desired percent by volume of chemical)
 * (suction rate)

The PVFLT is compared with the data in TMPRAW and a flag is set based upon which of the two is larger. In addition, the PVFLT is redefined as a ratio of the two values.

The PVFLT then is compared with 1 and, if it is less than 1, TMPDAC is set equal to PVFLT times the number of bits (DACSPAN) as follows:

Tmpdac=PVFLT * DACSPAN

If PVFLT is greater than 1, Tmpdac is set equal to the maximum allowed change.

In step 190, the CPU determines if the flag has been set to determine whether to add or subtract TMPDAC to the current output of the digital to analog converter 360 to obtain DACTEMP. Next, the CPU checks the value of DACTEMP to make sure that the DACTEMP value is within a permissible range.

In step 192, DACTEMP is averaged with the current analog output to reduce oscillation, and this value is redefined as DACTEMP. The value of DACTEMP then is sent to the master control unit 350 of the analog board 300, which in turn provides an output to the chemical delivery mechanism.

After transmitting the output signal to the master control unit 350, the CPU 450 exits the subroutine of FIG. 25, and returns to step 188 in the subroutine of FIG. 24.

In step 180, the CPU checks to determine whether the program has been switched.

While a preferred embodiment of the invention has been shown and described, modifications can be made by one skilled in the art without departing from the spirit of the invention.

What is claimed is:

1. An automatic density controller for mixing a fluid and a proppant during a well fracturing operation, comprising:
   a chamber for mixing the proppant with the fluid to obtain a slurry with a desired density;
   input means for supplying fluid to said chamber, said input means including a suction flow meter for providing a signal indicative of the flow rate of fluid supplied;
   discharge means for outputting slurry, said discharge means including a discharge flow meter for measuring the flow rate of slurry out of the chamber;
   delivery means for supplying proppant to said chamber;
   control means electrically connected to said delivery means for automatically controlling the amount of proppant delivered by said delivery means according to a preprogrammed desired slurry density, based upon the signal from the discharge meter in said discharge means and upon a look-up table preprogrammed based on the operating characteristics of the delivery means; and
   wherein said control means includes an accumulator means to accumulate the signals from one of said flow meters to provide a signal representative of the cumulative flow of fluid through said chamber.

2. An automatic density controller as set forth in claim 1, wherein said control means calculates the actual density of the slurry based on the values of the flow rates received from the suction flow meter and the discharge flow meter.

3. An automatic density controller as set forth in claim 2, further comprising a densiometer on said discharge means for measuring the actual density of said slurry.

4. An automatic density controller as in claim 3, wherein said control means compares the actual slurry density calculated from said flow meters with the actual slurry density measured from said densiometer, and provides an warning message if the calculated slurry density differs from the measured slurry density by more than a predefined minimum.

5. An automatic density controller as set forth in claim 2, wherein said control means compares the desired slurry density with the actual slurry density and provides an output representative of the difference between the desired slurry density and the actual slurry density.

6. An automatic density controller as set forth in claim 5, wherein said control means includes means for regulating the delivery rate of said delivery means based on the output representative of the difference between the desired slurry density and the actual slurry density.

7. An automatic density controller as set forth in claim 6, wherein the delivery means is an auger and the quantity of proppant delivered by the auger is directly related to the speed at which said auger operates.

8. An automatic density controller as set forth in claim 7, wherein the proppant is sand.

9. An automatic density controller as set forth in claim 7, wherein the relationship of the quantity of proppant delivered to the speed of operation of the auger is programmed into the control means as the lookup table, and said regulating means controls the quantity of proppant to be delivered by the sand auger by varying the operating speed of said auger based on the lookup table.

10. An automatic density controller as in claim 9, wherein said control means recalibrates the lookup table when the desired slurry density differs from the actual slurry density.

11. An automated controller for mixing fluid with a solid, comprising:
   a blender tub for mixing fluid together with a solid to produce a slurry of a desired density;
   a fluid input for supplying fluid to said blender tub;
   means for delivering the solid to said blender tub;
   regulating means associated with said delivery means for regulating the rate at which the proppant is supplied to said blender tub;
   an output line through which the slurry is discharged from said blender;
   a discharge flow meter on said output line for measuring the slurry discharge rate and total;
   means for receiving the signal from said discharge flow meter;
   means, connected to said discharge flow meter, for calculating the required amount of solid which must be supplied to said blender tub to produce a slurry at the desired density, based upon the signal received from said discharge flow meter and upon a preprogrammed density function;
   means for converting the calculated required amount of solid to a representative signal for controlling said regulating means; and memory means electrically connected to said means for calculating, said memory means storing a specific slurry density at specific cumulative volumes of a slurry discharged from said blender tub.

12. An automatic controller as in claim 11, further comprising:
a suction flow meter on said fluid input for measuring the rate at which fluid is supplied to said blender tub and providing a signal indicative thereof;
means for adding a chemical to said blender tub for mixing with the water and the solid;
means for controlling the rate at which the chemical is added to said blender tub wherein said calculating means calculates the rate at which the chemical should be added to said blender tub based upon the signal received from said suction flow meter.

13. An automatic controller as in claim 11 further comprising:
a suction flow meter on said fluid input for measuring the rate at which fluid is supplied to said blender tub and providing a signal indicative thereof;
whereby said calculating means determines the actual density of the slurry based upon the flow rate measured by the suction flow meter for comparison with the desired density.

14. An automatic controller as set forth in claim 13, further comprising a densiometer for measuring the density of the slurry discharged from the blender tub.

15. An automatic controller as set forth in claim 14, wherein said calculating means includes means for comparing the actual density measured by said densiometer with the actual density calculated by said calculating means.

16. An automatic controller as set forth in claim 13, wherein said calculating means includes a comparison means for comparing the actual density with the desired density.

17. An automatic controller as set forth in claim 16, wherein said calculating means includes correction means for providing a signal representative of the difference between the actual density and the desired density.

18. An automatic controller as set forth in claim 17, wherein said correction means provides said signal representative of the difference between the actual density and the desired density as a feedback to said converting means.

19. An automatic controller as set forth in claim 18, wherein said converting means is recalibrated based on said signal representative of the difference between actual density and desired density.

20. An automatic density controller for mixing fluid and a proppant during a well fracturing operation, comprising:
a chamber for mixing the proppant with the fluid to obtain a slurry with a desired density;
discharge means for supplying flurry to the well including means for measuring the flow rate of the slurry through the discharge means and providing a signal indicative thereof;
delivery means for supplying proppant to said chamber;
control means electrically connected to said delivery means for automatically controlling the amount of proppant delivered by said delivery means, based upon the signals received from the measuring means;
said control means including an accumulator means to accumulate the signals from said measuring means to provide a signal representative of the cumulative volume flow of slurry through said discharge means;
said control means also including option switches, whereby said control means is preprogrammed to provide a desired slurry density at specific cumulative volumes of slurry.

21. An automatic density controller as set forth in claim 20, wherein the control means is preprogrammed to provide a ramped fluid density.

22. An automatic density controller as set forth in claim 20, wherein the control means is preprogrammed to provide a stepped fluid density.

23. An automatic controller for controlling a well fracturing operation, comprising:
(a) a blender tub for mixing fluid together with a proppant to produce a slurry of a desired density;
(b) a fluid input for supplying fluid to said blender tub;
(c) a suction flow meter for measuring the rate at which the fluid is supplied to said blender tub and for transmitting a signal representative of the rate at which the fluid is supplied;
(d) means for delivering proppant to said blender tub;
(e) regulating means associated with said delivering means for regulating the rate at which the proppant is supplied to said blender tub by regulating the operational speed or aperture of the delivery means;
(f) a slurry output line through which the slurry is discharged form said blender tub;
(g) a discharge flow meter mounted on said slurry output line for measuring the rate at which slurry is discharged from the blender tub;
(h) (1) means for receiving the signal from said discharge flow meter;
(h) (2) means for calculating the required amount of proppant which must be supplied to said blender tub to produce a slurry at the desired density;
(h) (3) means for converting the required amount of proppant to a signal representative of a required operational speed or of a required aperture to regulate the delivery of proppant by said delivery means;
(h) (4) means connected to said converting means for transmitting the signal representative of the required operational speed or required aperture to said regulating means;
(i) means for determining actual density, forming part of said calculating means, and said means for determining density calculates actual density based upon the rates measured by said suction flow meter and said discharge flow meter.

24. An automatic density controller for mixing fluid and a proppant during a well fracturing operation, comprising:
a chamber for mixing the proppant with the fluid to obtain a slurry with a desired density;
input means for supplying the fluid to said chamber, said input means including a suction flow meter for providing a signal indicative of the flow rate of fluid supplied;
delivery means for supplying proppant to said chamber;
an output line from said chamber, said output line including a discharge flow meter;
control means electrically connected to said delivery means for automatically controlling the amount of proppant delivered by said delivery means according to a programmed desired slurry density, based upon the signal from the discharge flow meter in said input means and upon a look-up table preprogrammed based on the operating characteristics of the delivery means; and wherein said control means includes an accumulator means to accumulate the signals from said suction flow meter to provide a signal representative of the cumulative flow of fluid through said input means; and a plurality of chemical tanks for supplying chemicals to said chamber;

wherein said control means electrically connects to said chemical tank for automatically controlling the amount of chemicals supplied by said chemical tanks, based upon the flow rate measured by said suction flow meter.

25. An automated density controller for controlling the density of a slurry, comprising:

input means for supplying fluid to a chamber;

a plurality of delivery means for supplying a proppant to the chamber;

means for mixing, located in the chamber, for mixing the fluid and the proppant to produce the slurry;

a discharge line from the chamber, said discharge line including a discharge flow meter for providing a signal indicative of the rate of slurry discharged;

control means including a preprogrammed look-up table representing the operating characteristics of each of said plurality of delivery means, said control means receiving the signal from said discharge flow meter and determining therefrom the amount of proppant to add to obtain a desired slurry density, based upon the operating characteristics of each of said delivery means; and means for selecting, forming part of said control means, for determining which delivery means to activate and the speed at which each of the delivery means should be activated to maximize the performance of said plurality of delivery means.

* * * * *